US 12,516,296 B2
Jan. 6, 2026

(12) United States Patent
Yu et al.

(54) VACCINES FOR TREATING SARS INFECTIONS IN CANCER PATIENTS

(71) Applicant: City of Hope, Duarte, CA (US)

(72) Inventors: Jianhua Yu, Duarte, CA (US); Michael A. Caligiuri, Duarte, CA (US)

(73) Assignee: CITY OF HOPE, Duarte, CA (US)

( * ) Notice: Subject to any disclaimer, the term of this patent is extended or adjusted under 35 U.S.C. 154(b) by 926 days.

(21) Appl. No.: 17/730,043

(22) Filed: Apr. 26, 2022

(65) Prior Publication Data
US 2022/0340884 A1    Oct. 27, 2022

Related U.S. Application Data

(60) Provisional application No. 63/180,491, filed on Apr. 27, 2021.

(51) Int. Cl.
| | | |
|---|---|---|
| *C12N 7/00* | (2006.01) | |
| *A61K 39/245* | (2006.01) | |
| *A61P 1/00* | (2006.01) | |
| *A61P 15/00* | (2006.01) | |
| *A61P 17/00* | (2006.01) | |
| *A61P 31/14* | (2006.01) | |
| *A61P 35/00* | (2006.01) | |
| *C07K 14/005* | (2006.01) | |
| *C12N 15/86* | (2006.01) | |
| *A61K 39/00* | (2006.01) | |

(52) U.S. Cl.
CPC .............. *C12N 7/00* (2013.01); *A61K 39/245* (2013.01); *A61P 1/00* (2018.01); *A61P 15/00* (2018.01); *A61P 17/00* (2018.01); *A61P 31/14* (2018.01); *A61P 35/00* (2018.01); *C07K 14/005* (2013.01); *C12N 15/86* (2013.01); *A61K 2039/5256* (2013.01); *A61K 2039/82* (2018.08); *A61K 2039/876* (2018.08); *A61K 2039/892* (2018.08); *C07K 2319/01* (2013.01); *C07K 2319/03* (2013.01); *C12N 2710/16022* (2013.01); *C12N 2710/16023* (2013.01); *C12N 2710/16034* (2013.01); *C12N 2710/16042* (2013.01); *C12N 2710/16062* (2013.01); *C12N 2770/20034* (2013.01)

(58) Field of Classification Search
None
See application file for complete search history.

(56) References Cited

U.S. PATENT DOCUMENTS 9,023,617 B2 *    5/2015   Bloom ................... C12N 15/85
                                                                    435/325

OTHER PUBLICATIONS

Li et al., J. Biomedical Science, 2020, 27:104 (Year: 2020).*
CDC's Types of COVID-19 Treatment, from https://www.cdc.gov/covid/treatment/index.html, dated Apr. 2025, website accessed Apr. 18, 2025, 4 pages (Year: 2025).*
Ylösmäki et al., Current Opinion in Biotechnology, 2020, 65:25-36 (Year: 2020).*
Todo et al., Frontiers in Bioscience, Jan. 2008, 13:2060-2064 (Year: 2008).*
CanVirex AG (Dec. 2020). "Two sides of the same coin:Measles-vectored drugs for cancer immunotherapy and vaccines," *Nature* B28.
Chakraborty, C. et al. (Apr. 2020). "SARS-CoV-2 causing pneumonia-associated respiratory disorder (COVID-19): diagnostic and proposed therapeutic options," *Eur Rev Med Pharmacol Sci* 24(7):4016-4026.
Chiuppesi, F. et al. (Nov. 30, 2020). "Development of a multi-antigenic SARS-CoV-2 vaccine candidate using a synthetic poxvirus platform," *Nat Commun* 11(1):6121.
Florindo, H.F. et al. (Aug. 2020, e-published Jul. 13, 2020). "Immune-mediated approaches against COVID-19," *Nat Nanotechnol* 15(8):630-645.
Izda, V. et al. (Jan. 2021, e-published Nov. 17, 2020). "COVID-19: A review of therapeutic strategies and vaccine candidates," *Clin Immunol* 222:108634.
Jordan, R.E. et al. (Mar. 26, 2020). "Covid-19: risk factors for severe disease and death," *BMJ* 368:m1198.
Liang, W. et al. (Mar. 2020, e-published Feb. 14, 2020). "Cancer patients in SARS-CoV-2 infection: a nationwide analysis in China," *Lancet Oncol* 21(3):335-337.
Mercado, N.B. et al. (Oct. 2020, e-published Jul. 30, 2020). "Single-shot Ad26 vaccine protects against SARS-CoV-2 in rhesus macaques," *Nature* 586(7830):583-588.
Mondal, M. et al. (Oct. 2, 2020, e-published Feb. 20, 2020). "Recent advances of oncolytic virus in cancer therapy," *Hum Vaccin Immunother* 16(10):2389-2402.
Raja, J. et al. (Dec. 4, 2018). "Oncolytic virus immunotherapy: future prospects for oncology," *J Immunother Cancer* 6(1):140.
Saha, D. et al. (Dec. 2016, e-published Aug. 3, 2016). "Oncolytic herpes simplex virus interactions with the host immune system," *Curr Opin Virol* 21:26-34.
Sanchez-Felipe, L. et al. (Feb. 2021, e-published Dec. 1, 2020). "A single-dose live-attenuated YF17D-vectored SARS-CoV-2 vaccine candidate," *Nature* 590(7845):320-325.
Sharma, O. et al. (Oct. 14, 2020). "A Review of the Progress and Challenges of Developing a Vaccine for COVID-19," Front Immunol 11:585354.
Van Riel, D. et al. (Aug. 2020). "Next-generation vaccine platforms for COVID-19," *Nat Mater* 19(8):810-812.
Wang, Q. et al. (Feb. 1, 2021). "Analyses of Risk, Racial Disparity, and Outcomes Among US Patients With Cancer and COVID-19 Infection," *JAMA Oncol* 7(2):220-227.

(Continued)

*Primary Examiner* — Stacy B Chen
(74) *Attorney, Agent, or Firm* — Mintz, Levin, Cohn, Ferris, Glovsky and Popeo, P.C.

(57) ABSTRACT

Provided herein are, inter alia, compositions including recombinant oncolytic herpes simplex viruses that express SARS-CoV spike (S) protein and viral vectors including nucleic acid sequences encoding SARS-CoV S protein. The compositions are useful for eliciting antibodies to SARS-CoV. The compositions are contemplated to be particularly useful for methods of treating and preventing SARS coronavirus infections in cancer patients.

19 Claims, 38 Drawing Sheets
Specification includes a Sequence Listing.

(56) References Cited

OTHER PUBLICATIONS

Warneck, L. (Mar. 15, 2021). Developing a Vaccine that Protects Against Covid-19 Variants, *Labiotech*, 10 pages.
Zhu, F-C. et al. (Jun. 13, 2020, e-published May 22, 2020). "Safety, tolerability, and immunogenicity of a recombinant adenovirus type-5 vectored COVID-19 vaccine: a dose-escalation, open-label, non-randomised, first-in-human trial," *Lancet* 395(10240):1845-1854.

* cited by examiner

FIG. 1D

OV-spike

VACCINES FOR TREATING SARS INFECTIONS IN CANCER PATIENTS

CROSS-REFERENCES TO RELATED APPLICATIONS

This application claims priority to U.S. Application No. 63/180,491 filed Apr. 27, 2021, the disclosure of which is incorporated by reference herein in its entirety.

REFERENCE TO A "SEQUENCE LISTING," A TABLE, OR A COMPUTER PROGRAM LISTING APPENDIX SUBMITTED AS AN ASCII FILE

The Sequence Listing written in file 048440-809001US Sequence Listing ST25.TXT, created on Apr. 26, 2022, 9,340 bytes, machine format IBM-PC, MS Windows operating system, is incorporated herein by reference.

BACKGROUND

The COVID-19 pandemic, caused by severe acute respiratory syndrome coronavirus 2 (SARS-CoV-2), threatens human health and public safety[1-3]. By April 2021, nearly 2,900,000 people have died worldwide because of SARS-CoV-2 infection[4]. Factors such as chronic obstructive pulmonary disease, cardiovascular disease, hypertension, and diabetes mellitus may increase the susceptibility to COVID-19[5,6]. Furthermore, cancer usually induces an immunocompromised condition and increases the susceptibility to COVID-19; cancer patients were reported to have about a 7-fold higher risk of SARS-CoV-2 infection and about a 5-fold increased risk of severe COVID-19 than people without cancer[7,8]. Cancer also was associated with about a 2-fold increased risk of COVID-19 death[9]. Therefore, protecting cancer patients from SARS-CoV-2 infection is a high priority for reducing the public health impact of COVID-19. The present disclosure is directed to this, as well as other, important ends.

BRIEF SUMMARY

The disclosure provides a recombinant oncolytic herpes simplex virus capable of expressing a SARS-CoV spike (S) protein. The disclosure provides viral vectors comprising the recombinant oncolytic herpes simplex virus capable of expressing a SARS-CoV spike (S) protein. The disclosure provides vaccines and pharmaceutical compositions comprising the recombinant oncolytic herpes simplex virus capable of expressing a SARS-CoV spike (S) protein. The disclosure provides vaccines and pharmaceutical compositions comprising viral vectors which comprise the recombinant oncolytic herpes simplex virus capable of expressing a SARS-CoV spike (S) protein. The recombinant oncolytic herpes simplex virus, viral vectors, vaccines, and pharmaceutical compositions are useful in generating antibodies to SARS coronavirus, treating a SARS coronavirus infection, preventing a SARS coronavirus infection, treating COVID-19, and preventing COVID-19 in patients in need thereof. In embodiments, the patients have cancer.

The disclosure provides a recombinant oncolytic herpes simplex virus particle comprising a SARS-CoV spike (S) protein on a surface of the particle. The disclosure provides fusion proteins comprising a SARS-CoV spike (S) protein, a glycoprotein D transmembrane domain, and a glycoprotein D intracellular domain.

These and other embodiments of the disclosure are provided in more detail herein.

BRIEF DESCRIPTION OF THE DRAWINGS

FIGS. 1A-1I: Engineering and validation of OV-spike. (FIG. 1A) The presence of anti-SARS-CoV-2 spike (S) protein antibodies in the serum from COVID-19 patients without cancer (n=11) or with cancer (n=13), detected as the binding affinity of serum samples to the SARS-CoV-2 S protein. (FIG. 1B) The ability of serum samples from SARS-CoV-2-infected people with or without cancer to neutralize VSV-SARS-CoV-2 infection in vitro. (FIG. 1C) Schematic map of the oncolytic viruses used in this study. Top: genetic map of wild type HSV-1. Middle: genetic map of the control oHSV (OV-Q1) with deletion of 2 copies of γ34.5, dysfunctional ICP6, and insertion of the GFP gene. Bottom: genetic map of OV-spike showing the inserted S protein coding gene fused with the transmembrane and intracellular domains of glycoprotein (g)D. (FIG. 1D) The construction model for OV-spike. The gray dots represent S protein fused with the transmembrane and intracellular domain of gD, and the black rhombuses show wild type gD. (FIG. 1E) Transmission electron micrographs of OV-Q1 (left panel) compared to OV-spike (right panel). (FIG. 1F) Immunogold labeling using antibodies against the SARS-CoV-2 S protein for OV-Q1 (left panel) compared to OV-spike (right panel). (FIG. 1G) Expression of the SARS-CoV-2 S protein in OV-Q1 and OV-spike virus particles as determined by immunoblotting assay. (FIG. 1H) Expression of the SARS-CoV-2 S protein mRNA in OV-Q1- and OV-spike-infected Vero cells, as measured by quantitative real-time PCR. (FIG. 1I) Expression of the SARS-CoV-2 S protein in OV-Q1- and OV-spike-infected Vero cells as detected by flow cytometry. Error bars represent standard deviations of triplicates. Data in FIG. 1B and FIGS. 1H-1I are shown in mean with standard deviation. Unpaired t-test (FIGS. 1A-1B) or paired t-test (FIGS. 1H-1I) was applied.

(FIGS. 2A-2C) BALB/c mice were vaccinated on days 0 and 14 with $1 \times 10^6$ plaque-forming units (pfu) or $5 \times 10^5$ pfu of OV-spike by intravenous (i.v.) administration and $1 \times 10^6$ pfu of OV-Q1 or saline (Mock vaccination) as a negative control. (FIG. 2A) Serum anti-S protein antibody levels on days 0, 21, 28, 35, 42 and 63, as assessed by an S protein-specific enzyme-linked immunosorbent assay (ELISA). (FIG. 2B) Overview of serum anti-S protein antibody levels from days 0 to 70. (FIG. 2C) Anti-S antibody production rates in vaccinated mice at the indicated days. (FIGS. 2D-2F) C57BL/6 mice were vaccinated on days 0 and 14 with $1 \times 10^6$ pfu or $2 \times 10^6$ pfu OV-spike by intraperitoneal (i.p.) administration. (FIG. 2D) Serum anti-S protein antibody levels on days 0, 21, 28, 35, 42 and 49, as assessed by an S protein-specific ELISA. (FIG. 2E) Overview of serum anti-S protein antibody levels from days 0 to 70. (FIG. 2F) Anti-S antibody production rates in vaccinated mice at the indicated days. Data in FIG. 2A and FIG. 2D are shown in mean value. Each dot represents one mouse in data FIG. 2A and FIG. 2D. One-way ANOVA was applied to compare the mean of each column with the mean of every other column with Holm-Sidak test (FIG. 2A, FIG. 2D).

(FIG. 3A) ELISA-based binding assessment for S protein or S protein subunit 1 (S1) and serum from mice vaccinated with saline (mock), OV-Q1 or OV-spike. (FIG.

3B) The left panel shows flow cytometry data for binding between serum from mice vaccinated with saline (mock), OV-Q1 or OV-spike and S protein expressed on 293T cells. The data are summarized in the right panel. (FIG. 3C) VSV-SARS-CoV-2 neutralization by serum from mice vaccinated with saline (mock), OV-Q1 or OV-spike at the indicated dilutions. (FIG. 3D) The neutralization titer of the serum from vaccinated mice. (FIG. 3E) The neutralization against live SARS-CoV-2 virus of the sera from vaccinated mice. (FIG. 3F) The image data of the neutralization assay against live SARS-CoV-2 virus. (FIG. 3G) The binding assay between 51 protein of wild type SARS-CoV-2 or B.1.1.7 mutant strain and sera from mock, OV-Q1 and OV-spike vaccinated mice was measured by ELISA. (FIG. 3H) The neutralization against live B.1.1.7 mutant strain infection of the sera from vaccinated mice. (FIG. 3I) The neutralization titer against wild type strain and B.1.1.7 mutant strain of the sera from vaccinated mice. Error bars represent standard deviations of triplicates. Data in FIGS. 3A-3E and FIGS. 3G-3I are shown in mean with SD. Three independent experiments were performed in data FIG. 3A, FIG. 3C, and FIG. 3G. Unpaired t-test with two-tail was applied (FIG. 3C, FIG. 3E, FIGS. 3H-I).

FIGS. 4A-4I: OV-spike vaccine inhibits tumor progression and induces anti-S specific neutralization antibodies in vivo. (FIGS. 4A-B) A mouse melanoma tumor model was established by s.c. injection of $5 \times 10^5$ B16 cells. Five and seven days later, the mice were intratumorally injected with a vehicle control or $1 \times 10^6$ pfu of OV-Q1 or OV-spike. (FIG. 4A) Melanoma tumor volume in mice with the indicated treatments. (FIG. 4B) ELISA-based assessment of anti-S protein antibody levels in the serum from these mice at the indicated times. (FIGS. 4C-4D) A mouse colon tumor model was established by i.p. injection of $5 \times 10^5$ MC38 cells. Four, eleven, and eighteen days later, the mice were injected i.p. with a vehicle control or $2 \times 10^6$ pfu of OV-Q1 or OV-spike. (FIG. 4C) Survival of mice with the indicated treatments. (FIG. 4D) ELISA-based assessment of anti-S protein antibody levels in the serum from these mice at the indicated times. (FIGS. 4E-4F) A mouse ovarian tumor model was established by i.p. injection of $1 \times 10^6$ ID8 cells. Four, eleven, and eighteen days later, the mice were injected i.p. with a vehicle control or $2 \times 10^6$ pfu of OV-Q1 or OV-spike. (FIG. 4E) The tumor volume of mice with the indicated treatments. (FIG. 4F) ELISA-based assessment of anti-S protein antibody levels in the serum from these mice at the indicated times. (FIG. 4G) The neutralization against live wild type strain and B.1.1.7 virus strain infection of the sera from vaccinated mice bearing tumors. (FIG. 4H) The neutralization titer against live wild type strain and B.1.1.7 virus strain infection of the sera from vaccinated mice bearing tumors. Error bars represent standard deviations. Data in FIG. 4A, FIG. 4E, and FIGS. 4G-4H are shown in mean with SD. Data in FIG. 4B, FIG. 4D, and FIG. 4F are shown in mean value. Each dot represents one mouse in data FIG. 4B, FIG. 4D, and FIG. 4F. One-way ANOVA was applied to compare the mean of each column with the mean of every other column with Holm-Sidak test (FIGS. 4A-4B, FIGS. 4D-4F). Unpaired t-test with two-tail was applied (FIGS. 4G-4H).

(FIG. 5A) Cellular immune responses of splenocytes as assessed using interferon gamma (IFNγ) ELISpot assays in vaccinated non-tumor-bearing BALB/c mice. (FIGS. 5B-5C) The percentage of (FIG. 5B) IFNγ+CD4$^+$ and (FIG. 5C) IFNγ$^+$CD8$^+$ T cells after exposure to pooled S peptides extracted from mice vaccinated with saline (mock), OV-Q1, or OV-spike, as analyzed by flow cytometry. (FIGS. 5D-5E) The percentage of (FIG. 5D) natural killer (NK) cells and (FIG. 5E) activated (CD107a$^+$) NK cells from splenocytes extracted from mice vaccinated with saline (mock), OV-Q1, or OV-spike, as analyzed by flow cytometry. (FIG. 5F) Cellular immune responses of splenocytes as assessed using IFNγ ELISpot assays in vaccinated mice bearing ID8 tumors after ex vivo antigen stimulation using an S peptide mixture. (FIGS. 5G-5H) The percentage of (FIG. 5G) IFNγ+CD4$^+$ and (FIG. 5I) IFNγ$^+$CD8$^+$ T cells after exposure to pooled S peptides from splenocytes extracted from ID8 tumor-bearing mice vaccinated with saline (mock), OV-Q1, or OV-spike, as analyzed by flow cytometry. (FIGS. 5I-5J) The percentage of (FIG. 5I) NK cells and (FIG. 5J) activated (CD107a$^+$) NK cells from splenocytes extracted from ID8 tumor-bearing mice vaccinated with saline (mock), OV-Q1, or OV-spike, as analyzed by flow cytometry. Error bars represent standard deviations. Each dot represents one mouse. Data in FIGS. 5A-5J are shown in mean with SD. One-way ANOVA was applied to compare the mean of each column with the mean of every other column with Holm-Sidak test (FIGS. 5A-5J).

(FIG. 6A) Anti-S antibody production of the serum from these mice were assessed on days 0, 21, 28, 35, 42 and 49 by a S protein-based ELISA. (FIG. 6B) The overview of the immune responses of the serum from these mice were assessed from days 0 to 49 by a S protein-based ELISA. (FIG. 6C) Anti-S production rates in vaccinated mice at indicated days. Data in FIG. 6A are shown in mean value. Each dot represents one mouse. One-way ANOVA was applied to compare the mean of each column with the mean of every other column with Holm-Sidak test (FIG. 6A).

FIGS. 7A-7C: Sera collected from OV-spike vaccinated mice showed strong neutralization function against VSV-SARS-CoV-2 infection. (FIGS. 7A-7B) Cells infected with VSV-SARS-CoV-2 preincubated with different sera were then imaged at 48 hours post infection with a fluorescence microscope (FIG. 7A) and corresponding infectivity shown by the percentage of GFP$^+$ cells was measured by flow cytometry (FIG. 7B). (FIG. 7C) The neutralization assay against live B.1.1.7 virus strain infection of the sera from vaccinated mice at indicated dilution ratios.

(FIGS. 9A-9B) The neutralization assay against live wild type strain (FIG. 9A) and B.1.1.7 virus strain (FIG. 9B) infection of the sera from vaccinated mice bearing tumors at indicated dilution ratios.

(FIG. 10A) Anti-S antibody production of the sera collected from OV-spike vaccinated mice bearing ID8 tumor or MC38 tumor were assessed at day 7, 14, 21, 28 and 35 serum ELISA. (FIG. 10B) neutralization function against VSV-SARS-CoV-2 infection of sera from OV-spike-immunized mice with or without tumor. Error bars represent standard deviations. Data in FIGS. 10A-10B are shown in mean with SD. Paired t-test with two-tail was applied (FIG. 10A).

Figure 10A:
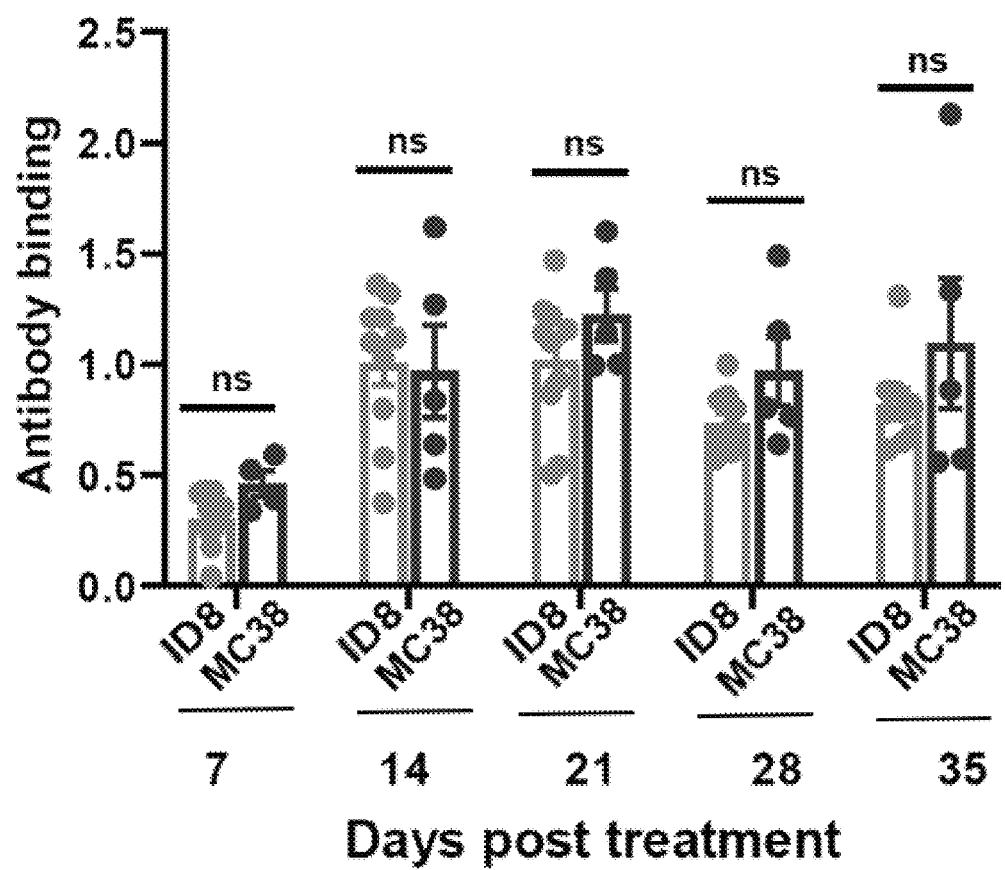
FIGS. 10A-10B: No significant difference of anti-S specific antibody production between the tumor models.
Figure 10B:
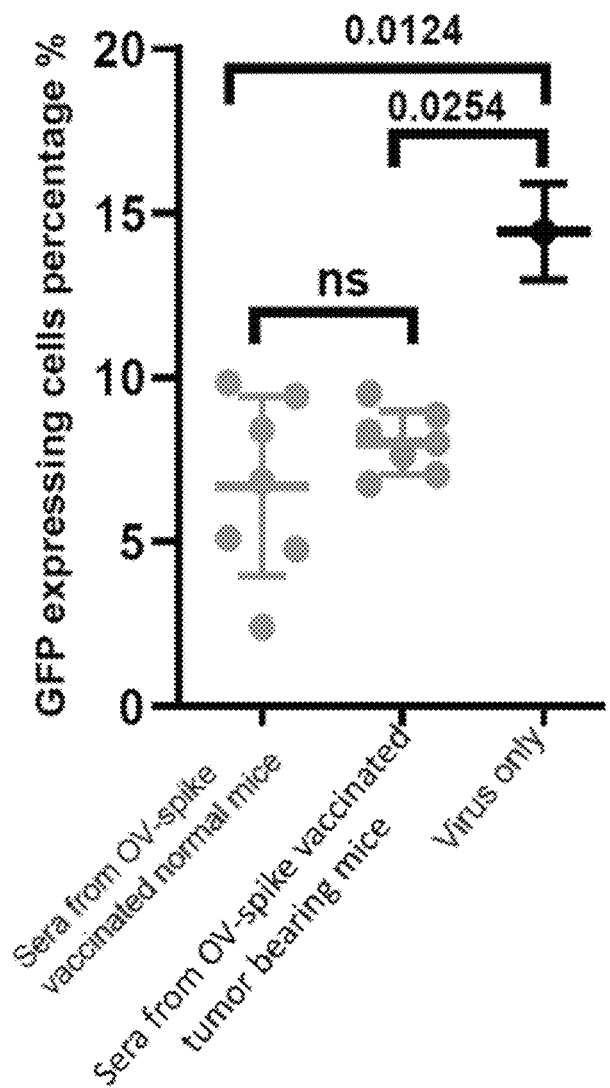

One-way ANOVA was applied to compare the mean of each column with the mean of every other column with Holm-Sidak test (FIG. 10B).

Figure 11A:
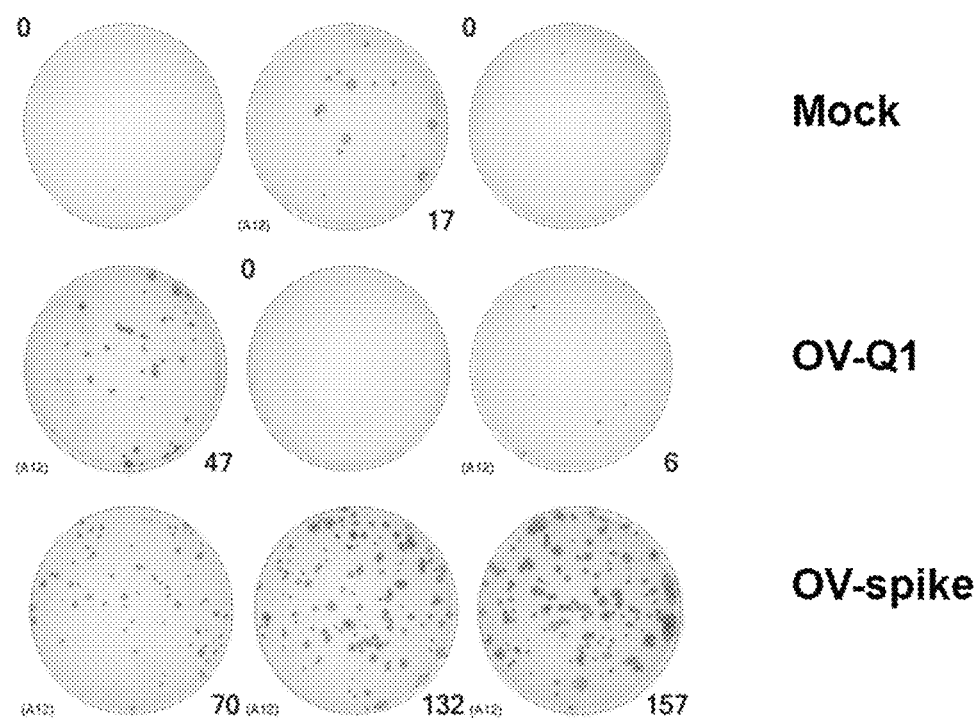
Figure 11B:
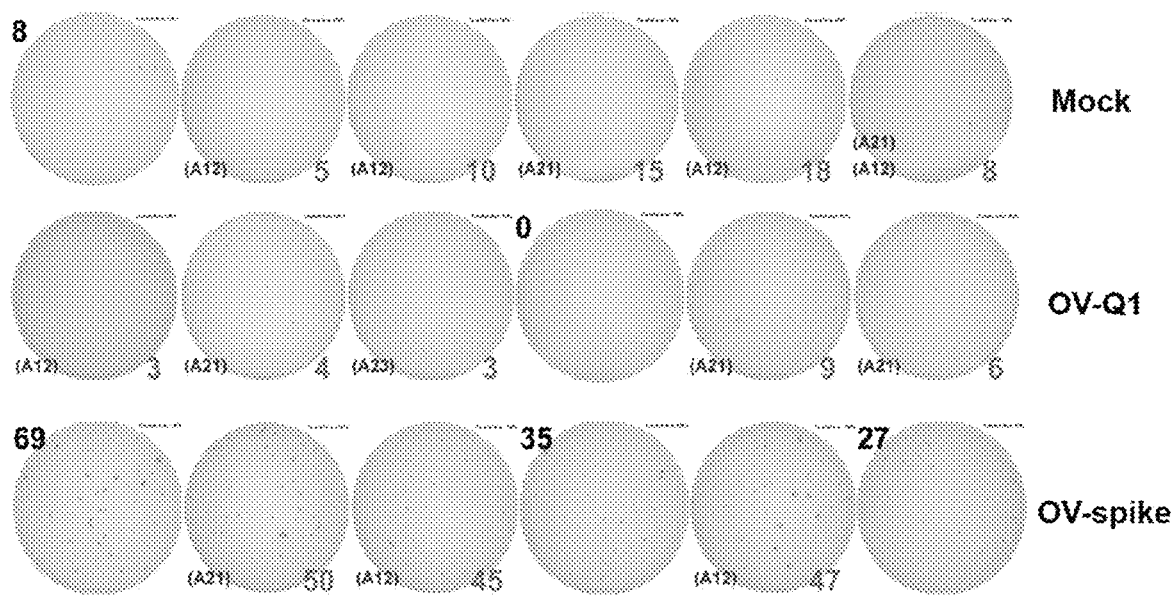

FIGS. 11A-11B: ELISpot assay of vaccinated mice with or without tumors. Ex vivo antigen-stimulated T cells were analyzed of sera from vaccinated mice without tumor (FIG. 11A) or with tumor (FIG. 11B). Numbers to the lower right of each image indicate the number of spots per well.

Figure 12A:
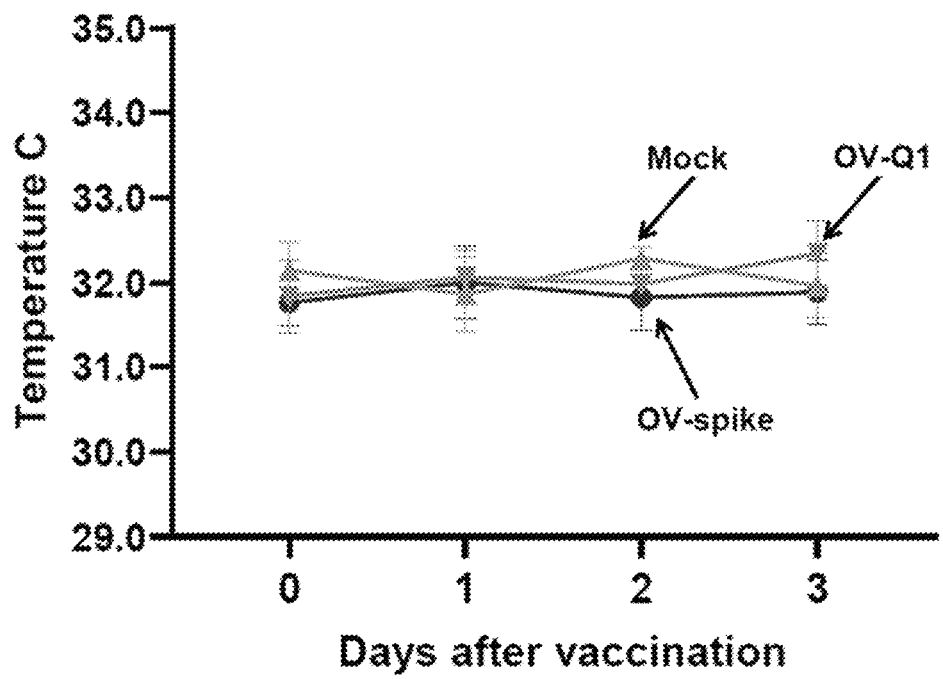
Figure 12B:
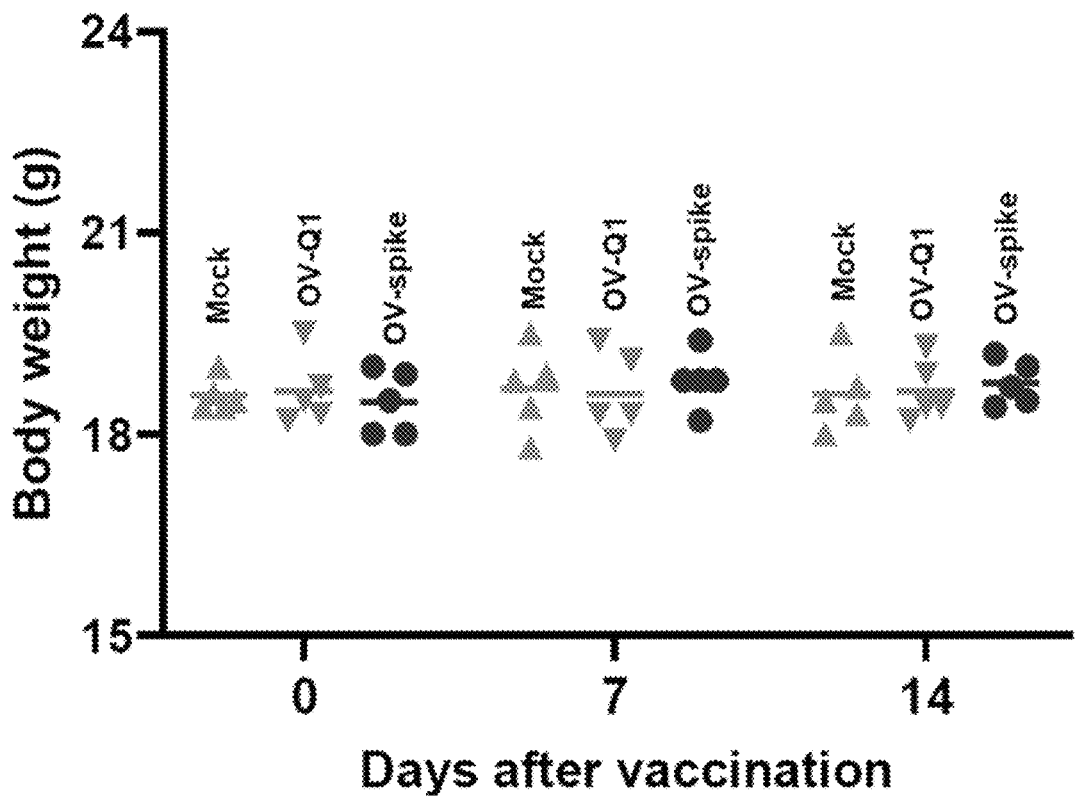
Figure 12C:
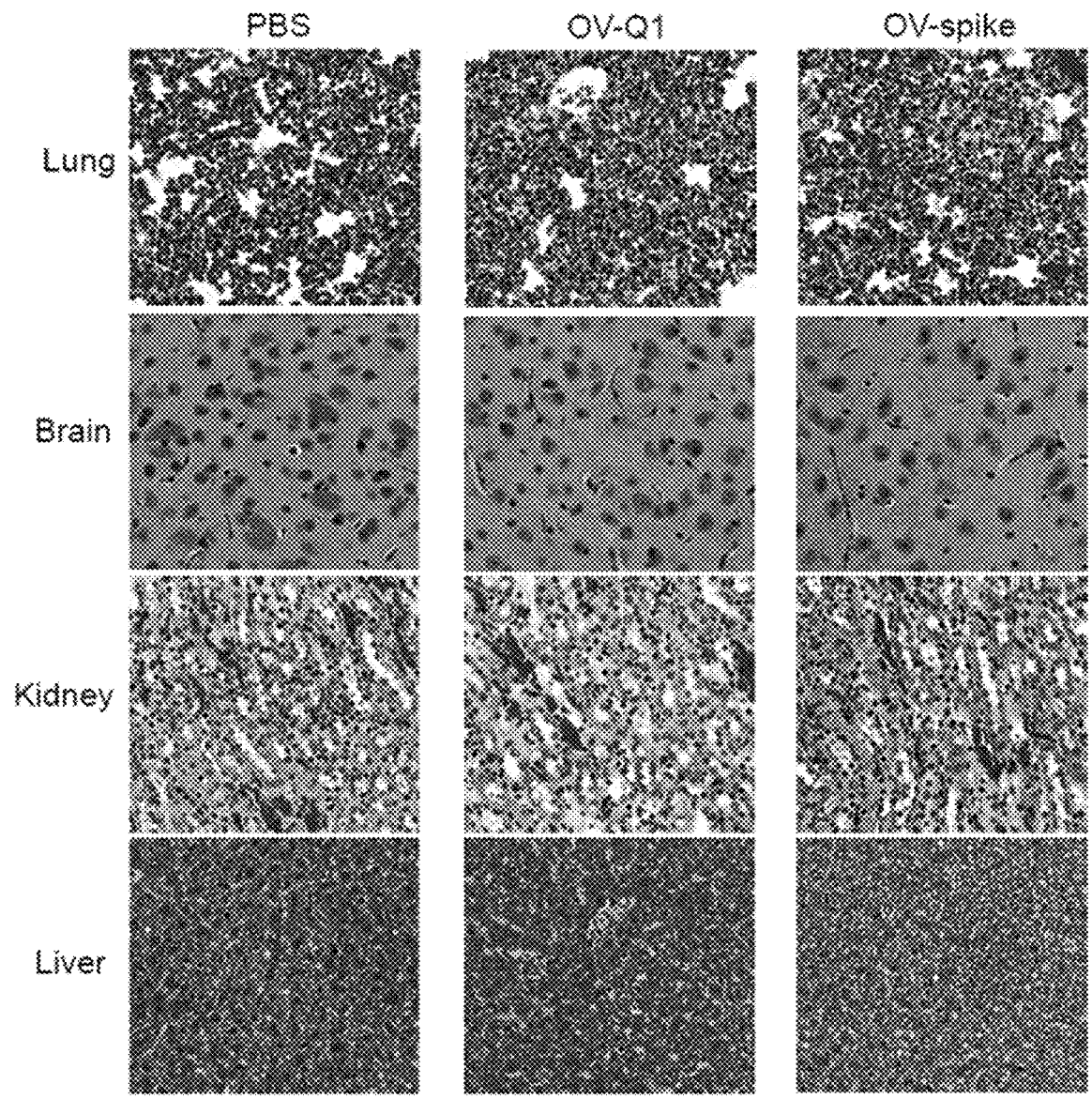

FIGS. 12A-12C: Lack of effect of OV-spike on mouse body temperature and body weight. (FIGS. 12A-12B) Body temperature (FIG. 12A) and body weight (FIG. 12B) of mice were measured after mock, OV-Q1 and OV-spike vaccination. (FIG. 12C) Immunohistochemistry staining of different tissues after mock, OV-Q1 and OV-spike injection.

DETAILED DESCRIPTION

Definitions

The abbreviations used herein have their conventional meaning within the chemical and biological arts.

The term "vaccine" is used according to its plain ordinary meaning within medicine and immunology and refers to a composition including an antigenic component for administration to a subject (e.g. human), wherein the antigenic component elicits an immune response in the subject. The immune response stimulates the body's immune system to recognize the antigenic component as a threat or indication of the presence of a target pathogen or disease, thereby inducing immunological memory so that the immune system can more easily recognize and destroy any of the pathogen on subsequent exposure. Vaccines can be prophylactic (e.g. preventing or ameliorating the effects of a future infection by any natural or pathogen, or of an anticipated occurrence of cancer in a predisposed subject) or therapeutic (e.g., treating cancer in a subject who has been diagnosed with the cancer). In embodiments, a vaccine is a therapeutic. In embodiments, a vaccine is prophylactic. In embodiments a vaccine includes one or more adjuvants.

The term "adjuvant" is used in accordance with its plain ordinary meaning within Immunology and refers to a substance that is commonly used as a component of a vaccine. Adjuvants may increase an antigen specific immune response in a subject when administered to the subject with one or more specific antigens as part of a vaccine. In embodiments, an adjuvant accelerates an immune response to an antigen. In embodiments, an adjuvant prolongs an immune response to an antigen. In embodiments, an adjuvant enhances an immune response to an antigen.

The terms "virus" or "virus particle" are used according to its plain ordinary meaning within virology and refers to a virion including the viral genome (e.g. DNA, RNA, single strand, double strand), viral capsid and associated proteins, and in the case of enveloped viruses (e.g. herpes virus), an envelope including lipids and optionally components of host cell membranes, and/or viral proteins.

The term "replicate" is used in accordance with its plain ordinary meaning and refers to the ability of a cell or virus to produce progeny. A person of ordinary skill in the art will immediately understand that the term replicate when used in connection with DNA, refers to the biological process of producing two identical replicas of DNA from one original DNA molecule. In the context of a virus, the term "replicate" includes the ability of a virus to replicate (duplicate the viral genome and packaging said genome into viral particles) in a host cell and subsequently release progeny viruses from the host cell, which results in the lysis of the host cell. A "replication-competent" virus as provided herein refers to a virus (herpes virus) that is capable of replicating in a cell (e.g., a cancer cell).

The term "oncolytic virus" is used in accordance with its plain ordinary meaning and refers to a virus that preferentially infects and kills cancer cells. As the infected cancer cells are destroyed by oncolysis (directly lysing cells), they release new infectious virus particles or virions to help destroy the remaining tumor. Oncolytic viruses are thought not only to cause direct destruction of the tumor cells, but also to stimulate host anti-tumor immune system responses. Oncolytic viruses include adenovirus, reovirus, measles, herpes simplex, Newcastle disease virus, vaccinia, and the senecavirus.

The term "recombinant" when used with reference, e.g., to a virus, cell, nucleic acid, protein, or vector, indicates that the virus, cell, nucleic acid, protein or vector, has been modified by the introduction of a heterologous nucleic acid or protein or the alteration of a native nucleic acid or protein, or that the cell is derived from a cell so modified. The term "recombinant virus" is a virus produced by recombining pieces of nucleic acid (e.g. DNA) using recombinant nucleic acid technology. For example, a recombinant virus may be generated by replacing one or more viral genes with an exogenous gene. For example, a recombinant virus may be generated by replacing a viral promoter with an exogenous promoter. Thus, in embodiments, the virus provided herein including embodiments thereof is a recombinant virus. In instances, recombinant cells express genes that are not found within the native (non-recombinant) form of the cell or express native genes that are otherwise abnormally expressed, under expressed or not expressed at all. A "recombinant oncolytic virus" is an oncolytic virus produced by recombining pieces of nucleic acid (e.g. DNA) using recombinant nucleic acid technology.

The term "herpes simplex virus" or "HSV" refers to members of the Herpesviridae family. Herpes simplex virus 1 and 2 (HSV-1 and HSV-2) are two members of the human Herpesviridae family, a set of viruses that produce viral infections in the majority of humans. The Herpesviridae are a large family of DNA viruses that all share a common structure and are composed of relatively large double-stranded, linear DNA genomes encoding 100-200 genes encapsidated within an icosahedral capsid which is enveloped in a lipid bilayer membrane (e.g. viral envelope). The oncolytic herpes virus can be derived from different types of HSV. In aspects, the oncolytic herpes virus is HSV-1. In aspects, the oncolytic herpes virus is HSV-2. The herpes virus may be genetically modified so as to restrict viral replication in tumors or reduce its cytotoxicity in non-dividing cells.

The term "γ34.5 gene" or "gamma-34.5 gene" or "34.5 gene" is used in accordance with its plain ordinary meaning and refers to a gene related to pathogenicity of HSV-1, and a virus mutant obtained by deleting this gene has markedly reduced virus replication ability in normal cells. In aspects, the γ34.5 gene is any of the recombinant or naturally-occurring forms of the γ34.5 gene or variants or homologs thereof that code for a γ34.5 polypeptide (e.g. neurovirulence protein ICP34.5) capable of maintaining the activity of the γ34.5 polypeptide (e.g., within at least 50%, 80%, 90%, 95%, 96%, 97%, 98%, 99% or 100% activity compared to γ34.5 polypeptide). In some aspects, the variants or homologs have at least 90%, 95%, 96%, 97%, 98%, 99% or 100% nucleic acid sequence identity across the whole sequence or a portion of the sequence (e.g., a 50, 100, 150 or 200 continuous nucleic acid portion) compared to a naturally occurring γ34.5 gene. In embodiments, the γ34.5 gene is substantially identical to the nucleic acid sequence corresponding to position 124834-125861 of the nucleic acid sequence identified by Accession No. NC 001806.2 or a variant or homolog having substantial identity thereto.

The term "ICP6" or "ICP6 gene" is used in accordance with its plain ordinary meaning and refers to a gene that encodes a viral ribonucleotide reductase (vRR). ICP6 is the large subunit of ribonucleotide reductase (RR) and a key enzyme for nucleotide metabolism and viral DNA synthesis in non-dividing cells. In aspects, the ICP6 gene is any of the recombinant or naturally-occurring forms of the ICP6 gene or variants or homologs thereof that code for a ICP6 (e.g. ribonucleoside-diphosphate reductase) polypeptide capable of maintaining the activity of the ICP6 polypeptide (e.g., within at least 50%, 80%, 90%, 95%, 96%, 97%, 98%, 99% or 100% activity compared to ICP6 polypeptide). In some aspects, the variants or homologs have at least 90%, 95%, 96%, 97%, 98%, 99% or 100% nucleic acid sequence identity across the whole sequence or a portion of the sequence (e.g., a 50, 100, 150 or 200 continuous nucleic acid portion) compared to a naturally occurring ICP6 gene. In embodiments, the ICP6 gene is substantially identical to the nucleic acid sequence corresponding to position 86443-90987 of the nucleic acid sequence identified by Accession No. NC_001806.2 or a variant or homolog having substantial identity thereto.

The term "glycoprotein D" or "gD" refers to a structural component of the herpes simplex virus envelope which is essential for virus entry into host cells. gD may be derived from HSV-1. In embodiments, glycoprotein D comprises the glycoprotein D transmembrane domain. In embodiments, glycoprotein D comprises the glycoprotein D transmembrane domain and intracellular domain. Glycoprotein D (gD) can be any of the recombinant or naturally-occurring forms of glycoprotein D protein, or variants or homologs thereof that maintain glycoprotein D activity (e.g. within at least 50%, 80%, 90%, 95%, 96%, 97%, 98%, 99% or 100% activity compared to glycoprotein D). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring glycoprotein D protein. In embodiments, the glycoprotein D protein is substantially identical to the protein identified by the UniProt reference number Q69091 or a variant or homolog having substantial identity thereto.

"Spike (S) protein" or "SARS-CoV spike (S) protein" refers to the viral spike (S) protein of a coronavirus which binds to the cellular angiotensin-converting enzyme 2 receptor protein, and includes any of the recombinant or naturally-occurring forms of the viral spike (S) protein or variants or homologs thereof that maintain viral spike (S) protein activity (e.g., within at least 50%, 80%, 90%, 95%, 96%, 97%, 98%, 99% or 100% activity compared to spike (S) protein). In aspects, the variants or homologs have at least 75%, 76%, 77%, 78%, 79%, 80%, 81%, 82%, 83%, 84% 85%, 86%, 87%, 88%, 89%, 90%, 91%, 92%, 93%, 94%, 95%, 96%, 97%, 98%, 99% or 100% amino acid sequence identity across the whole sequence or a portion of the sequence (e.g. a 50, 100, 150, continuous amino acid portion) compared to a naturally occurring spike (S) protein. In aspects, the spike (S) protein is encoded by the nucleic acid identified as SEQ ID NO:1 or a variant or homolog having substantial identity thereto. In aspects, the spike (S) protein is a conservatively modified variant of the protein encoded by the nucleic acid identified as SEQ ID NO:1. In aspects, the spike (S) protein is substantially identical to the protein identified as SEQ ID NO:3 or a variant or homolog having substantial identity thereto. In aspects, the spike (S) protein is a conservatively modified variant of the protein identified as SEQ ID NO:3. In aspects, the spike (S) protein has one or more mutations. In aspects, the spike (S) protein has one or more mutations at positions corresponding to K417, N439, E484, F490, and N501 of SEQ ID NO:3.

A "transmembrane domain" as provided herein refers to a polypeptide forming part of a biological membrane (e.g., a viral envelope, a lipid bilayer, a cellular membrane, etc.). In embodiments, the biological membrane is a viral envelope (e.g. a HSV viral envelope, an oHSV viral envelope). In embodiments, the biological membrane is a cell membrane. The transmembrane domain provided herein is capable of spanning a biological membrane from one side of the membrane through to the other side of the membrane. Transmembrane domains may include non-polar, hydrophobic residues, which anchor the proteins provided herein including embodiments thereof in a biological membrane. In embodiments, the transmembrane domain (e.g. glycoprotein D transmembrane domain) is capable of anchoring a protein (e.g. SARS-CoV spike (S) protein) to a viral envelope (e.g. a HSV envelope, an oHSV envelope). For example, a transmembrane domain may anchor a protein to a viral particle (e.g. a HSV particle, an oHSV particle). In embodiments, the transmembrane domain is a glycoprotein D transmembrane domain.

An "intracellular domain" or "cytoplasmic domain" as provided herein refers to a polypeptide that projects into the interior of a virus or cell enclosed within a biological membrane (e.g., a viral envelope, a lipid bilayer, a cellular membrane, etc.). In embodiments, the intracellular domain is glycoprotein D transmembrane domain. The intracellular domain of a protein may be anchored to the interior of a biological membrane by way of a transmembrane domain. For example, glycoprotein D intracellular domain may be anchored to the interior of a membrane (e.g. viral envelope) of an oHSV particle by way of the glycoprotein D transmembrane domain.

"SARS" refers to severe acute respiratory syndrome. "SARS-CoV" refers to severe acute respiratory syndrome-associated coronavirus. The term SARS-CoV includes any coronavirus, such as SARS-CoV-2, SARS-CoV-1, and MERS-CoV. "SARS-CoV-1" refers to severe acute respiratory syndrome-associated coronavirus 1. "SARS-CoV-2" refers to severe acute respiratory syndrome-associated coronavirus 2.

"COVID-19" refers to the disease caused by SARS-CoV-2. COVID-19 has an incubation period of 2-14 days, and symptoms include, e.g., fever, tiredness, cough, and difficulty breathing.

"MERS-CoV" refers to Middle Eastern respiratory syndrome-associated coronavirus. See, e.g., Chung et al, Emerging Infectious Diseases, 25(5):958-962 (2019). "Middle Eastern respiratory syndrome" or "MERS" refers to the disease caused by MERS-CoV.

The term "plaque forming units" is used according to its plain ordinary meaning in virology and refers to a unit of measurement based on the number of plaques per unit volume of a sample. In embodiments, the units are based on the number of plaques that could form when infecting a monolayer of susceptible cells. For example, in embodiments 1,000 PFU/μl indicates that 1 μl of a solution including viral particles contains enough virus particles to produce 1000 infectious plaques in a cell monolayer. Plaque forming unit equivalents are units of measure of inactivated virus. In embodiments, plaque forming unit equivalents are derived from plaque forming units for a sample prior to inactivation. In embodiments, plaque forming units are abbreviated "PFU".

The term "adaptive immune response" refers to a subsystem of the overall immune system that is composed of specialized, systemic cells and processes that eliminate designated targets. The targets are designated by identification via immunological memory. Immunological memory is created when the immune system had previously encountered the immune assault, and retained a record of it.

The term "immunogenic" or "antigenic" refers to a compound or composition that induces an immune response, e.g., cytotoxic T lymphocyte (CTL) response, a B cell response (for example, production of antibodies that specifically bind the epitope), an NK cell response or any combinations thereof, when administered to an immunocompetent subject. Thus, an immunogenic or antigenic composition is a composition capable of eliciting an immune response in an immunocompetent subject. For example, an immunogenic or antigenic composition can include one or more immunogenic epitopes associated with a pathogen or a specific type of cells that is targeted by the immune response. In addition, an immunogenic composition can include isolated nucleic acid constructs (such as DNA or RNA) that encode one or more immunogenic epitopes of the antigenic polypeptide that can be used to express the epitope(s) (and thus be used to elicit an immune response against this polypeptide or a related polypeptide associated with the targeted pathogen or type of cells).

The terms "natural killer cells" and "NK cells" are used in accordance with their plain ordinary meaning and refer to a type of cytotoxic lymphocyte involved in the innate immune system. The role NK cells play is typically analogous to that of cytotoxic T cells in the vertebrate adaptive immune response. NK cells may provide rapid responses to virus-infected cells, acting at around 3 days after infection, and respond to tumor formation. Typically, immune cells detect major histocompatibility complex presented on infected cell surfaces, triggering cytokine release, causing lysis or apoptosis. NK cells typically have the ability to recognize stressed cells in the absence of antibodies and WIC, allowing for a much faster immune reaction.

The term "T cells" or "T lymphocytes" are used in accordance with their plain ordinary meaning and refer to a type of lymphocyte (a subtype of white blood cell) involved in cell-mediated immunity. They can be distinguished from other lymphocytes, such as B cells and natural killer cells, by the presence of a T-cell receptor on the cell surface. T cells include, for example, natural killer T cells, cytotoxic T lymphocytes, regulatory T cells, and T helper cells. Different types of T cells can be distinguished by use of T cell detection agents.

The terms "identical" or percent "identity," in the context of two or more nucleic acids or polypeptide sequences, refer to two or more sequences or subsequences that are the same or have a specified percentage of amino acid residues or nucleotides that are the same (i.e., about 60% identity, preferably 65%, 70%, 75%, 80%, 85%, 90%, 91%, 92%, 93%, 94%, 95%, 96%, 97%, 98%, 99%, or higher identity over a specified region, when compared and aligned for maximum correspondence over a comparison window or designated region) as measured using a BLAST or BLAST 2.0 sequence comparison algorithms with default parameters described below, or by manual alignment and visual inspection (e.g., NCBI web site www.ncbi.nlm.nih.gov/BLAST/ or the like). Such sequences are then said to be "substantially identical." This definition also refers to, or may be applied to, the compliment of a test sequence. The definition also includes sequences that have deletions and/or additions, as well as those that have substitutions. As described below, the preferred algorithms can account for gaps and the like. Preferably, identity exists over a region that is at least about 25 amino acids or nucleotides in length, or more preferably over a region that is 50-100 amino acids or nucleotides in length.

As used herein, the term "expression" is used in accordance with its plain ordinary meaning and refers to any step involved in the production of a polypeptide including, but not limited to, transcription, post-transcriptional modification, translation, post-translational modification, and secretion. Expression can be detected using conventional techniques for detecting protein (e.g., ELISA, Western blotting, flow cytometry, immunofluorescence, immunohistochemistry, etc.).

As used herein, the term "expression cassette" refers to a distinct component of vector DNA consisting of a gene and regulatory sequence to be expressed by a transfected cell. In each successful transformation, the expression cassette directs the cell's machinery to make RNA and protein(s). Some expression cassettes are designed for modular cloning of protein-encoding sequences so that the same cassette can easily be altered to make different proteins. An expression cassette is composed of one or more genes and the sequences (e.g. promoter, enhancer, regulatory element, etc.) controlling their expression. An expression cassette comprises three components: a promoter sequence, an open reading frame, and a 3' untranslated region that, in eukaryotes, usually contains a polyadenylation site. Different expression cassettes can be transfected into different organisms including bacteria, yeast, plants, and mammalian cells as long as the correct regulatory sequences are used.

As used herein, the term "inactivating mutation" indicates a mutation or alteration to a gene wherein the expression of that gene is significantly decreased, or wherein the gene product is rendered nonfunctional, or its ability to function is significantly decreased.

As used herein the term "inactivating deletion" refers to a deletion of the whole or portion of the gene or suppression of expression of the gene through substitution of some bases, modification, insertion of an unnecessary sequence or the like.

A "gene," or a "sequence which encodes" a particular protein, is a nucleic acid molecule which is transcribed (in the case of DNA) and translated (in the case of mRNA) into a polypeptide in vitro or in vivo when placed under the control of appropriate regulatory sequences. The boundaries of the gene are determined by a start codon at the 5' (amino) terminus and a translation stop codon at the 3' (carboxy) terminus. A gene can include, but is not limited to, cDNA from eukaryotic mRNA, genomic DNA sequences from eukaryotic DNA, and even synthetic DNA sequences. A transcription termination sequence will usually be located 3' to the gene sequence. Typically, polyadenylation signal is provided to terminate transcription of genes inserted into a recombinant virus.

As used herein, the term "vector" refers to a nucleic acid molecule capable of transporting another nucleic acid to which it has been linked. One type of vector is a "plasmid", which refers to a linear or circular double stranded DNA loop into which additional DNA segments can be ligated. Another type of vector is a viral vector, wherein additional DNA segments can be ligated into the viral genome (e.g HSV viral genome). Certain vectors are capable of autonomous replication in a host cell into which they are introduced (e.g., bacterial vectors having a bacterial origin of replication and episomal mammalian vectors). Other vectors (e.g., non episomal mammalian vectors) are integrated into the genome of a host cell upon introduction into the host cell, and thereby are replicated along with the host genome. Moreover, certain vectors are capable of directing the expression of genes to which they are operatively linked. Such vectors are referred to herein as "expression vectors." Expression vectors of utility in recombinant DNA techniques may be in the form of plasmids. Thus, a plasmid or expression vector includes nucleic acid molecules that encode for genes and/or regulatory elements necessary for the expression of genes. Expression of a gene from a plasmid can occur in cis or in trans. If a gene is expressed in cis, the gene and the regulatory elements are encoded by the same plasmid. Expression in trans refers to the instance where the gene and the regulatory elements are encoded by separate plasmids. The terms "plasmid" and "vector" can be used interchangeably. In embodiments, the expression vector is a viral vector (e.g., replication defective retroviruses, adenoviruses and adeno-associated viruses, herpes simplex viruses). Some viral vectors are capable of targeting a particular cells type either specifically or non-specifically. Exemplary vectors that can be used include, but are not limited to, pEvol vector, pMP vector, pET vector, pTak vector, pBad vector.

The term "promoter" refers to a nucleic acid sequence that regulates, either directly or indirectly, the transcription of a corresponding nucleic acid coding sequence to which it is operably linked. The promoter may function alone to regulate transcription, or, in some cases, may act in concert with one or more other regulatory sequences such as an enhancer or silencer to regulate transcription of the transgene. The promoter comprises a DNA regulatory sequence, wherein the regulatory sequence is derived from a gene, which is capable of binding RNA polymerase and initiating transcription of a downstream (3'-direction) coding sequence.

The terms "transfection", "transduction", "transfecting" or "transducing" can be used interchangeably and are defined as a process of introducing a nucleic acid molecule or a protein to a cell. Nucleic acids are introduced to a cell using non-viral or viral-based methods. The nucleic acid molecules may be gene sequences encoding complete proteins or functional portions thereof. Non-viral methods of transfection include any appropriate transfection method that does not use viral DNA or viral particles as a delivery system to introduce the nucleic acid molecule into the cell. Exemplary non-viral transfection methods include calcium phosphate transfection, liposomal transfection, nucleofection, sonoporation, transfection through heat shock, magnetifection and electroporation. In aspects, the nucleic acid molecules are introduced into a cell using electroporation following standard procedures well known in the art. For viral-based methods of transfection any useful viral vector may be used in the methods described herein. Examples for viral vectors include, but are not limited to herpes simplex virus (HSV), retroviral, adenoviral, lentiviral and adeno-associated viral vectors. In aspects, the nucleic acid molecules are introduced into a cell using a HSV viral vector following standard procedures well known in the art. The terms "transfection" or "transduction" also refer to introducing proteins into a cell from the external environment. Typically, transduction or transfection of a protein relies on attachment of a peptide or protein capable of crossing the cell membrane to the protein of interest. See, e.g., Ford et al. (2001) Gene Therapy 8:1-4 and Prochiantz (2007) Nat. Methods 4:119-20.

The term "isolated", when applied to a nucleic acid or protein, denotes that the nucleic acid or protein is essentially free of other cellular components with which it is associated in the natural state. It can be, for example, in a homogeneous state and may be in either a dry or aqueous solution. Purity and homogeneity are typically determined using analytical chemistry techniques such as polyacrylamide gel electrophoresis or high performance liquid chromatography. A protein that is the predominant species present in a preparation is substantially purified.

The terms "bind", "bound", "binding", and other verb forms thereof are used in accordance with their plain ordinary meaning within enzymology and biochemistry and refer to the formation of one or more interactions or contacts between two compositions that may optionally interact. Binding may be intermolecular or intramolecular.

As may be used herein, the terms "nucleic acid," "nucleic acid molecule," "nucleic acid oligomer," "oligonucleotide," "nucleic acid sequence," "nucleic acid fragment" and "polynucleotide" are used interchangeably and are intended to include, but are not limited to, a polymeric form of nucleotides covalently linked together that may have various lengths, either deoxyribonucleotides or ribonucleotides, or analogs, derivatives or modifications thereof. Different polynucleotides may have different three-dimensional structures, and may perform various functions, known or unknown. Non-limiting examples of polynucleotides include a gene, a gene fragment, an exon, an intron, intergenic DNA (including, without limitation, heterochromatic DNA), messenger RNA (mRNA), transfer RNA, ribosomal RNA, a ribozyme, cDNA, a recombinant polynucleotide, a branched polynucleotide, a plasmid, a vector, isolated DNA of a sequence, isolated RNA of a sequence, a nucleic acid probe, and a primer. Polynucleotides useful in the methods of the disclosure may comprise natural nucleic acid sequences and variants thereof, artificial nucleic acid sequences, or a combination of such sequences.

"Nucleic acid" or "oligonucleotide" or "polynucleotide" or grammatical equivalents used herein means at least two nucleotides covalently linked together. The term "nucleic acid" includes single-, double-, or multiple-stranded DNA, RNA and analogs (derivatives) thereof. Oligonucleotides are typically from about 5, 6, 7, 8, 9, 10, 12, 15, 25, 30, 40, 50 or more nucleotides in length, up to about 100 nucleotides in length. Nucleic acids and polynucleotides are a polymers of any length, including longer lengths, e.g., 200, 300, 500, 1000, 2000, 3000, 5000, 7000, 10,000, etc. In embodiments, the nucleic acids herein contain phosphodiester bonds. In embodiments, nucleic acid analogs are included that may have alternate backbones, comprising, e.g., phosphoramidate, phosphorothioate, phosphorodithioate, or O-methylphosphoroamidite linkages (see Eckstein, Oligonucleotides and Analogues: A Practical Approach, Oxford University Press); and peptide nucleic acid backbones and linkages. Other analog nucleic acids include those with positive backbones; non-ionic backbones, and non-ribose backbones, including those described in U.S. Pat. Nos. 5,235,033 and 5,034,506, and Chapters 6 and 7, ASC Symposium Series 580, *Carbohydrate Modifications in Antisense Research*, Sanghui & Cook, eds. Nucleic acids containing one or more carbocyclic sugars are also included within one definition of nucleic acids. Modifications of the ribose-phosphate backbone may be done for a variety of reasons, e.g., to increase the stability and half-life of such molecules in physiological environments or as probes on a biochip. Mixtures of naturally occurring nucleic acids and analogs can be made; alternatively, mixtures of different nucleic acid analogs, and mixtures of naturally occurring nucleic acids and analogs may be made.

A particular nucleic acid sequence also encompasses "splice variants." Similarly, a particular protein encoded by a nucleic acid encompasses any protein encoded by a splice variant of that nucleic acid. "Splice variants," as the name suggests, are products of alternative splicing of a gene. After transcription, an initial nucleic acid transcript may be spliced such that different (alternate) nucleic acid splice products encode different polypeptides. Mechanisms for the production of splice variants vary, but include alternate splicing of exons. Alternate polypeptides derived from the same nucleic acid by read-through transcription are also encompassed by this definition. Any products of a splicing reaction, including recombinant forms of the splice products, are included in this definition.

Nucleic acid is "operably linked" when it is placed into a functional relationship with another nucleic acid sequence. For example, DNA for a pre-sequence or secretory leader is operably linked to DNA for a polypeptide if it is expressed as a preprotein that participates in the secretion of the polypeptide; a promoter or enhancer is operably linked to a coding sequence if it affects the transcription of the sequence; or a ribosome binding site is operably linked to a coding sequence if it is positioned so as to facilitate translation. Generally, "operably linked" means that the DNA sequences being linked are near each other, and, in the case of a secretory leader, contiguous and in reading phase. However, enhancers do not have to be contiguous. Linking is accomplished by ligation at convenient restriction sites. If such sites do not exist, then synthetic oligonucleotide adaptors or linkers are used in accordance with conventional practice.

"Nucleic acid" refers to nucleotides (e.g., deoxyribonucleotides or ribonucleotides) and polymers thereof in either single-, double- or multiple-stranded form, or complements thereof. The terms "polynucleotide," "oligonucleotide," "oligo" or the like refer, in the usual and customary sense, to a linear sequence of nucleotides. The term "nucleotide" refers, in the usual and customary sense, to a single unit of a polynucleotide, i.e., a monomer. Nucleotides can be ribonucleotides, deoxyribonucleotides, or modified versions thereof. Examples of nucleic acids contemplated herein include single and double stranded DNA, single and double stranded RNA, and hybrid molecules having mixtures of single and double stranded DNA and RNA. Examples of nucleic acids contemplated herein include any types of RNA (e.g., antisense RNA, mRNA, siRNA, miRNA, shRNA, guide RNA, dicer substrate RNA, dicer substrate siRNAs (dsiRNAs) (dsiRNA are cleaved by the RNase III class endoribonuclease dicer into 21-23 base duplexes having 2-base 3'-overhangs siRNA), and any type of DNA, genomic DNA, plasmid DNA, and minicircle DNA, and any fragments thereof. The term "duplex" in the context of nucleic acids refers, in the usual and customary sense, to double strandedness. Nucleic acids can be linear or branched. For example, nucleic acids can be a linear chain of nucleotides or the nucleic acids can be branched, e.g., such that the nucleic acids comprise one or more arms or branches of nucleotides. Optionally, the branched nucleic acids are repetitively branched to form higher ordered structures such as dendrimers and the like.

The terms also encompass nucleic acids containing known nucleotide analogs or modified backbone residues or linkages, which are synthetic, naturally occurring, and non-naturally occurring, which have similar binding properties as the reference nucleic acid, and which are metabolized in a manner similar to the reference nucleotides. Examples of such analogs include, include, without limitation, phosphodiester derivatives including, e.g., phosphoramidate, phosphorodiamidate, phosphorothioate (also known as phosphorothioate having double bonded sulfur replacing oxygen in the phosphate), phosphorodithioate, phosphonocarboxylic acids, phosphonocarboxylates, phosphonoacetic acid, phosphonoformic acid, methyl phosphonate, boron phosphonate, or O-methylphosphoroamidite linkages (see Eckstein, Oligonucleotides and Analogues: A Practical Approach, Oxford University Press) as well as modifications to the nucleotide bases such as 2'O-methyl, 2'O-methoxyethoxy, 2'fluoro, 5-methyl cytidine or pseudouridine; and peptide nucleic acid backbones and linkages. Other analog nucleic acids include those with positive backbones; non-ionic backbones, modified sugars (e.g., deoxyribose), and non-ribose backbones (e.g. phosphorodiamidate morpholino oligos or locked nucleic acids (LNA) as known in the art), including those described in U.S. Pat. Nos. 5,235,033 and 5,034,506, and Chapters 6 and 7, ASC Symposium Series 580, Carbohydrate Modifications in Antisense Research, Sanghui & Cook, eds. Nucleic acids containing one or more carbocyclic sugars are also included within one definition of nucleic acids. Modifications of the ribose-phosphate backbone may be done for a variety of reasons, e.g., to increase the stability and half-life of such molecules in physiological environments or as probes on a biochip. Mixtures of naturally occurring nucleic acids and analogs can be made; alternatively, mixtures of different nucleic acid analogs, and mixtures of naturally occurring nucleic acids and analogs may be made. In aspects, the internucleotide linkages in DNA are phosphodiester, phosphodiester derivatives, or a combination of both.

Nucleic acids, including e.g., nucleic acids with a phosphothioate backbone, can include one or more reactive moieties. As used herein, the term reactive moiety includes any group capable of reacting with another molecule, e.g., a nucleic acid or polypeptide through covalent, non-covalent or other interactions. By way of example, the nucleic acid can include an amino acid reactive moiety that reacts with an amio acid on a protein or polypeptide through a covalent, non-covalent or other interaction.

Nucleic acids can include nonspecific sequences. As used herein, the term "nonspecific sequence" refers to a nucleic acid sequence that contains a series of residues that are not designed to be complementary to or are only partially complementary to any other nucleic acid sequence. By way of example, a nonspecific nucleic acid sequence is a sequence of nucleic acid residues that does not function as an inhibitory nucleic acid when contacted with a cell or organism.

"Hybridize" and "hybridization" refer to the pairing of complementary (including partially complementary) nucleic acid strands. Hybridization and the strength of hybridization (e.g., the strength of the association between nucleic acid strands) is impacted by factors known in the art including the degree of complementarity between the nucleic acid, stringency of the conditions involved affected by such conditions as the concentration of salts, the melting temperature (Tm) of the formed hybrid, the presence of other components, the molarity of the hybridizing strands and the G:C content of the nucleic acid strands. When one nucleic acid is said to "hybridize" to another nucleic acid, it means that there is some complementarity between the two nucleic acids or that the two nucleic acids form a hybrid under high or low stringency conditions.

The term "complement," as used herein, refers to a nucleotide (e.g., RNA or DNA) or a sequence of nucleotides capable of base pairing with a complementary nucleotide or sequence of nucleotides. As described herein and commonly known in the art the complementary (matching) nucleotide of adenosine is thymidine and the complementary (matching) nucleotide of guanidine is cytosine. Thus, a complement may include a sequence of nucleotides that base pair with corresponding complementary nucleotides of a second nucleic acid sequence. The nucleotides of a complement may partially or completely match the nucleotides of the second nucleic acid sequence. Where the nucleotides of the complement completely match each nucleotide of the second nucleic acid sequence, the complement forms base pairs with each nucleotide of the second nucleic acid sequence. Where the nucleotides of the complement partially match the nucleotides of the second nucleic acid sequence only some of the nucleotides of the complement form base pairs with nucleotides of the second nucleic acid sequence. Examples of complementary sequences include coding and a non-coding sequences, wherein the non-coding sequence contains complementary nucleotides to the coding sequence and thus forms the complement of the coding sequence. A further example of complementary sequences are sense and antisense sequences, wherein the sense sequence contains complementary nucleotides to the antisense sequence and thus forms the complement of the antisense sequence.

As described herein, the complementarity of sequences may be partial, in which only some of the nucleic acids match according to base pairing, or complete, where all the nucleic acids match according to base pairing. Thus, two sequences that are complementary to each other, may have a specified percentage of nucleotides that are the same (i.e., about 60% identity, preferably 65%, 70%, 75%, 80%, 85%, 90%, 91%, 92%, 93%, 94%, 95%, 96%, 97%, 98%, 99%, or higher identity over a specified region).

"Percentage of sequence identity" is determined by comparing two optimally aligned sequences over a comparison window, wherein the portion of the polynucleotide or polypeptide sequence in the comparison window may comprise additions or deletions (i.e., gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison and multiplying the result by 100 to yield the percentage of sequence identity.

The phrase "hybridization conditions" refers to conditions under which a nucleic acid will hybridize to its target sequence, typically in a complex mixture of nucleic acids, but to no other sequences. Stringent conditions are sequence-dependent and will be different in different circumstances. Longer sequences hybridize specifically at higher temperatures. An extensive guide to the hybridization of nucleic acids is found in Tijssen, Techniques in Biochemistry and Molecular Biology—Hybridization with Nucleic Probes, "Overview of principles of hybridization and the strategy of nucleic acid assays" (1993). Generally, stringent conditions are selected to be about 5-10° C. lower than the thermal melting point ($T_m$) for the specific sequence at a defined ionic strength pH. The $T_m$ is the temperature (under defined ionic strength, pH, and nucleic concentration) at which 50% of the probes complementary to the target hybridize to the target sequence at equilibrium (as the target sequences are present in excess, at $T_m$, 50% of the probes are occupied at equilibrium). Stringent conditions may also be achieved with the addition of destabilizing agents such as formamide. For selective or specific hybridization, a positive signal is at least two times background, preferably 10 times background hybridization. Exemplary hybridization conditions can be as follows: 50% formamide, 5×SSC, and 1% SDS, incubating at 42° C., or 5×SSC, 1% SDS, incubating at 65° C., with wash in 0.2×SSC, and 0.1% SDS at 65° C. For PCR, a temperature of about 36° C. is typical for low stringency amplification, although annealing temperatures may vary between about 32° C. and 48° C. depending on primer length. For PCR amplification, a temperature of about 62° C. is typical, although high stringency annealing temperatures can range from about 50° C. to about 65° C. depending on the primer length and specificity. Typical cycle conditions for both high and low stringency amplifications include a denaturation phase of 90° C.-95° C. for 30 seconds to 2 minutes, an annealing phase lasting 30 seconds to 2 minutes, and an extension phase of about 72° C. for 1-2 min. Protocols and guidelines for low and high stringency amplification reactions are provided, e.g., in Innis et al., PCR Protocols, A Guide to Methods and Applications, Academic Press, Inc. N.Y. (1990).

A polynucleotide is typically composed of a specific sequence of four nucleotide bases: adenine (A); cytosine (C); guanine (G); and thymine (T) (uracil (U) for thymine (T) when the polynucleotide is RNA). Thus, the term "polynucleotide sequence" is the alphabetical representation of a polynucleotide molecule; alternatively, the term may be applied to the polynucleotide molecule itself. This alphabetical representation can be input into databases in a computer having a central processing unit and used for bioinformatics applications such as functional genomics and homology searching. Polynucleotides may optionally include one or more non-standard nucleotide(s), nucleotide analog(s) and/or modified nucleotides.

"Conservatively modified variants" applies to both amino acid and nucleic acid sequences. With respect to particular nucleic acid sequences, "conservatively modified variants" refers to those nucleic acids that encode identical or essentially identical amino acid sequences. Because of the degeneracy of the genetic code, a number of nucleic acid sequences will encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Every nucleic acid sequence herein which encodes a polypeptide also describes every possible silent variation of the nucleic acid. One of skill will recognize that each codon in a nucleic acid (except AUG, which is ordinarily the only codon for methionine, and TGG, which is ordinarily the only codon for tryptophan) can be modified to yield a functionally identical molecule. Accordingly, each silent variation of a nucleic acid which encodes a polypeptide is implicit in each described sequence.

The terms "polypeptide," "peptide" and "protein" are used interchangeably herein to refer to a polymer of amino acid residues, wherein the polymer may in aspects be conjugated to a moiety that does not consist of amino acids. The terms apply to amino acid polymers in which one or more amino acid residue is an artificial chemical mimetic of a corresponding naturally occurring amino acid, as well as to naturally occurring amino acid polymers and non-naturally occurring amino acid polymers. A "fusion protein" refers to a chimeric protein encoding two or more separate protein sequences that are recombinantly expressed as a single moiety.

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. Amino acid mimetics refers to chemical compounds that have a structure that is different from the general chemical structure of an amino acid, but that functions in a manner similar to a naturally occurring amino acid. The terms "non-naturally occurring amino acid" and "unnatural amino acid" refer to amino acid analogs, synthetic amino acids, and amino acid mimetics which are not found in nature.

As to amino acid sequences, one of skill will recognize that individual substitutions, deletions or additions to a nucleic acid, peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art. Such conservatively modified variants are in addition to and do not exclude polymorphic variants, interspecies homologs, and alleles of the disclosure.

The following eight groups each contain amino acids that are conservative substitutions for one another: (1) Alanine (A), Glycine (G); (2) Aspartic acid (D), Glutamic acid (E); (3) Asparagine (N), Glutamine (Q); (4) Arginine (R), Lysine (K); (5) Isoleucine (I), Leucine (L), Methionine (M), Valine (V); (6) Phenylalanine (F), Tyrosine (Y), Tryptophan (W); (7) Serine (S), Threonine (T); and (8) Cysteine (C), Methionine (M) (see, e.g., Creighton, Proteins (1984)).

The terms "identical" or percent "identity," in the context of two or more nucleic acids or polypeptide sequences, refer to two or more sequences or subsequences that are the same or have a specified percentage of amino acid residues or nucleotides that are the same (i.e., about 60%, 65%, 70%, 75%, 80%, 85%, 90%, 91%, 92%, 93%, 94%, 95%, 96%, 97%, 98%, 99%, or higher identity over a specified region, when compared and aligned for maximum correspondence over a comparison window or designated region) as measured using a BLAST or BLAST 2.0 sequence comparison algorithms with default parameters described below, or by manual alignment and visual inspection (e.g., http://www.ncbi.nlm.nih.gov/BLAST/ or the like). Such sequences are then said to be "substantially identical." This definition also refers to, or may be applied to, the compliment of a test sequence. The definition also includes sequences that have deletions and/or additions, as well as those that have substitutions. As described below, the preferred algorithms can account for gaps and the like. Preferably, identity exists over a region that is at least about 25 amino acids or nucleotides in length, or more preferably over a region that is 50-100 amino acids or nucleotides in length.

An amino acid or nucleotide base "position" is denoted by a number that sequentially identifies each amino acid (or nucleotide base) in the reference sequence based on its position relative to the N-terminus (or 5'-end). Due to deletions, insertions, truncations, fusions, and the like that must be taken into account when determining an optimal alignment, in general the amino acid residue number in a test sequence determined by simply counting from the N-terminus will not necessarily be the same as the number of its corresponding position in the reference sequence. For example, in a case where a variant has a deletion relative to an aligned reference sequence, there will be no amino acid in the variant that corresponds to a position in the reference sequence at the site of deletion. Where there is an insertion in an aligned reference sequence, that insertion will not correspond to a numbered amino acid position in the reference sequence. In the case of truncations or fusions there can be stretches of amino acids in either the reference or aligned sequence that do not correspond to any amino acid in the corresponding sequence.

The terms "numbered with reference to" or "corresponding to," when used in the context of the numbering of a given amino acid or polynucleotide sequence, refers to the numbering of the residues of a specified reference sequence when the given amino acid or polynucleotide sequence is compared to the reference sequence.

The term "isolated", when applied to a nucleic acid or protein, denotes that the nucleic acid or protein is essentially free of other cellular components with which it is associated in the natural state. It can be, for example, in a homogeneous state and may be in either a dry or aqueous solution. Purity and homogeneity are typically determined using analytical chemistry techniques such as polyacrylamide gel electrophoresis or high performance liquid chromatography. A protein that is the predominant species present in a preparation is substantially purified. In aspects, the nucleic acids described herein are isolated nucleic acids.

"Contacting" is used in accordance with its plain ordinary meaning and refers to the process of allowing at least two distinct species (e.g. chemical compounds including biomolecules or cells) to become sufficiently proximal to react, interact or physically touch. It should be appreciated; however, the resulting reaction product can be produced directly from a reaction between the added reagents or from an intermediate from one or more of the added reagents that can be produced in the reaction mixture. The term "contacting" may include allowing two species to react, interact, or physically touch, wherein the two species may be a compound as described herein and a protein or enzyme. In some embodiments contacting includes allowing a compound described herein to interact with a protein or enzyme that is involved in a signaling pathway.

The term "activation", "activate", "activating", "activator" and the like in reference to a protein-inhibitor interaction means positively affecting (e.g. increasing) the activity or function of the protein relative to the activity or function of the protein in the absence of the activator. In aspects activation means positively affecting (e.g. increasing) the concentration or levels of the protein relative to the concentration or level of the protein in the absence of the activator. The terms may reference activation, or activating, sensitizing, or up-regulating signal transduction or enzymatic activity or the amount of a protein decreased in a disease. Thus, activation may include, at least in part, partially or totally increasing stimulation, increasing or enabling activation, or activating, sensitizing, or up-regulating signal transduction or enzymatic activity or the amount of a protein associated with a disease (e.g., a protein which is decreased in a disease relative to a non-diseased control). Activation may include, at least in part, partially or totally increasing stimulation, increasing or enabling activation, or activating, sensitizing, or up-regulating signal transduction or enzymatic activity or the amount of a protein The terms "agonist," "activator," "upregulator," etc. refer to a substance capable of detectably increasing the expression or activity of a given gene or protein. The agonist can increase expression or activity 10%, 20%, 30%, 40%, 50%, 60%, 70%, 80%, 90% or more in comparison to a control in the absence of the agonist. In certain instances, expression or activity is 1.5-fold, 2-fold, 3-fold, 4-fold, 5-fold, 10-fold or higher than the expression or activity in the absence of the agonist.

The term "inhibition", "inhibit", "inhibiting" and the like in reference to a protein-inhibitor interaction means negatively affecting (e.g. decreasing) the activity or function of the protein relative to the activity or function of the protein in the absence of the inhibitor. In aspects inhibition means negatively affecting (e.g. decreasing) the concentration or levels of the protein relative to the concentration or level of the protein in the absence of the inhibitor. In aspects inhibition refers to reduction of a disease or symptoms of disease. In aspects, inhibition refers to a reduction in the activity of a particular protein target. Thus, inhibition includes, at least in part, partially or totally blocking stimulation, decreasing, preventing, or delaying activation, or inactivating, desensitizing, or down-regulating signal transduction or enzymatic activity or the amount of a protein. In aspects, inhibition refers to a reduction of activity of a target protein resulting from a direct interaction (e.g. an inhibitor binds to the target protein). In aspects, inhibition refers to a reduction of activity of a target protein from an indirect interaction (e.g. an inhibitor binds to a protein that activates the target protein, thereby preventing target protein activation).

As used herein, the terms "inhibitor," "repressor" or "antagonist" or "downregulator" are used in accordance with its plain ordinary meaning and refer to a substance capable of detectably decreasing the expression or activity of a given gene or protein. The antagonist can decrease expression or activity 10%, 20%, 30%, 40%, 50%, 60%, 70%, 80%, 90% or more in comparison to a control in the absence of the antagonist. In instances, expression or activity is 1.5-fold, 2-fold, 3-fold, 4-fold, 5-fold, 10-fold or lower than the expression or activity in the absence of the antagonist.

The terms "treating" or "treatment" refers to any indicia of success in the therapy or amelioration of a disease, pathology or condition, including any objective or subjective parameter such as abatement; remission; diminishing of symptoms or making the pathology or condition more tolerable to the patient; slowing in the rate of degeneration or decline; making the final point of degeneration less debilitating; improving a patient's physical well-being. The treatment or amelioration of symptoms can be based on objective or subjective parameters; including the results of a physical examination. The term "treating" and conjugations thereof, may include prevention of a pathology, condition, or disease. In aspects, treating is preventing. In aspects, treating does not include preventing.

"Treating" or "treatment" as used herein (and as well-understood in the art) also broadly includes any approach for obtaining beneficial or desired results in a subject's condition, including clinical results. Beneficial or desired clinical results can include, but are not limited to, alleviation or amelioration of one or more symptoms or conditions, diminishment of the extent of a disease, stabilizing (i.e., not worsening) the state of disease, prevention of a disease's transmission or spread, delay or slowing of disease progression, amelioration or palliation of the disease state, diminishment of the reoccurrence of disease, and remission, whether partial or total and whether detectable or undetectable. In other words, "treatment" as used herein includes any cure, amelioration, or prevention of a disease. Treatment may prevent the disease from occurring; inhibit the disease's spread; relieve the disease's symptoms, fully or partially remove the disease's underlying cause, shorten a disease's duration, or do a combination of these things.

"Treating" and "treatment" as used herein include prophylactic treatment. Treatment methods include administering to a subject a therapeutically effective amount of an active agent. The administering step may consist of a single administration or may include a series of administrations. The length of the treatment period depends on a variety of factors, such as the severity of the condition, the age of the patient, the concentration of active agent, the activity of the compositions used in the treatment, or a combination thereof. It will be appreciated that the effective dosage of an agent used for the treatment or prophylaxis may increase or decrease over the course of a particular treatment or prophylaxis regime. Changes in dosage may result and become apparent by standard diagnostic assays known in the art. In embodiments, the treating or treatment is not prophylactic treatment.

A "effective amount," as used herein, is an amount sufficient for a compound to accomplish a stated purpose relative to the absence of the compound (e.g. achieve the effect for which it is administered, treat a disease, reduce a signaling pathway, or reduce one or more symptoms of a disease or condition). In these methods, the effective amount of the active agent (e.g., oncolytic virus, viral vector) described herein is an amount effective to accomplish the stated purpose of the method. An example of an "effective amount" is an amount sufficient to contribute to the treatment, prevention, or reduction of a symptom or symptoms of a disease, which could also be referred to as a "therapeutically effective amount." A "reduction" of a symptom or symptoms (and grammatical equivalents of this phrase) means decreasing of the severity or frequency of the symptom(s), or elimination of the symptom(s). The exact amounts will depend on the purpose of the treatment, and will be ascertainable by one skilled in the art using known techniques (see, e.g., Lieberman, Pharmaceutical Dosage Forms (vols. 1-3, 1992); Lloyd, The Art, Science and Technology of Pharmaceutical Compounding (1999); Pickar, Dosage Calculations (1999); and Remington: The Science and Practice of Pharmacy, 20th Edition, 2003, Gennaro, Ed., Lippincott, Williams & Wilkins).

The term "therapeutically effective amount," as used herein, refers to that amount of the therapeutic agent sufficient to ameliorate the disorder, as described above. For example, for the given parameter, a therapeutically effective amount will show an increase or decrease of at least 5%, 10%, 15%, 20%, 25%, 40%, 50%, 60%, 75%, 80%, 90%, or at least 100%. Therapeutic efficacy can also be expressed as "-fold" increase or decrease. For example, a therapeutically effective amount can have at least a 1.2-fold, 1.5-fold, 2-fold, 5-fold, or more effect over a control. For any compound described herein, the therapeutically effective amount can be initially determined from cell culture assays. Target concentrations will be those concentrations of active compound(s) that are capable of achieving the methods described herein, as measured using the methods described herein or known in the art. As is in the art, therapeutically effective amounts for use in humans can also be determined from animal models. For example, a dose for humans can be formulated to achieve a concentration that has been found to be effective in animals.

As used herein, the term "administering" is used in accordance with its plain and ordinary meaning and includes oral administration, administration as a suppository, topical contact, intravenous, parenteral, intraperitoneal, intramuscular, intralesional, intrathecal, intranasal or subcutaneous administration, or the implantation of a slow-release device, e.g., a mini-osmotic pump, to a subject. Administration is by any route, including parenteral and transmucosal (e.g., buccal, sublingual, palatal, gingival, nasal, vaginal, rectal, or transdermal). Parenteral administration includes, e.g., intravenous, intramuscular, intra-arteriole, intradermal, subcutaneous, intraperitoneal, intraventricular, and intracranial. Other modes of delivery include, but are not limited to, the use of liposomal formulations, intravenous infusion, transdermal patches, etc. In embodiments, the administering does not include administration of any active agent other than the recited active agent.

The term "patient" or "subject in need thereof" is used in accordance with its plain ordinary meaning and refers to a living organism suffering from or prone to a disease or condition that can be treated by administration of a composition, compound, or method as provided herein. Non-limiting examples include humans, other mammals, bovines, rats, mice, dogs, monkeys, goat, sheep, cows, deer, and other non-mammalian animals. In some embodiments, a patient is human. In embodiments, the subject has, had, or is suspected of having cancer.

As used herein, the term "cancer" is used in accordance with its plain ordinary meaning and refers to all types of cancer, neoplasm or malignant tumors found in mammals (e.g. humans), including leukemias, lymphomas, carcinomas and sarcomas. Exemplary types of cancer include melanoma, ovarian cancer, colon cancer, brain cancer, glioma, glioblastoma, neuroblastoma, prostate cancer, colorectal cancer, pancreatic cancer, medulloblastoma, melanoma, cervical cancer, gastric cancer, lung cancer, cancer of the head, Hodgkin's disease, and non-Hodgkin's lymphoma, thyroid carcinoma, cholangiocarcinoma, pancreatic adenocarcinoma, skin cutaneous melanoma, colon adenocarcinoma, rectum adenocarcinoma, stomach adenocarcinoma, esophageal carcinoma, head and neck squamous cell carcinoma, breast invasive carcinoma, lung adenocarcinoma, lung squamous cell carcinoma, non-small cell lung carcinoma, mesothelioma, multiple myeloma, neuroblastoma, glioma, glioblastoma multiforme, ovarian cancer, rhabdomyosarcoma, primary thrombocytosis, primary macroglobulinemia, primary brain tumors, malignant pancreatic insulanoma, malignant carcinoid, urinary bladder cancer, premalignant skin lesions, testicular cancer, thyroid cancer, neuroblastoma, esophageal cancer, genitourinary tract cancer, malignant hypercalcemia, endometrial cancer, adrenal cortical cancer, neoplasms of the endocrine or exocrine pancreas, medullary thyroid cancer, medullary thyroid carcinoma, melanoma, colorectal cancer, papillary thyroid cancer, hepatocellular carcinoma, or prostate cancer. In embodiments, the cancer is glioblastoma, ovarian cancer, pancreatic cancer, myeloma, leukemia, or lymphoma. In embodiments, the cancer is melanoma, ovarian cancer, or colon cancer. In embodiments, the cancer is metastatic cancer. In embodiments, the cancer is metastatic melanoma, metastatic ovarian cancer, or metastatic colon cancer.

Compounds and Compositions

Disclosed herein are recombinant oncolytic herpes viruses comprising a gene encoding a SARS-CoV spike (S) protein. The recombinant viruses may be derived from several different types of herpes viruses. The herpesviridae are a large family of DNA viruses that cause diseases in humans and animals. Herpes viruses all share a common structure and are composed of relatively large double-stranded, linear DNA genomes encoding 100-200 genes encased within an icosahedral protein cage called the capsid which is itself wrapped in a lipid bilayer membrane called the envelope. This particle is known as the virion. The large genome provides many nonessential sites (e.g. non-essential genes) for introducing one or more transgenes without inactivating the virus (e.g., without completely inhibiting infection, replication, or amplification). As used herein, a "transgene" refers to a nucleic acid sequence that originates from outside a given cell, organism or virus. A transgene as provided herein is therefore not native to, or does not originate within a herpes virus. Genes that are not required for infection, replication, or amplification of the recombinant oncolytic herpes viruses provided herein are referred to herein as "non-essential genes." For example, deletion of an essential viral gene can decrease viral replication by at least 70%, 75%, 80%, 85%, 90%, 95% or more in comparison to a control including expression of the essential gene. For example, deletion of an essential viral gene can decrease viral amplification by at least 70%, 75%, 80%, 85%, 90%, 95% or more in comparison to a control including expression of the essential gene. Alternatively, genes that are required for viral infection, replication, or amplification are referred to herein as "essential genes." However, it should be appreciated that virus vectors are preferably modified (e.g., replication conditional, attenuated) so that they do not have undesirable effects (e.g., killing normal cells (e.g. non-cancer cells), or causing disease).

The recombinant herpes viruses may comprise any one of a number of mutations that affect expression of a viral gene. In most cases, the mutation is in a virulence-related gene that contributes to the pathogenicity of the virus to a host organism. The mutation may be a point mutation, a deletion, an inversion, or an insertion. Typically the mutation is an inactivating mutation or deletion. Several types of replication-conditional herpes virus mutants have been developed. For example, one aspect involves viral mutants with defects in the function of a viral gene needed for nucleic acid metabolism, such as thymidine kinase, ribonucleotide reductase (RR), or uracil-N-glycosylase. Another aspect involves viral mutants with defects in the function of the γ-34.5 gene, which functions as a virulence factor by markedly enhancing the viral burst size of infected cells through suppression of shutoff of host protein synthesis. Other examples include G207, and MGH1, which possess deletions of both copies of γ-34.5 and an insertional mutation of RR.

Recombinant herpes viruses disclosed herein can involve viruses that are based on herpes viruses, such as herpes simplex viruses (HSV), for example, HSV-1 or HSV-2, that include an inactivating mutation in a virulence gene. In the case of herpes simplex viruses, this mutation can be an inactivating mutation in the γ-34.5 gene, which is the major HSV neurovirulence determinant. In embodiments, the viruses disclosed herein can include a mutation or modification that is made to prevent reversion of the virus to wild type. For example, the virus can include a mutation in the ICP6 gene, which encodes the large subunit of ribonucleotide reductase.

The immune response plays both anti-tumor and anti-viral roles, which can alternately help and thwart treatment attempts. During the early stage of oHSV infection, the innate immune system primarily responds to the virus, killing the virally infected cells but also inhibiting oHSV viral reproduction. Over-rapid clearance of oHSV infection at this stage seriously impairs oncolytic efficacy of replicable oncolytic virus. However, at the late stage of oHSV infection, after infected tumor cells have been lysed by virus, the release of tumor antigens can trigger a significant antigen-specific anti-tumor adaptive immune response. Activating the adaptive immune response in this stage may help eliminate additional tumor cells otherwise missed by the virus. As the first line of host antiviral defense, innate immunity responds quickly to the viral infection and plays a dominant role on clearing oHSV infection at the early stage of oHSV therapy. Within hours of oHSV administration, NK cells are activated and recruited to the viral injection site, causing an over-rapid clearance of oHSV infection and limiting the efficacy of oHSV therapy. When NK cells are inhibited by pre-treatments with NK blocking antibodies, TGF-beta, or histone deacetylase inhibitors before virus administration, oHSV virotherapy shows significantly better outcomes. Systematic inhibition of NK cells, however, causes inevitably reduced antitumor activity over the course of treatment.

In embodiments, the oncolytic virus is a herpes virus. For example, any viral gene involved in nucleic acid metabolism may be inactivated, such as thymidine kinase, ribonucleotide reductase (RR), or uracil-N-glycosylase. Another aspect involves viral mutants with defects in the function of genes encoding virulence factors such as the ICP34.5 gene. Examples of oncolytic herpes virus include NV1020 and T-VEC. In embodiments, the herpes virus is herpes simplex virus. In embodiments, the herpes virus is HSV-1 In embodiments, the herpes virus is HSV-2.

Figure 1A:
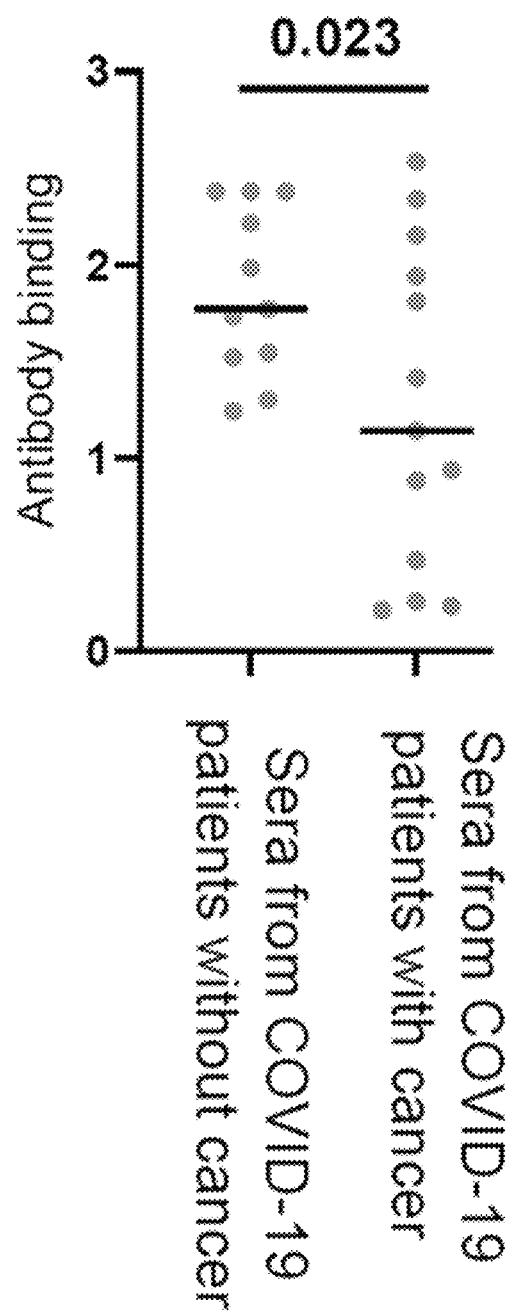
Figure 1B:
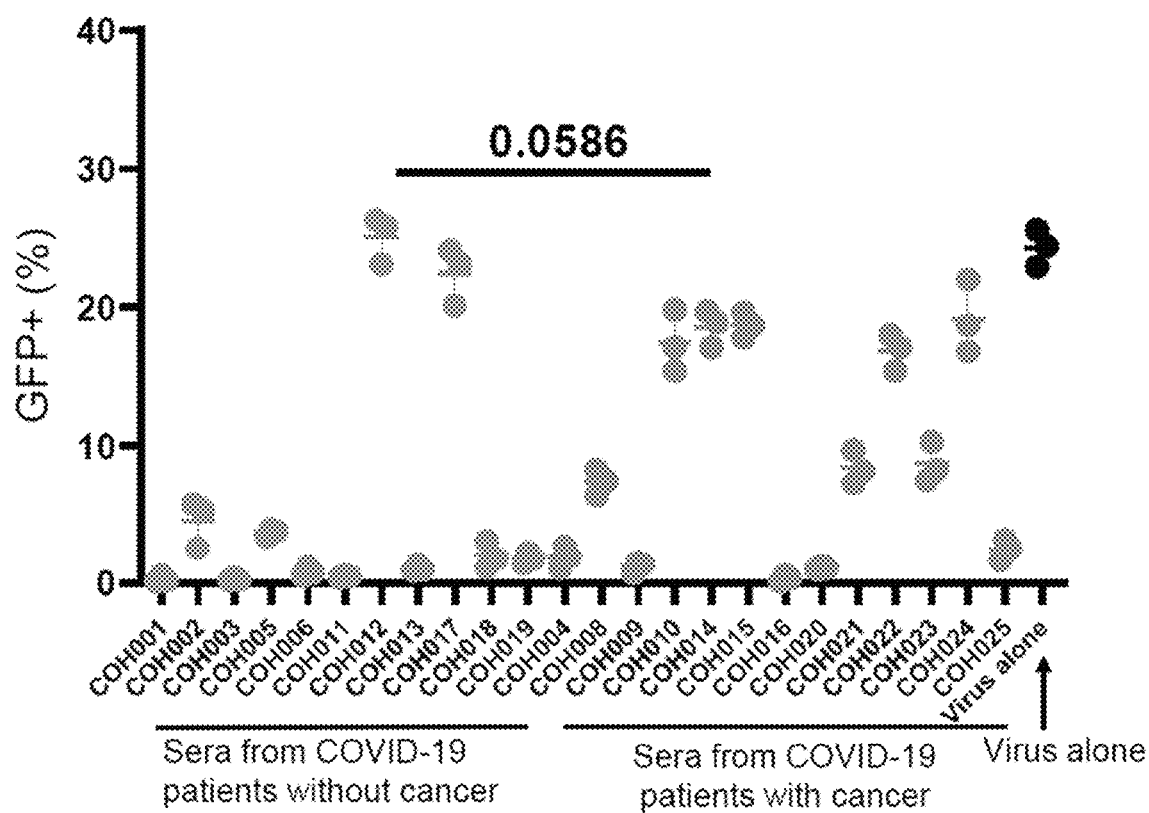
Figure 1C:
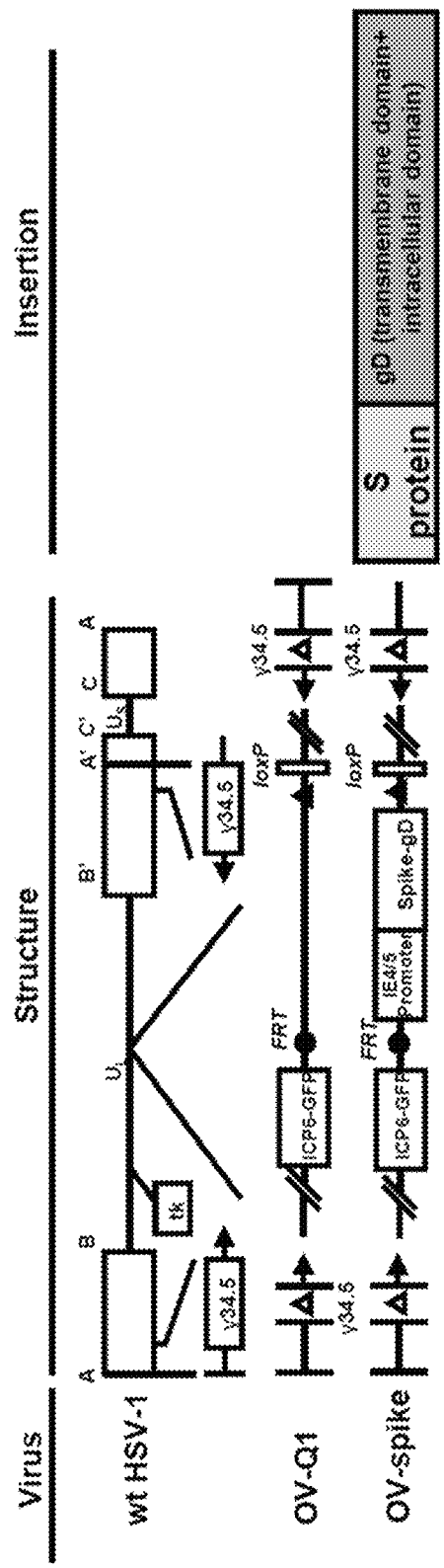

Provided herein are recombinant oncolytic herpes simplex viruses capable of expressing a SARS-CoV spike (S) protein driven by the HSV-1 immediate early gene promoter, pIE4/5 to inhibit antiviral activity of SARS-CoV while maintaining the antitumor activity of NK cells. In embodiments, the recombinant oncolytic herpes simplex virus capable of expressing a SARS-CoV spike (S) protein is OV-spike as shown in FIG. 1C, where Spike refers to the gene encoding the SARS-CoV-2 spike (S) protein, and gD refers to the gene encoding the glycoprotein D transmembrane domain and glycoprotein D intracellular domain.

The disclosure provides recombinant oncolytic herpes simplex viruses capable of expressing a SARS-CoV spike (S) protein. In embodiments, the SARS-CoV spike (S) protein further comprises a glycoprotein D transmembrane domain. In embodiments, the SARS-CoV spike (S) protein further comprises a glycoprotein D intracellular domain. In embodiments, the SARS-CoV spike (S) protein further comprises a glycoprotein D transmembrane domain and a glycoprotein D intracellular domain. In embodiments, the recombinant oncolytic herpes simplex virus is capable of expressing a SARS-CoV spike (S) protein and a glycoprotein D transmembrane domain. In embodiments, the recombinant oncolytic herpes simplex virus is capable of expressing a SARS-CoV spike (S) protein, a glycoprotein D transmembrane domain, and a glycoprotein D intracellular domain. Thus, in embodiments, the recombinant oncolytic herpes simplex viruses is capable of expressing a SARS-CoV spike (S) protein—glycoprotein D fusion protein. In embodiments, the SARS-CoV spike (S) protein is operably linked to a glycoprotein D transmembrane domain. In embodiments, the SARS-CoV spike (S) protein is operably linked to a glycoprotein D transmembrane domain which is operably linked to a glycoprotein D intracellular domain.

In embodiments, the recombinant oncolytic herpes simplex virus is double-attenuated by an inactivated ribonucleotide reductase gene (ICP6) and deletion of a neurovirulence gene (ICP34.5). In embodiments, the recombinant oncolytic herpes simplex virus is double-attenuated by an inactivated ribonucleotide reductase gene (ICP6) and deletion of two copies of a neurovirulence gene (ICP34.5). In embodiments, the recombinant oncolytic herpes simplex virus does not comprise a nucleic acid encoding a functional γ34.5 gene. In embodiments, the recombinant oncolytic herpes simplex virus does not comprise a nucleic acid encoding a functional ICP6 gene. In embodiments, the recombinant oncolytic herpes simplex virus does not comprise a nucleic acid encoding a functional γ34.5 gene and does not comprise a nucleic acid encoding a functional ICP6 gene. In embodiments, the nucleic acid encoding the SARS-CoV spike (S) protein is under the control of a viral promoter. In embodiments, the viral promoter is a herpes simplex virus immediate early (IE) promoter. In embodiments, the herpes simplex virus IE promoter is an IE 4/5 promoter. In embodiments, the recombinant oncolytic herpes simplex virus is a recombinant oncolytic herpes simplex-1 (HSV-1) virus.

The disclosure provides viral vectors comprising the recombinant oncolytic herpes simplex virus described herein (including all embodiments thereof). For example, the viral vector includes a nucleic acid encoding the recombinant oncolytic herpes simplex virus described herein (including all embodiments thereof). In embodiments, the viral vector includes a nucleic acid encoding the SARS-CoV spike (S) protein provided herein. In embodiments, the viral vector further includes a a nucleic acid encoding a glycoprotein D transmembrane domain provided herein. In embodiments, the viral vector further includes a nucleic acid encoding a glycoprotein D intracellular domain provided herein. In embodiments, the viral vector includes a a nucleic acid encoding a SARS-CoV spike (S) protein—glycoprotein D fusion protein provided herein.

In embodiments, the disclosure provides expression vectors comprising the recombinant oncolytic herpes simplex virus described herein (including all embodiments thereof). For example, the expression vector includes a nucleic acid encoding the recombinant oncolytic herpes simplex virus described herein (including all embodiments thereof). In embodiments, the expression vector includes a nucleic acid encoding the SARS-CoV spike (S) protein provided herein. In embodiments, the expression vector further includes a a nucleic acid encoding a glycoprotein D transmembrane domain provided herein. In embodiments, the expression vector further includes a nucleic acid encoding a glycoprotein D intracellular domain provided herein. In embodiments, the expression vector includes a a nucleic acid encoding a SARS-CoV spike (S) protein—glycoprotein D fusion protein provided herein.

The disclosure provides a recombinant oncolytic herpes simplex virus particle comprising a SARS-CoV spike (S) protein on a surface of the particle. In embodiments, the SARS-CoV spike (S) protein is operably linked to a glycoprotein D transmembrane domain. In embodiments, the SARS-CoV spike (S) protein is operably linked to a glycoprotein D transmembrane domain which is operably linked to a glycoprotein D intracellular domain. In embodiments, the recombinant oncolytic herpes simplex virus particle is double-attenuated by an inactivated ribonucleotide reductase gene (ICP6) and deletion of a neurovirulence gene (ICP34.5). In embodiments, the recombinant oncolytic herpes simplex virus particle is double-attenuated by an inactivated ribonucleotide reductase gene (ICP6) and deletion of two copies of a neurovirulence gene (ICP34.5). In embodiments, the recombinant oncolytic herpes simplex virus particle does not comprise a nucleic acid encoding a functional γ34.5 gene. In embodiments, the recombinant oncolytic herpes simplex virus particle does not comprise a nucleic acid encoding a functional ICP6 gene. In embodiments, the recombinant oncolytic herpes simplex virus particle does not comprise a nucleic acid encoding a functional γ34.5 gene and does not comprise a nucleic acid encoding a functional ICP6 gene. In embodiments, the nucleic acid encoding the SARS-CoV spike (S) protein is under the control of a viral promoter. In embodiments, the viral promoter is a herpes simplex virus immediate early (IE) promoter. In embodiments, the herpes simplex virus IE promoter is an IE 4/5 promoter. In embodiments, the recombinant oncolytic herpes simplex virus is a recombinant oncolytic herpes simplex-1 (HSV-1) virus. A graphic representation of a recombinant oncolytic herpes simplex virus particle comprising a SARS-CoV spike (S) protein on a surface of the particle is set forth in FIG. 1D.

In embodiments, the disclosure provides a fusion protein comprising a SARS-CoV spike (S) protein and a glycoprotein D transmembrane domain. In embodiments, the fusion protein comprises a SARS-CoV spike (S) protein, a glycoprotein D transmembrane domain, and a glycoprotein D intracellular domain. In embodiments, the SARS-CoV spike (S) protein is operably linked via one or more amino acids to the glycoprotein D transmembrane domain. In embodiments, the glycoprotein D transmembrane domain is operably linked via one or more amino acids to the glycoprotein D intracellular domain.

In embodiments of the recombinant oncolytic herpes simplex virus described herein, the recombinant oncolytic herpes simplex virus particles described herein, the viral vectors described herein, and the fusion proteins described herein, the SARS-CoV spike (S) protein is a SARS-CoV-2 spike (S) protein. In embodiments of the recombinant oncolytic herpes simplex virus described herein, the recombinant oncolytic herpes simplex virus particles described herein, the viral vectors described herein, and the fusion proteins described herein, the SARS-CoV spike (S) protein is a SARS-CoV-1 spike (S) protein. In embodiments of the recombinant oncolytic herpes simplex virus described herein, the recombinant oncolytic herpes simplex virus particles described herein, the viral vectors described herein, and the fusion proteins described herein, the SARS-CoV spike (S) protein is a MERS-CoV spike (S) protein.

In embodiments of the recombinant oncolytic herpes simplex virus described herein, the recombinant oncolytic herpes simplex virus particles described herein, the viral vectors described herein, and the fusion proteins described herein, the SARS-CoV-2 spike (S) protein is encoded by a nucleic acid having at least 80% sequence identity to SEQ ID NO:1. In embodiments, the SARS-CoV-2 spike (S) is encoded by a nucleic acid having at least 80%, 85%, 90%, 92%, 95%, 96%, 97%, 98%, 99% or 100% sequence identity across the whole sequence or a portion of the sequence (e.g. a 50, 100, 150, 200, 500, or 1000 continuous nucleic acid portion) compared to SEQ ID NO:1. In embodiments, the SARS-CoV-2 spike (S) protein is encoded by a nucleic acid having at least 80% sequence identity to SEQ ID NO:1. In embodiments, the SARS-CoV-2 spike (S) protein is encoded by a nucleic acid having at least 85% sequence identity to SEQ ID NO:1. In embodiments, the SARS-CoV-2 spike (S) protein is encoded by a nucleic acid having at least 90% sequence identity to SEQ ID NO:1. In embodiments, the SARS-CoV-2 spike (S) protein is encoded by a nucleic acid having at least 92% sequence identity to SEQ ID NO:1. In embodiments, the SARS-CoV-2 spike (S) protein is encoded by a nucleic acid having at least 94% sequence identity to SEQ ID NO:1. In embodiments, the SARS-CoV-2 spike (S) protein is encoded by a nucleic acid having at least 95% sequence identity to SEQ ID NO:1. In embodiments, the SARS-CoV-2 spike (S) protein is encoded by a nucleic acid having at least 96% sequence identity to SEQ ID NO:1. In embodiments, the SARS-CoV-2 spike (S) protein is encoded by a nucleic acid having at least 98% sequence identity to SEQ ID NO:1. In embodiments, the SARS-CoV-2 spike (S) protein is encoded by a nucleic acid having SEQ ID NO:1. In embodiments, the SARS-CoV-2 spike (S) protein is encoded by a nucleic acid comprising SEQ ID NO:1.

In embodiments, the SARS-CoV-2 spike (S) protein is encoded by a nucleic acid having at least 80% sequence identity to SEQ ID NO:1, and the and the nucleic acid sequence having at least 80% sequence identity is contiguous. In embodiments, the SARS-CoV-2 spike (S) protein is encoded by a nucleic acid having at least 85% sequence identity to SEQ ID NO:1, and the nucleic acid sequence having at least 85% sequence identity is contiguous. In embodiments, the SARS-CoV-2 spike (S) protein is encoded by a nucleic acid having at least 90% sequence identity to SEQ ID NO:1, and the nucleic acid sequence having at least 90% sequence identity is contiguous. In embodiments, the SARS-CoV-2 spike (S) protein is encoded by a nucleic acid having at least 92% sequence identity to SEQ ID NO:1, and the nucleic acid sequence having at least 92% sequence identity is contiguous. In embodiments, the SARS-CoV-2 spike (S) protein is encoded by a nucleic acid having at least 94% sequence identity to SEQ ID NO:1, and the nucleic acid sequence having at least 94% sequence identity is contiguous. In embodiments, the SARS-CoV-2 spike (S) protein is encoded by a nucleic acid having at least 95% sequence identity to SEQ ID NO:1, and the nucleic acid sequence having at least 95% sequence identity is contiguous. In embodiments, the SARS-CoV-2 spike (S) protein is encoded by a nucleic acid having at least 96% sequence identity to SEQ ID NO:1, and the nucleic acid sequence having at least 96% sequence identity is contiguous. In embodiments, the SARS-CoV-2 spike (S) protein is encoded by a nucleic acid having at least 98% sequence identity to SEQ ID NO:1, and the nucleic acid sequence having at least 98% sequence identity is contiguous.

In embodiments of the recombinant oncolytic herpes simplex virus described herein, the recombinant oncolytic herpes simplex virus particles described herein, the viral vectors described herein, and the fusion proteins described herein, the SARS-CoV-2 spike (S) protein has at least 80% sequence identity to SEQ ID NO:3. In embodiments, the SARS-CoV-2 spike (S) has at least 80%, 85%, 90%, 92%, 95%, 96%, 97%, 98%, 99% or 100% sequence identity across the whole sequence or a portion of the sequence (e.g. a 20, 50, 100, 150, or 200 continuous amino acid portion) compared to SEQ ID NO:3. In embodiments, the SARS-CoV-2 spike (S) protein has at least 80% sequence identity to SEQ ID NO:3. In embodiments, the SARS-CoV-2 spike (S) protein has at least 85% sequence identity to SEQ ID NO:3. In embodiments, the SARS-CoV-2 spike (S) protein has at least 90% sequence identity to SEQ ID NO:3. In embodiments, the SARS-CoV-2 spike (S) protein has at least 92% sequence identity to SEQ ID NO:3. In embodiments, the SARS-CoV-2 spike (S) protein has at least 94% sequence identity to SEQ ID NO:3. In embodiments, the SARS-CoV-2 spike (S) protein has at least 95% sequence identity to SEQ ID NO:3. In embodiments, the SARS-CoV-2 spike (S) protein has at least 96% sequence identity to SEQ ID NO:3. In embodiments, the SARS-CoV-2 spike (S) protein has at least 98% sequence identity to SEQ ID NO:3. In embodiments, the SARS-CoV-2 spike (S) protein has SEQ ID NO:3. In aspects, the SARS-CoV-2 spike (S) protein has one or more mutations at positions corresponding to K417, N439, E484, F490, and N501 of SEQ ID NO:3.

In embodiments, the SARS-CoV-2 spike (S) protein has at least 80% sequence identity to SEQ ID NO:3, and the sequence having at least 80% sequence identity is contiguous. In embodiments, the SARS-CoV-2 spike (S) protein has at least 85% sequence identity to SEQ ID NO:3, and the sequence having at least 85% sequence identity is contiguous. In embodiments, the SARS-CoV-2 spike (S) protein has at least 90% sequence identity to SEQ ID NO:3, and the sequence having at least 90% sequence identity is contiguous. In embodiments, the SARS-CoV-2 spike (S) protein has at least 92% sequence identity to SEQ ID NO:3, and the sequence having at least 92% sequence identity is contiguous. In embodiments, the SARS-CoV-2 spike (S) protein has at least 94% sequence identity to SEQ ID NO:3, and the sequence having at least 94% sequence identity is contiguous. In embodiments, the SARS-CoV-2 spike (S) protein has at least 95% sequence identity to SEQ ID NO:3, and the sequence having at least 95% sequence identity is contiguous. In embodiments, the SARS-CoV-2 spike (S) protein has at least 96% sequence identity to SEQ ID NO:3, and the sequence having at least 96% sequence identity is contiguous. In embodiments, the SARS-CoV-2 spike (S) protein has at least 98% sequence identity to SEQ ID NO:3, and the sequence having at least 98% sequence identity is contiguous.

In embodiments of the recombinant oncolytic herpes simplex virus described herein, the recombinant oncolytic herpes simplex virus particles described herein, the viral vectors described herein, and the fusion proteins described herein, glycoprotein D is encoded by a nucleic acid having at least 80% sequence identity to SEQ ID NO:2. In embodiments, glycoprotein D is encoded by a nucleic acid having at least 80%, 85%, 90%, 92%, 95%, 96%, 97%, 98%, 99% or 100% sequence identity across the whole sequence or a portion of the sequence (e.g. a 50, 100, 150, 200, or 500 continuous nucleic acid portion) compared to SEQ ID NO:2. In embodiments, glycoprotein D is encoded by a nucleic acid having at least 80% sequence identity to SEQ ID NO:2. In embodiments, glycoprotein D is encoded by a nucleic acid having at least 85% sequence identity to SEQ ID NO:2. In embodiments, glycoprotein D is encoded by a nucleic acid having at least 90% sequence identity to SEQ ID NO:2. In embodiments, glycoprotein D is encoded by a nucleic acid having at least 92% sequence identity to SEQ ID NO:2. In embodiments, glycoprotein D is encoded by a nucleic acid having at least 94% sequence identity to SEQ ID NO:2. In embodiments, glycoprotein D is encoded by a nucleic acid having at least 95% sequence identity to SEQ ID NO:2. In embodiments, glycoprotein D is encoded by a nucleic acid having at least 96% sequence identity to SEQ ID NO:2. In embodiments, glycoprotein D is encoded by a nucleic acid having at least 98% sequence identity to SEQ ID NO:2. In embodiments, glycoprotein D comprises the transmembrane domain. In embodiments, glycoprotein D comprises the transmembrane domain and the intracellular domain.

In embodiments, glycoprotein D is encoded by a nucleic acid having at least 80% sequence identity to SEQ ID NO:2, and the sequence having at least 80% is contiguous. In embodiments, glycoprotein D is encoded by a nucleic acid having at least 85% sequence identity to SEQ ID NO:2, and the sequence having at least 85% is contiguous. In embodiments, glycoprotein D is encoded by a nucleic acid having at least 90% sequence identity to SEQ ID NO:2, and the sequence having at least 90% is contiguous. In embodiments, glycoprotein D is encoded by a nucleic acid having at least 92% sequence identity to SEQ ID NO:2, and the sequence having at least 92% is contiguous. In embodiments, glycoprotein D is encoded by a nucleic acid having at least 94% sequence identity to SEQ ID NO:2, and the sequence having at least 94% is contiguous. In embodiments, glycoprotein D is encoded by a nucleic acid having at least 95% sequence identity to SEQ ID NO:2, and the sequence having at least 95% is contiguous. In embodiments, glycoprotein D is encoded by a nucleic acid having at least 96% sequence identity to SEQ ID NO:2, and the sequence having at least 86% is contiguous. In embodiments, glycoprotein D is encoded by a nucleic acid having at least 98% sequence identity to SEQ ID NO:2, and the sequence having at least 98% is contiguous.

In embodiments, the recombinant oncolytic herpes simplex virus described herein, the recombinant oncolytic herpes simplex virus particle described herein, the viral vector described herein, and the fusion protein described herein comprise a detectable moiety-encoding nucleic acid sequence. In embodiments, the detectable moiety-encoding nucleic acid sequence is operably linked to a promoter. In embodiments, the detectable moiety-encoding nucleic acid sequence forms part of a non-essential gene. In embodiments, the detectable moiety-encoding nucleic acid sequence replaces a non-essential gene. In embodiments, the non-essential gene is ICP6. A "detectable moiety-encoding nucleic acid sequence" as used herein refers to a nucleic acid sequence that encodes a composition detectable by spectroscopic, photochemical, biochemical, immunochemical, chemical, or other physical means. Detectable moiety-encoding nucleic acid sequences may encode a detectable protein. In embodiments, the detectable protein is a fluorescent protein (e.g. green fluorescent protein, luciferase, etc.). In embodiments, the detectable protein is green fluorescent protein, mCherry, Emerald, or firefly luciferase. In embodiments, the detectable protein is green fluorescent protein. In embodiments, the detectable protein is mCherry. In embodiments, the detectable protein is Emerald. In embodiments, the detectable protein is firefly luciferase.

Methods

The disclosure provides methods of eliciting antibodies to SARS-CoV-2 in a patient having cancer in need thereof by administering to the patient having cancer an effective amount of the recombinant oncolytic herpes simplex virus described herein (including all embodiments thereof), the viral vector described herein (including all embodiments thereof), the vaccine described herein (including all embodiments thereof), or the pharmaceutical composition described herein (including all embodiments thereof). In embodiments, the antibodies are neutralizing antibodies. In embodiments, the cancer is melanoma, colon cancer, or ovarian cancer. In embodiments, the cancer is melanoma. In embodiments, the cancer is colon cancer. In embodiments, the cancer is ovarian cancer.

The disclosure provides methods of eliciting antibodies to a SARS coronavirus in a patient having cancer in need thereof by administering to the patient having cancer an effective amount of the recombinant oncolytic herpes simplex virus described herein (including all embodiments thereof), the viral vector described herein (including all embodiments thereof), the vaccine described herein (including all embodiments thereof), or the pharmaceutical composition described herein (including all embodiments thereof). In embodiments, the methods are for eliciting antibodies to SARS-CoV-2 in a patient having cancer. In embodiments, the methods are for eliciting antibodies to SARS-CoV-1 in a patient having cancer. In embodiments, the methods are for eliciting antibodies to MERS-CoV in a patient having cancer. In embodiments, the antibodies are neutralizing antibodies. In embodiments, the cancer is melanoma, colon cancer, or ovarian cancer. In embodiments, the cancer is melanoma. In embodiments, the cancer is colon cancer. In embodiments, the cancer is ovarian cancer.

The disclosure provides methods of treating or preventing a SARS coronavirus infection in a patient having cancer in need thereof by administering to the patient having cancer an effective amount of the recombinant oncolytic herpes simplex virus described herein (including all embodiments thereof), the viral vector described herein (including all embodiments thereof), the vaccine described herein (including all embodiments thereof), or the pharmaceutical composition described herein (including all embodiments thereof). In embodiments, the methods are for treating a SARS coronavirus infection in a patient having cancer. In embodiments, the methods are for preventing a SARS coronavirus infection in a patient having cancer. In embodiments, the SARS coronavirus infection is SARS coronavirus-2 (SARS-CoV-2) infection. In embodiments, the methods are for treating a SARS-CoV-2 infection in a patient having cancer. In embodiments, the methods are for preventing a SARS-CoV-2 infection in a patient having cancer. In embodiments, the SARS coronavirus infection is SARS coronavirus-1 (SARS-CoV-1) infection. In embodiments, the methods are for treating a SARS-CoV-1 infection in a patient having cancer. In embodiments, the methods are for preventing a SARS-CoV-1 infection in a patient having cancer. In embodiments, the SARS coronavirus infection is MERS coronavirus (MERS-CoV) infection. In embodiments, the methods are for treating a MERS-CoV infection in a patient having cancer. In embodiments, the methods are for preventing a MERS-CoV infection in a patient having cancer. In embodiments, the cancer is melanoma, colon cancer, or ovarian cancer. In embodiments, the cancer is melanoma. In embodiments, the cancer is colon cancer. In embodiments, the cancer is ovarian cancer.

The disclosure provides methods of treating cancer and treating or preventing a SARS coronavirus infection in a patient in need thereof by administering to the patient an effective amount of the recombinant oncolytic herpes simplex virus described herein (including all embodiments thereof), the viral vector described herein (including all embodiments thereof), the vaccine described herein (including all embodiments thereof), or the pharmaceutical composition described herein (including all embodiments thereof). In embodiments, the methods are for treating cancer and treating a SARS coronavirus infection in a patient. In embodiments, the methods are for treating cancer and preventing a SARS coronavirus infection in a patient. In embodiments, the SARS coronavirus infection is SARS coronavirus-2 (SARS-CoV-2) infection. In embodiments, the methods are for treating cancer and treating a SARS-CoV-2 infection in a patient. In embodiments, the methods are for treating cancer and preventing a SARS-CoV-2 infection in a patient. In embodiments, the SARS coronavirus infection is SARS coronavirus-1 (SARS-CoV-1) infection. In embodiments, the methods are for treating cancer and treating a SARS-CoV-1 infection in a patient. In embodiments, the methods are for treating cancer and preventing a SARS-CoV-1 infection in a patient. In embodiments, the SARS coronavirus infection is MERS coronavirus (MERS-CoV) infection. In embodiments, the methods are for treating cancer and treating a MERS-CoV infection in a patient. In embodiments, the methods are for treating cancer and preventing a MERS-CoV infection in a patient. In embodiments, the cancer is melanoma, colon cancer, or ovarian cancer. In embodiments, the cancer is melanoma. In embodiments, the cancer is colon cancer. In embodiments, the cancer is ovarian cancer.

The disclosure provides methods of treating or preventing COVID-19 in a patient having cancer in need thereof by administering to the patient having cancer an effective amount of the recombinant oncolytic herpes simplex virus described herein (including all embodiments thereof), the viral vector described herein (including all embodiments thereof), the vaccine described herein (including all embodiments thereof), or the pharmaceutical composition described herein (including all embodiments thereof). In embodiments, the methods are for treating COVID-19 in a patient having cancer. In embodiments, the methods are for preventing COVID-19 in a patient having cancer. In embodiments, the cancer is melanoma, colon adenocarcinoma, or ovarian cancer. In embodiments, the cancer is melanoma. In embodiments, the cancer is colon cancer. In embodiments, the cancer is ovarian cancer.

The disclosure provides methods of treating cancer and treating or preventing COVID-19 in a patient in need thereof by administering to the patient an effective amount of the recombinant oncolytic herpes simplex virus described herein (including all embodiments thereof), the viral vector described herein (including all embodiments thereof), the vaccine described herein (including all embodiments thereof), or the pharmaceutical composition described herein (including all embodiments thereof). In embodiments, the methods are for treating cancer and treating COVID-19 in a patient. In embodiments, the methods are for treating cancer and preventing COVID-19 in a patient. In embodiments, the cancer is melanoma, colon adenocarcinoma, or ovarian cancer. In embodiments, the cancer is melanoma. In embodiments, the cancer is colon cancer. In embodiments, the cancer is ovarian cancer.

The disclosure provides methods of eliciting antibodies to a SARS coronavirus in a patient in need thereof by administering to the patient an effective amount of the recombinant oncolytic herpes simplex virus described herein (including all embodiments thereof), the viral vector described herein (including all embodiments thereof), the vaccine described herein (including all embodiments thereof), or the pharmaceutical composition described herein (including all embodiments thereof). In embodiments, the antibodies are neutralizing antibodies. In embodiments, the SARS coronavirus infection is SARS coronavirus-2 (SARS-CoV-2) infection. In embodiments, the SARS coronavirus infection is SARS coronavirus-1 (SARS-CoV-1) infection. In embodiments, the SARS coronavirus infection is MERS coronavirus (MERS-CoV) infection.

The disclosure provides methods of treating or preventing a SARS coronavirus infection in a patient in need thereof by administering to the patient an effective amount of the recombinant oncolytic herpes simplex virus described herein (including all embodiments thereof), the viral vector described herein (including all embodiments thereof), the vaccine described herein (including all embodiments thereof), or the pharmaceutical composition described herein (including all embodiments thereof). In embodiments, the method is for treating a SARS coronavirus infection. In embodiments, the method is for preventing a SARS coronavirus infection. In embodiments, the SARS coronavirus infection is SARS coronavirus-2 (SARS-CoV-2) infection. In embodiments, the SARS coronavirus infection is SARS coronavirus-1 (SARS-CoV-1) infection. In embodiments, the SARS coronavirus infection is MERS coronavirus (MERS-CoV) infection.

The disclosure provides methods of treating or preventing COVID-19 in a patient in need thereof by administering to the patient an effective amount of the recombinant oncolytic herpes simplex virus described herein (including all embodiments thereof), the viral vector described herein (including all embodiments thereof), the vaccine described herein (including all embodiments thereof), or the pharmaceutical composition described herein (including all embodiments thereof). In embodiments, the method is for treating COVID-19. In embodiments, the method is for preventing COVID-19.

Vaccines and Pharmaceutical Compositions

In embodiments, the disclosure provides a vaccine comprising the recombinant oncolytic herpes simplex virus described herein (including all embodiments thereof) and a pharmaceutically acceptable adjuvant. In embodiments, the disclosure provides a vaccine comprising a viral vector which comprises the recombinant oncolytic herpes simplex virus described herein (including all embodiments thereof) and a pharmaceutically acceptable adjuvant. Any adjuvant known in the art can be used in the vaccines described herein.

In aspects, the adjuvant comprises an aluminum salt. In aspects, the aluminum salt is aluminum sulfate, aluminum phosphate, aluminum hydroxyphosphate, aluminum hydroxide, potassium aluminum sulfate, or a combination of two or more thereof. In aspects, the aluminum salt is aluminum sulfate. In aspects, the aluminum salt is aluminum phosphate. In aspects, the aluminum salt is aluminum hydroxyphosphate. In aspects, the aluminum salt is aluminum hydroxide. In aspects, the aluminum salt is potassium aluminum sulfate.

In aspects, the adjuvant comprises a toll-like receptor agonist. In aspects, the toll-like receptor is toll-like receptor 2 agonist, toll-like receptor 3 agonist, toll-like receptor 4 agonist, toll-like receptor 5 agonist, toll-like receptor 7 agonist, toll-like receptor 8 agonist, toll-like receptor 9 agonist, or a combination of two or more thereof. In aspects, the toll-like receptor agonist is toll-like receptor 3 agonist. In aspects, the toll-like receptor agonist is toll-like receptor 9 agonist. In aspects, the toll-like receptor 9 agonist is a CpG ODN. In aspects, the CpG ODN is a CpG-A ODN, a CpG-B ODN, a CpG-C ODN, or a combination of two or more thereof. In aspects, the CpG ODN is a CpG-A ODN. In aspects, the CpG ODN is a CpG-B ODN. In aspects, the CpG ODN is a CpG-C ODN. In aspects, the CpG ODN is CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, or a combination of two or more thereof. In aspects, the CpG ODN is CpG ODN 1585. In aspects, the CpG ODN is CpG ODN 2216. In aspects, the CpG ODN is CpG ODN 2336. In aspects, the CpG ODN is CpG ODN 1668. In aspects, the CpG ODN is CpG ODN 1826. In aspects, the CpG ODN is CpG ODN 2006. In aspects, the CpG ODN is CpG ODN 2007. In aspects, the CpG ODN is CpG ODN BW006. In aspects, the CpG ODN is CpG ODN D-SL01. In aspects, the CpG ODN is CpG ODN 2395. In aspects, the CpG ODN is CpG ODN M362. In aspects, the CpG ODN is CpG ODN D-SL03.

In aspects, the adjuvant comprises a surfactant (e.g., hexadecylamine, octadecylamine, lysolecithin, dimethyldioctadecylammonium bromide, N,N-dioctadecyl-N',N-bis(2-hydroxy-ethylpropane diamine), methoxyhexadecyl glycerol, pluronic polyols); polyanions (e.g., pyran, dextran sulfate, poly IC, polyacrylic acid, Carbopol); peptides (e.g., muramyl dipeptide, aimethylglycine), tuftsin, oil emulsions, B peptide subunits of *E. coli*, or a combination of two or more thereof. In aspects, the adjuvant comprises a surfactant.

The vaccines may be lyophilized or in aqueous form, i.e., solutions or suspensions. Liquid formulations allow the compositions to be administered direct from their packaged form, without the need for reconstitution in an aqueous medium, and are thus ideal for injection. Vaccines may be presented in vials, or they may be presented in ready filled syringes. The syringes may be supplied with or without needles. A syringe will include a single dose of the composition, whereas a vial may include a single dose or multiple doses (e.g. 2, 3, or 4 doses). In aspects, the dose is for a human and may be administered by injection.

Liquid vaccines are also suitable for reconstituting other vaccines from a lyophilized form. Where a vaccine is to be used for such extemporaneous reconstitution, the disclosure provides a kit, which may comprise two vials, or may comprise one ready-filled syringe and one vial, with the contents of the syringe being used to reconstitute the contents of the vial prior to injection. Vaccines may be packaged in unit dose form or in multiple dose form (e.g. 2, 3, or 4 doses). For multiple dose forms, vials can be pre-filled syringes. Effective dosage volumes can be routinely established, but a typical human dose of the composition has an injection volume of 0.25 to 1 mL.

In embodiments, vaccines have a pH of between 6.0 and 8.0, and may be buffered at this pH. Stable pH may be maintained by the use of a buffer, such as a phosphate buffer or a histidine buffer. The composition should be sterile and/or pyrogen free. The compositions and vaccines may be isotonic. Vaccines may include an antimicrobial, particularly when packaged in a multiple dose format. Other antimicrobials may be used, such as 2-phenoxyethanol or parabens (methyl, ethyl, propyl parabens). Preservative may be added. Vaccines may comprise detergent e.g. a Tween (polysorbate), such as Tween 80. Detergents are generally present at low levels, e.g. <0.01%. Vaccines may include sodium salts (e.g. sodium chloride) to give tonicity.

In embodiments, the disclosure provides pharmaceutical compositions comprising the recombinant oncolytic herpes simplex virus described herein (including all embodiments thereof) and a pharmaceutically acceptable excipient. In embodiments, the disclosure provides pharmaceutical compositions comprising a vector which comprises the recombinant oncolytic herpes simplex virus described herein (including all embodiments thereof) and a pharmaceutically acceptable excipient.

"Pharmaceutically acceptable excipient" and "pharmaceutically acceptable carrier" refer to a substance that aids the administration of an active agent (e.g., virus, viral vector) to and absorption by a subject and can be included in the compositions of the disclosure without causing a significant adverse toxicological effect on the patient. Non-limiting examples of pharmaceutically acceptable excipients include water, NaCl, normal saline solutions, lactated Ringer's, normal sucrose, normal glucose, binders, fillers, disintegrants, lubricants, coatings, sweeteners, flavors, salt solutions, alcohols, oils, gelatins, carbohydrates such as lactose, amylose or starch, fatty acid esters, hydroxymethycellulose, polyvinyl pyrrolidine, and colors, and the like. Such preparations can be sterilized and, if desired, mixed with auxiliary agents such as lubricants, preservatives, stabilizers, wetting agents, emulsifiers, salts for influencing osmotic pressure, buffers, coloring, and/or aromatic substances and the like that do not deleteriously react with the compounds of the disclosure. One of skill in the art will recognize that other pharmaceutical excipients are useful.

Solutions of the active agents can be prepared in water suitably mixed with a lipid or surfactant, such as hydroxypropylcellulose. Dispersions can also be prepared in glycerol, liquid polyethylene glycols, and mixtures thereof and in oils. Under ordinary conditions of storage and use, these preparations can contain a preservative to prevent the growth of microorganisms.

Pharmaceutical compositions can be delivered via intranasal or inhalable solutions. The intranasal composition can be a spray, aerosol, or inhalant. The inhalable composition can be a spray, aerosol, or inhalant. Nasal solutions can be aqueous solutions designed to be administered to the nasal passages in drops or sprays. Nasal solutions can be prepared so that they are similar in many respects to nasal secretions. Thus, the aqueous nasal solutions usually are isotonic and slightly buffered to maintain a pH of 5.5 to 6.5. In addition, antimicrobial preservatives, similar to those used in ophthalmic preparations and appropriate drug stabilizers, if required, may be included in the formulation. Various commercial nasal preparations are known in the art.

Oral formulations can include excipients as, for example, pharmaceutical grades of mannitol, lactose, starch, magnesium stearate, sodium saccharine, cellulose, magnesium carbonate and the like. These compositions take the form of solutions, suspensions, tablets, pills, capsules, sustained release formulations or powders. In aspects, oral pharmaceutical compositions will comprise an inert diluent or edible carrier, or they may be enclosed in hard or soft shell gelatin capsule, or they may be compressed into tablets, or they may be incorporated directly with the food. For oral therapeutic administration, the active compounds may be incorporated with excipients and used in the form of ingestible tablets, buccal tablets, troches, capsules, elixirs, suspensions, syrups, wafers, and the like. The percentage of the compositions and preparations may, of course, be varied and may be between about 1 to about 99% of the weight of the unit. The amount of active agent in such compositions is such that a suitable dosage can be obtained.

For parenteral administration in an aqueous solution, for example, the solution should be suitably buffered and the liquid diluent first rendered isotonic with sufficient saline or glucose. Aqueous solutions, in particular, sterile aqueous media, are especially suitable for intravenous, intramuscular, subcutaneous and intraperitoneal administration. For example, one dosage could be dissolved in 1 ml of isotonic NaCl solution and either added to 1000 ml of hypodermoclysis fluid or injected at the proposed site of infusion.

Sterile injectable solutions can be prepared by incorporating the nucleic acids in the required amount in the appropriate solvent followed by filtered sterilization. Generally, dispersions are prepared by incorporating the various sterilized active ingredients into a sterile vehicle which contains the basic dispersion medium. Vacuum-drying and freeze-drying techniques, which yield a powder of the active ingredient plus any additional desired ingredients, can be used to prepare sterile powders for reconstitution of sterile injectable solutions. The preparation of more, or highly, concentrated solutions for direct injection is also contemplated. Organic solvents, such as dimethyl sulfoxide, can be used for rapid penetration, delivering high concentrations of the active agents.

The formulations of active agents can be presented in unit-dose or multi-dose sealed containers, such as syringes, ampules, and vials. Thus, the composition can be in unit dosage form. In such form the preparation is subdivided into unit doses containing appropriate quantities of virus or viral vector. Thus, the compositions can be administered in a variety of unit dosage forms depending upon the method of administration.

The dosage and frequency (single or multiple doses) of the virus or viral vectors administered to a subject can vary depending upon a variety of factors, for example, whether the mammal suffers from another disease, and its route of administration; size, age, sex, health, body weight, body mass index, and diet of the recipient; nature and extent of symptoms of the disease being treated, kind of concurrent treatment, complications from the disease being treated or other health-related problems. Other therapeutic regimens or agents can be used in conjunction with the methods and active agents described herein. Adjustment and manipulation of established dosages (e.g., frequency and duration) are within the ability of the skilled artisan.

For any composition and active agent described herein, the effective amount can be initially determined from cell culture assays. Target concentrations will be those concentrations of nucleic acids or fusion proteins that are capable of achieving the methods described herein, as measured using the methods described herein or known in the art. As is known in the art, effective amounts of nucleic acids and fusion proteins for use in humans can also be determined from animal models. For example, a dose for humans can be formulated to achieve a concentration that has been found to be effective in animals. The dosage in humans can be adjusted by monitoring effectiveness and adjusting the dosage upwards or downwards, as described above. Adjusting the dose to achieve maximal efficacy in humans based on the methods described above and other methods is well within the capabilities of the ordinarily skilled artisan. In embodiments, the recombinant oncolytic herpes simplex virus is administered to the patient in an amount of about $1 \times 10^2$ PFU/dose to about $1 \times 10^9$ PFU/dose, or about $1 \times 10^4$ PFU/dose to about $1 \times 10^8$ PFU/dose. In embodiments, the recombinant oncolytic herpes simplex virus is administered to the patient in an amount of about $1 \times 10^2$ PFU/dose to about $1 \times 10^9$ PFU/dose. In embodiments, the recombinant oncolytic herpes simplex virus is administered to the patient in an amount of about $1 \times 10^4$ PFU/dose to about $1 \times 10^8$ PFU/dose.

Examples

The following examples are for purposes of illustration only and are not intended to limit the scope of the disclosure or claims.

In this study, Applicant generated an oHSV vector-based vaccine coding the SARS-CoV-2 spike (S) protein, termed as OV-spike. The full-length S protein was fused with oHSV glycoprotein D (gD) transmembrane domain and intracellular domain to induce S protein expression on the surface of oHSV particles. In order to keep the original features of oHSV, the transgene was expressed encoding the fusion protein at the ICP6 locus driven by the promoter of the HSV-1 immediate early gene IE4/5, while leaving the endogenous gD intact. OV-spike injection directly stimulates immune cell activation to produce anti-S specific antibodies. Long-lasting anti-S protein neutralization antibodies were produced after OV-spike challenging tumor-free or tumor-bearing mice twice. In three different tumor models, melanoma, colon cancer, and ovarian cancer models, OV-spike administration prolongs mouse survival. Anti-S antibodies induced by OV-spike injection in both tumor-free and tumor-bearing mice inhibit both VSV-SARS-CoV-2 and live SARS-CoV-2 infection. Therefore, OV-spike can play dual roles of preventing COVID-19 infection and treating cancer.

Results

COVID-19 patients with cancer have less anti-SARS-CoV-2 immunity than those without cancer The levels of anti-S antibodies between COVID-19 patients with and without cancer were first compared. The anti-S antibody level were significantly lower in COVID-19 patients with cancer compared to those without cancer (FIG. 1A). Furthermore, the neutralization function of sera from these patients was compared, using an in-vitro infection model by vesicular stomatitis virus (VSV)-SARS-CoV-2 chimeric virus, which was contained eGFP reporter and decorated with full-length SARS-CoV-2 S protein in place of the native glycoprotein (G)[22]. Compared with the sera from COVID-19 patients without cancer, the sera from those with cancer showed a trend of decreased neutralization function against VSV-SARS-CoV-2 infection (FIG. 1B). These results are consistent with other reports that cancer patients are more susceptible to COVID-19[7,8].

Figure 1D:
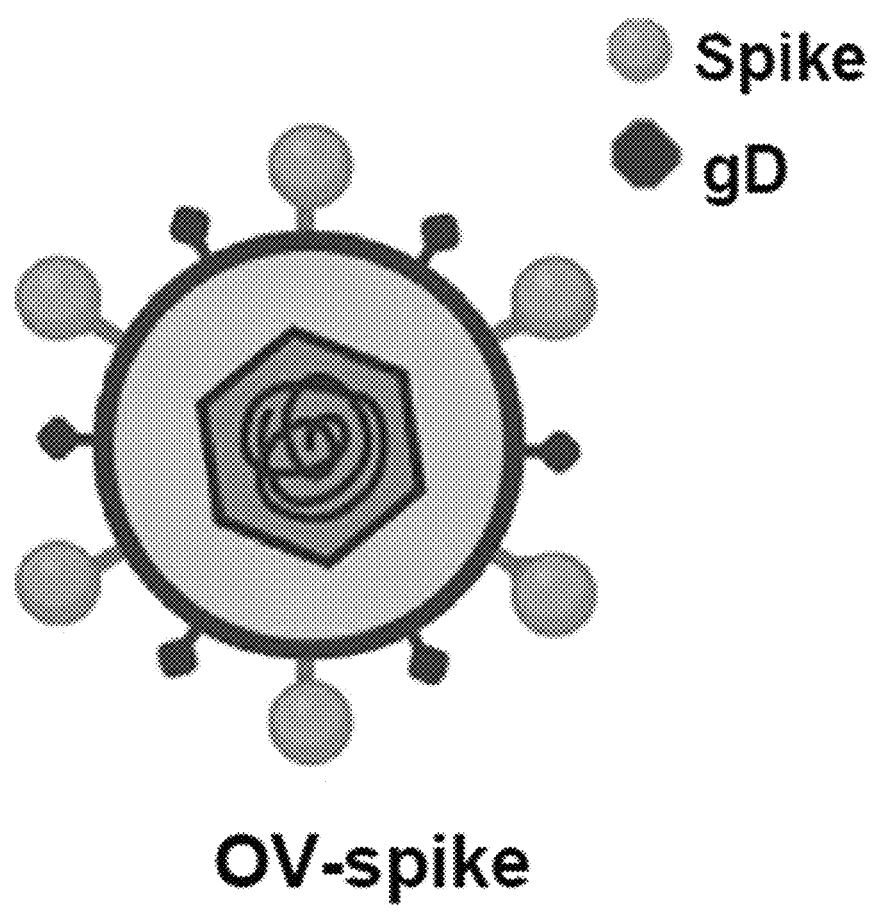
Figure 1E:
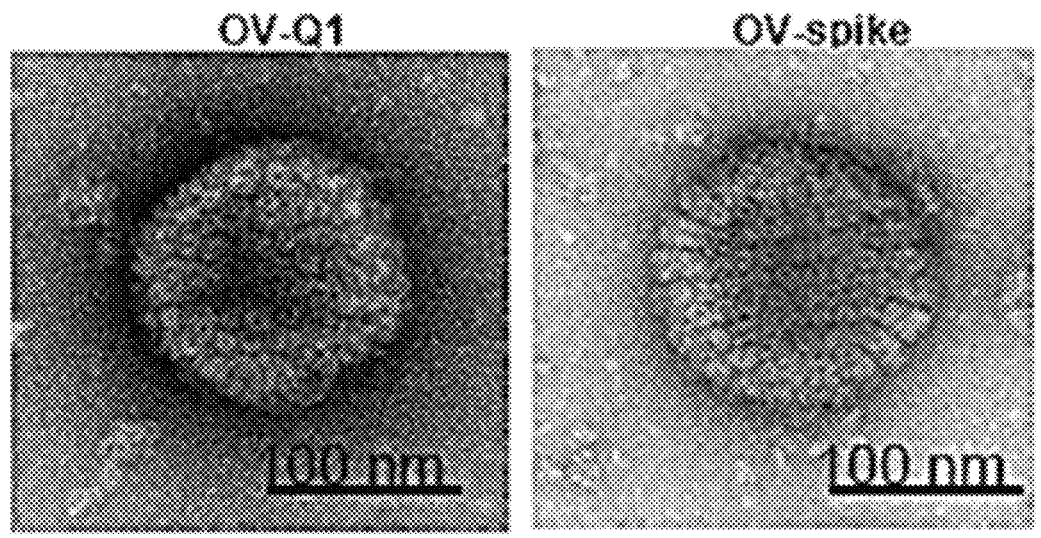
Figure 1F:
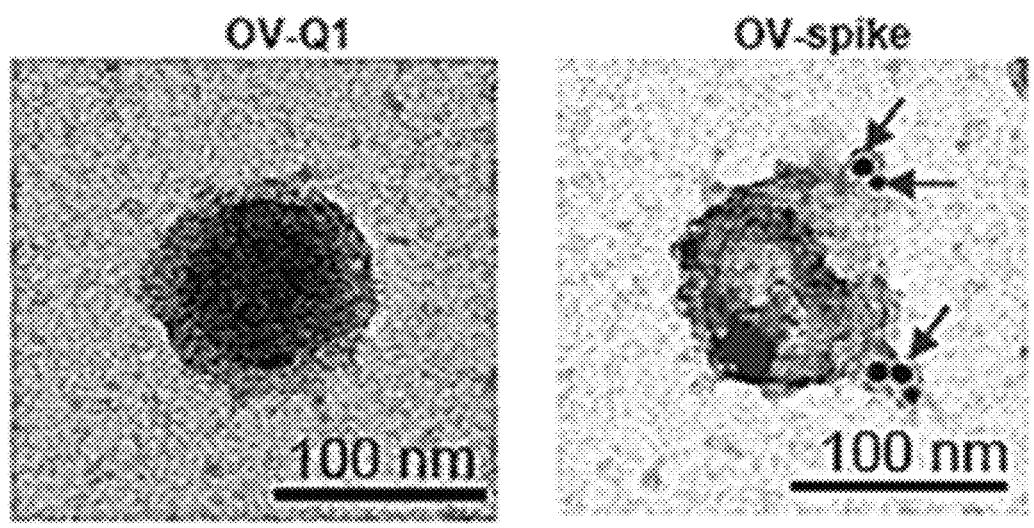
Figure 1G:
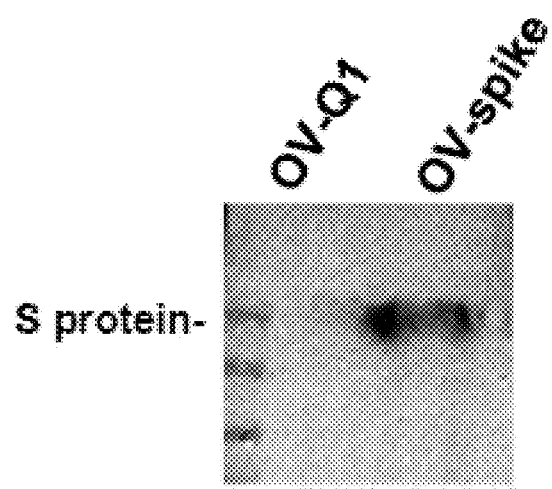
Figure 1H:
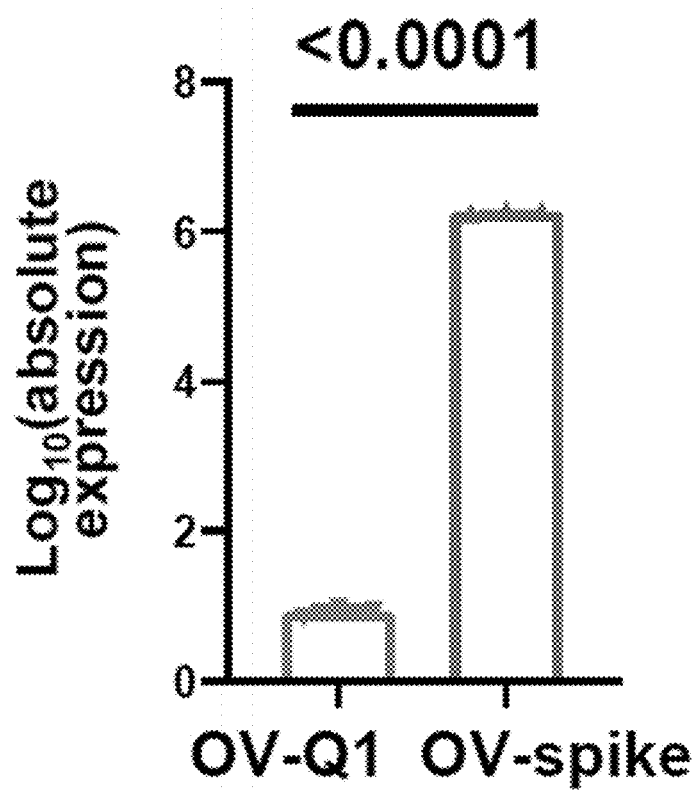
Figure 1I:
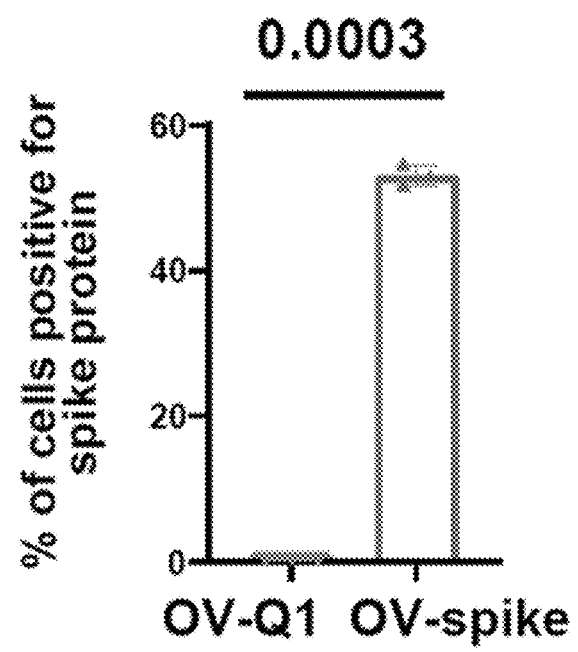

OV-spike infection causes SARS-CoV-2 S protein expression on the surface of virus particles and infected cells Thus, a specialized COVID-19 vaccine was developed with the dual purpose of neutralizing cancer and boosting anti-SARS-CoV-2 antibody production in cancer patients. The membrane-bound S protein and vector-based vaccines typically work better than non-vector-based vaccines[23]. The full-length S protein was therefore fused with the oHSV gD transmembrane domain and intracellular domain to induce S protein expression on the surface of oHSV particles[24-26] (FIG. 1C, where Spike refers to the spike (S) protein and gD refers to the transmembrane and intracellular domain). OV-spike was constructed based on the parental oHSV named OV-Q1, which was double-attenuated by inactivating the ribonucleotide reductase gene (ICP6) and deleting both copies of the neurovirulence gene (ICP34.5), thereby limiting its replication to tumor cells and reducing its neurovirulence[27]. To retain expression of the endogenous gD protein, which is used for oHSV entry into cells, the transgene encoding the S protein fusion protein was expressed at the ICP6 locus, driven by the promoter of the HSV-1 immediate early gene IE4/5. Thus, OV-spike is designed to express both gD and the SARS-CoV-2 S protein on its surface. The genetic maps of wild-type human HSV-1, OV-Q1, and OV-spike are illustrated in FIG. 1C, and the scheme of OV-spike is shown in FIG. 1D. Negative staining electron microscopy revealed the construct of OV-Q1 and OV-spike (FIG. 1E), and S protein was verified on the surface of OV-spike but not OV-Q1 surface using immunogold labeling with an anti-SARS-CoV-2 S protein antibody (FIG. 1F). An immunoblotting assay of the concentrated virus of OV-Q1 and OV-spike further confirmed that S protein was expressed in OV-spike viral particles but not the OV-Q1 particles (FIG. 1G). The real-time quantitative PCR results showed that the S protein was highly expressed in the OV-spike-infected cells compared to OV-Q1-infected cells (FIG. 1H). Furthermore, S protein could also be detected on the surface of OV-spike-infected-Vero cells but not OV-Q1-infected-Vero cells by flow cytometry (FIG. 1I). Collectively, Applicant's results indicated that the novel OV-spike vaccine candidate causes S protein expression on the surface of viral particles and the infected cells and works as a vector-based vaccine.

OV-Spike Injection Induces Anti-S Antibody Production in Mouse Sera

Figure 2A:
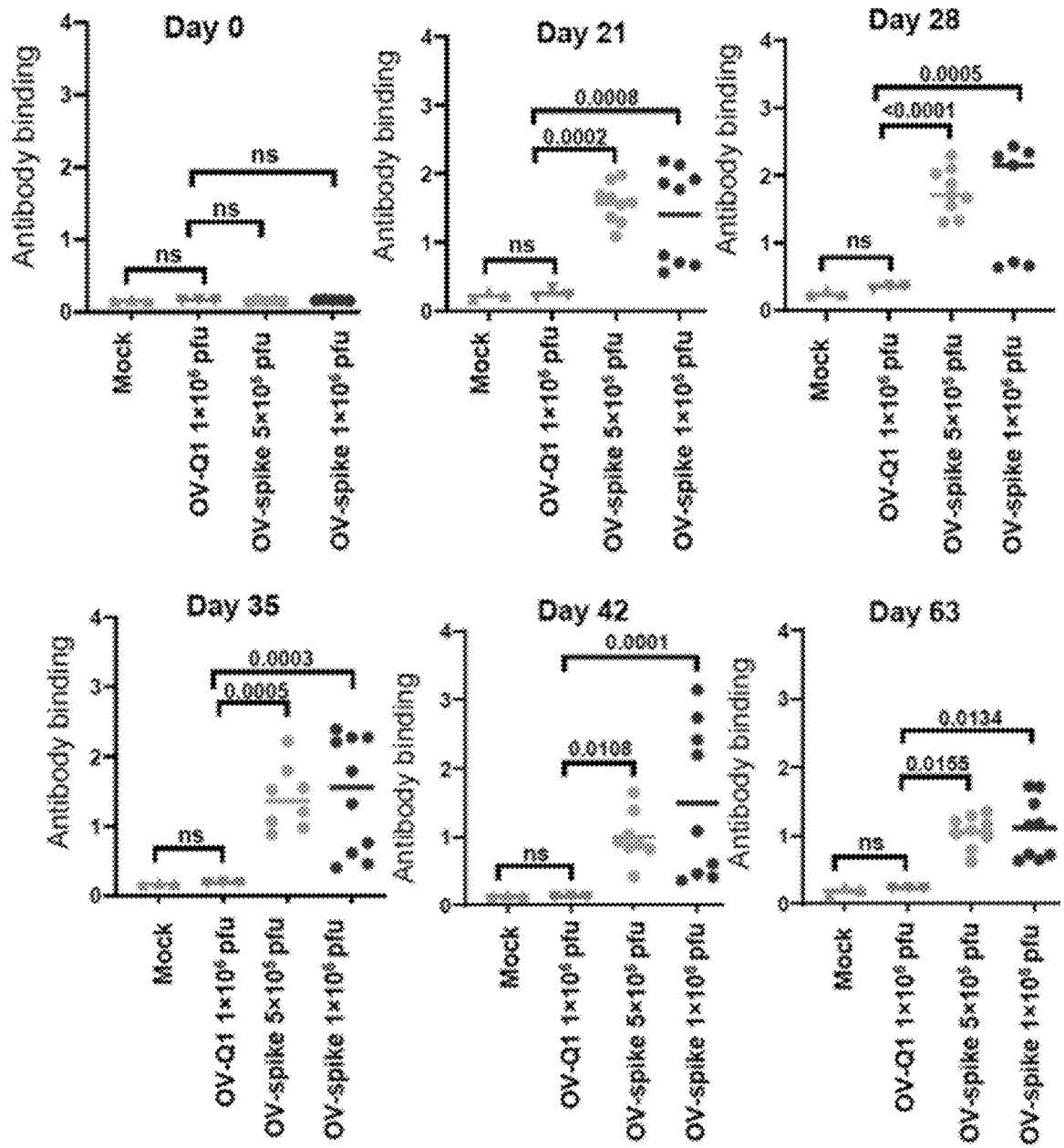
FIGS. 2A-2F: OV-spike vaccination induces anti-S protein production in mouse serum.
Figure 2B:
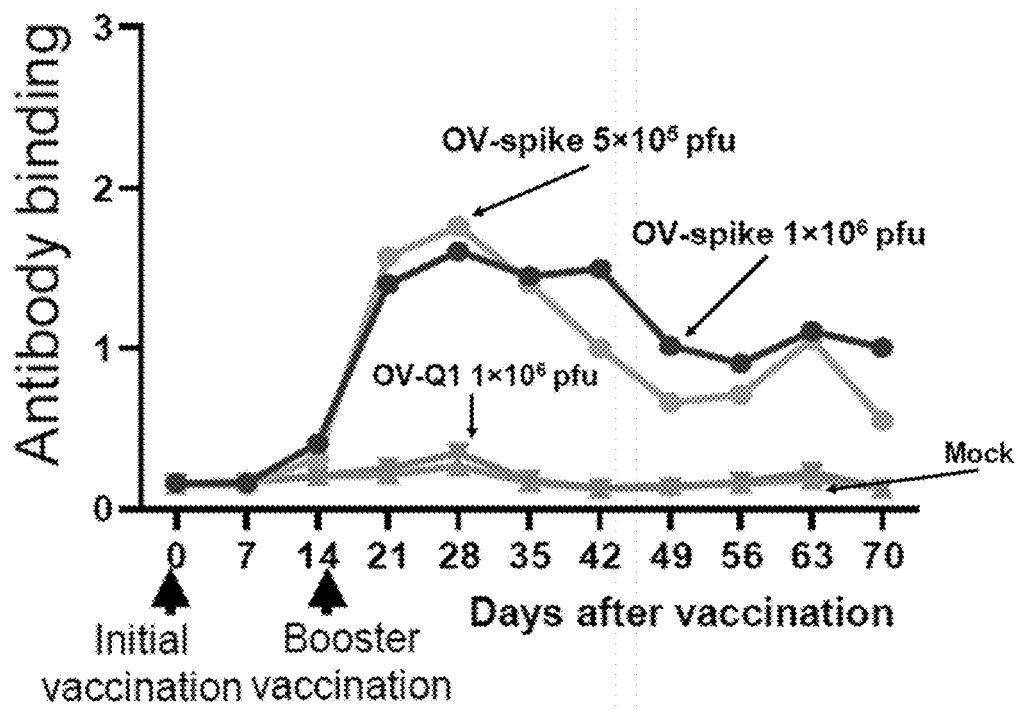
Figure 2C:
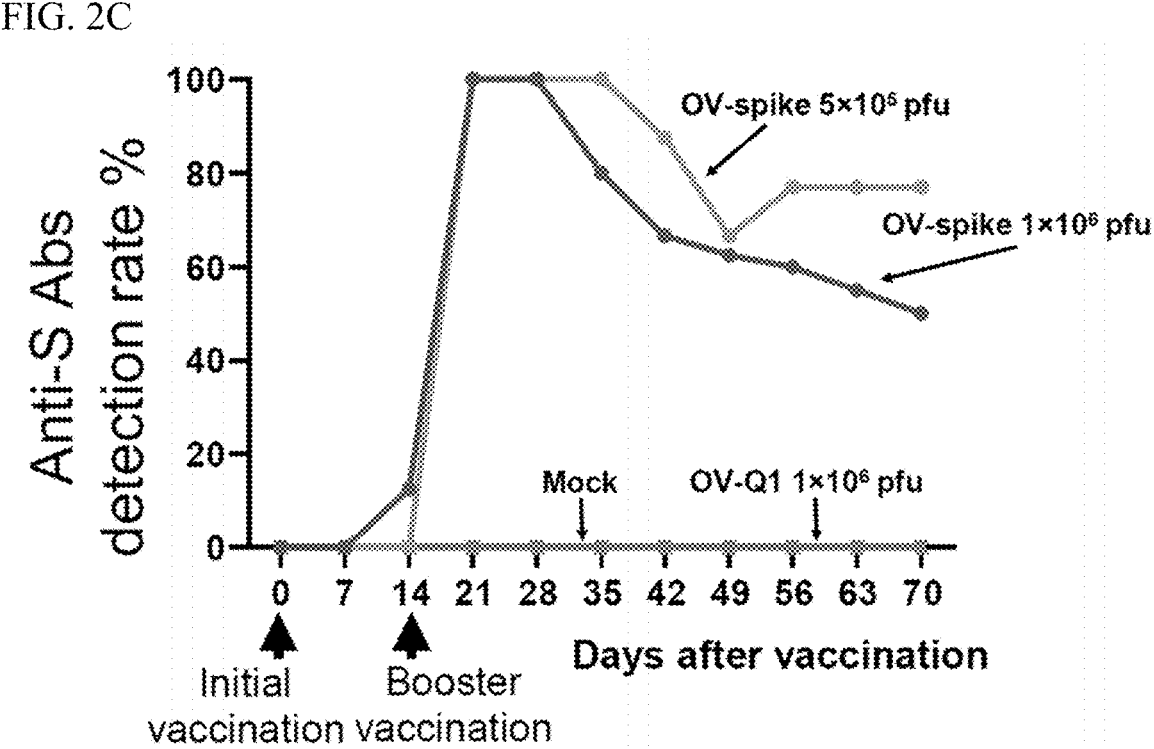
Figure 2D:
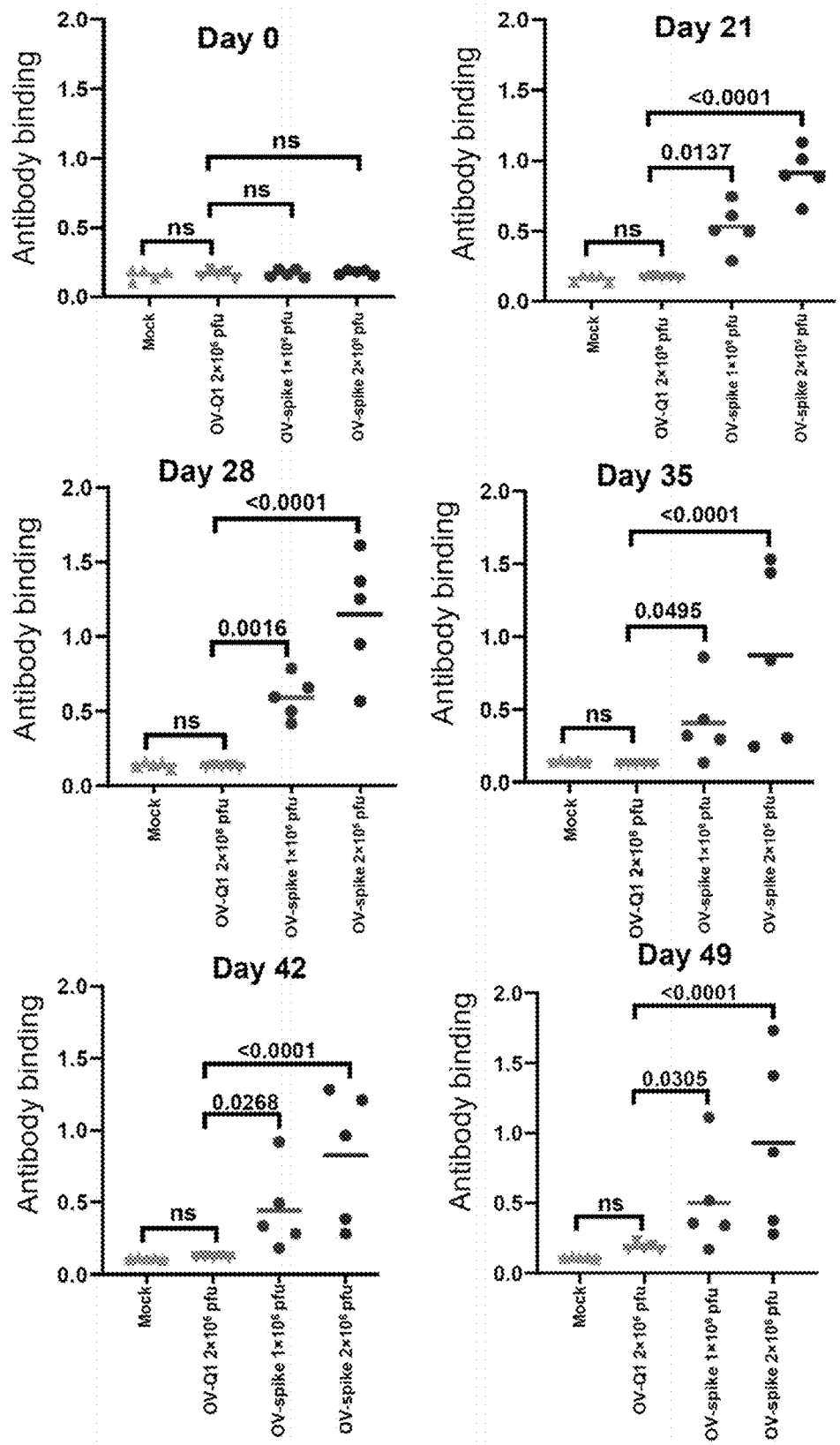
Figure 2E:
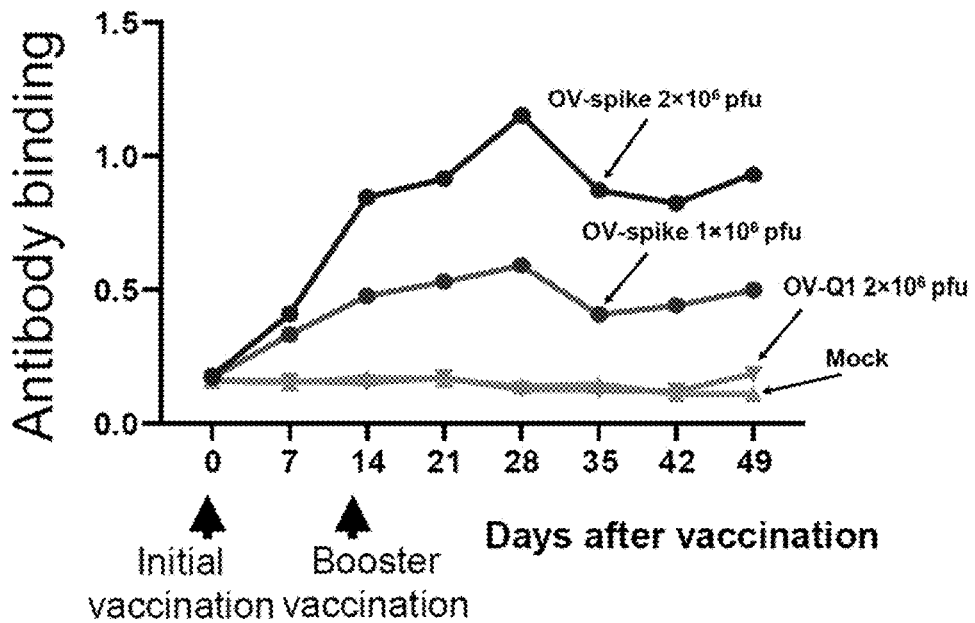
Figure 2F:
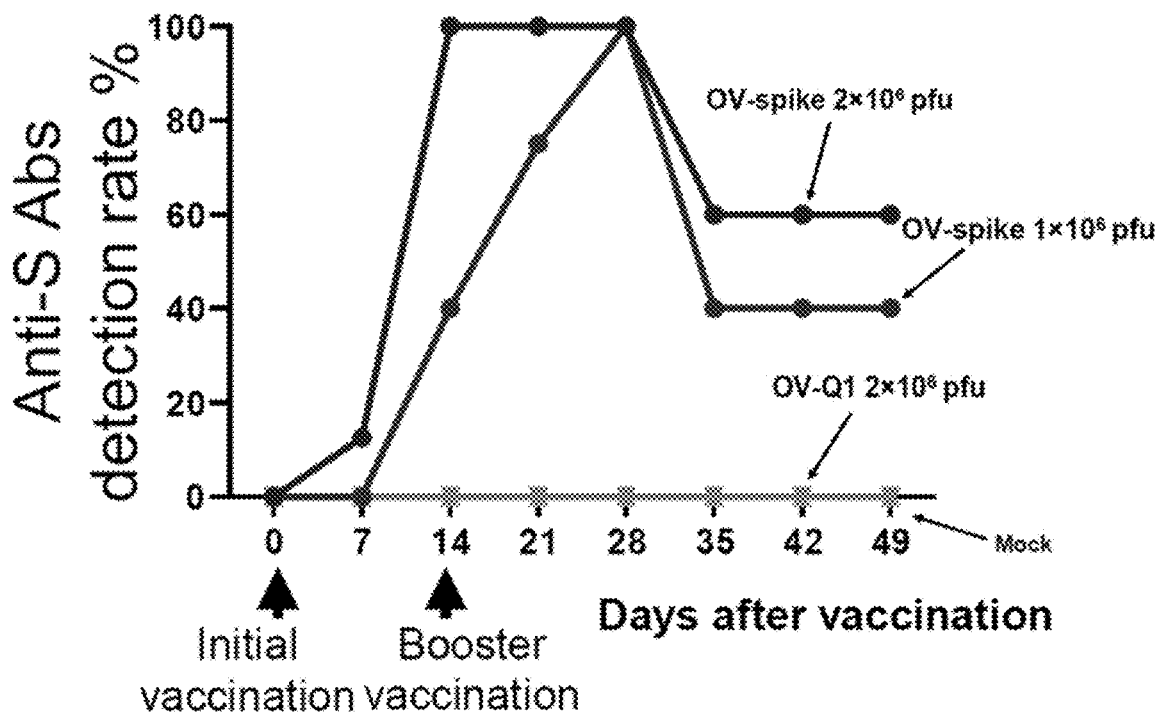
Figure 6A:
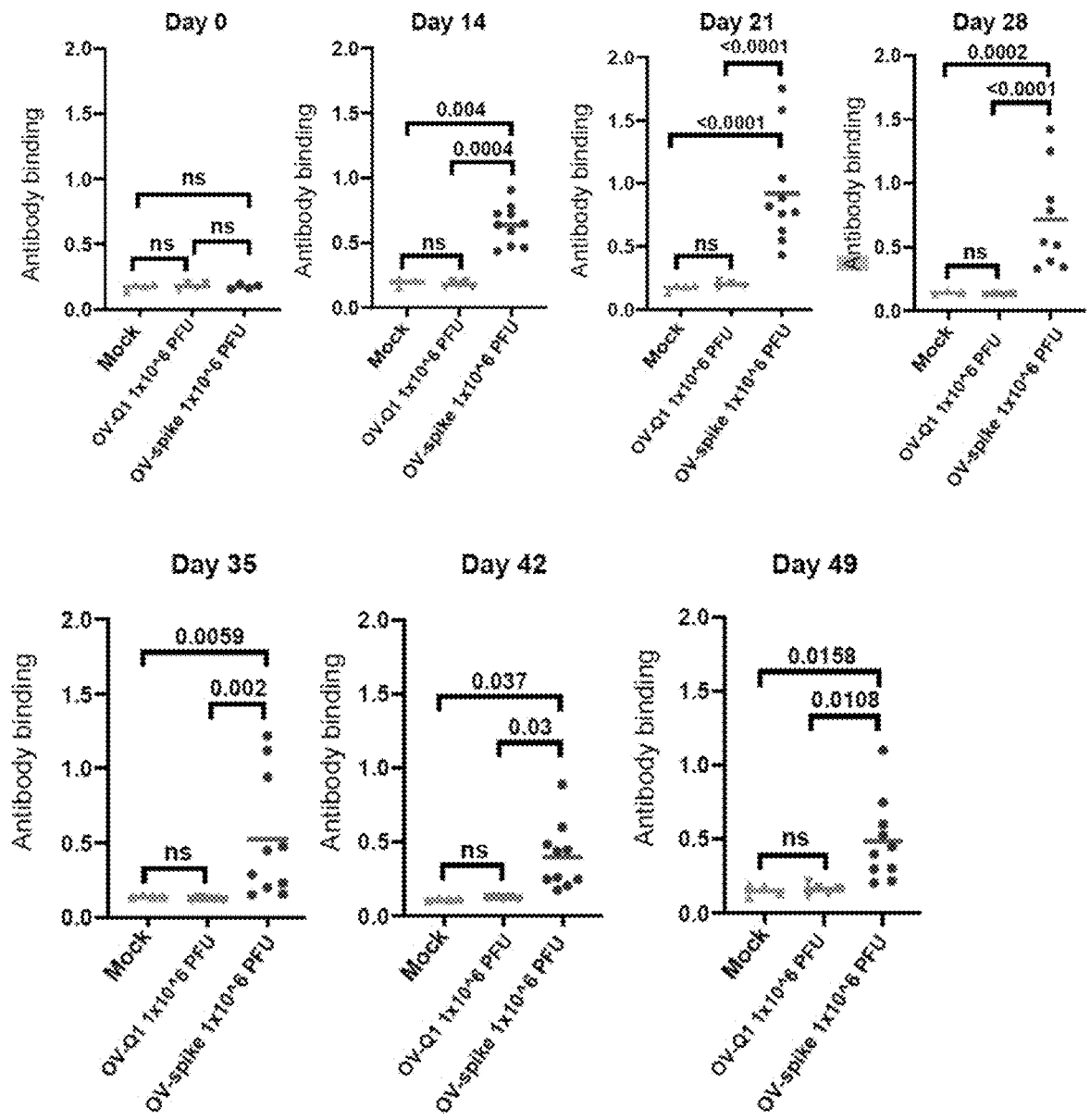
FIGS. 6A-6C: Intravenous injection of OV-spike induces anti-S antibody production in mouse serum. C57BL/6 mice were vaccinated by i.v. injection with $1 \times 10^6$ pfu OV-spike, $1 \times 10^6$ pfu OV-Q1 or saline on days 0 and 14.
Figure 6B:
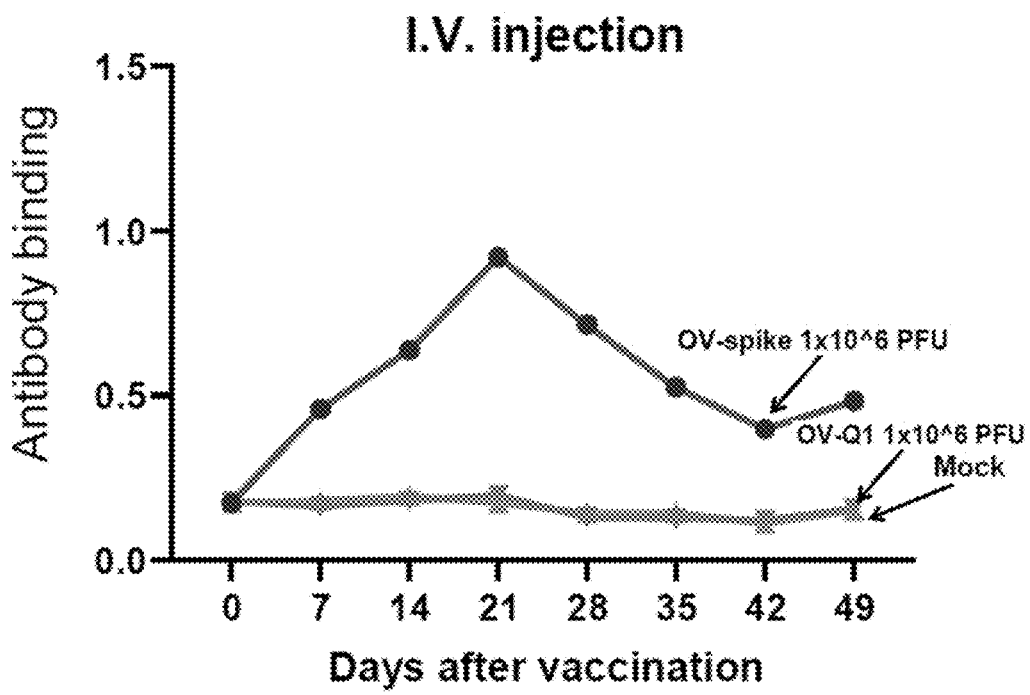
Figure 6C:
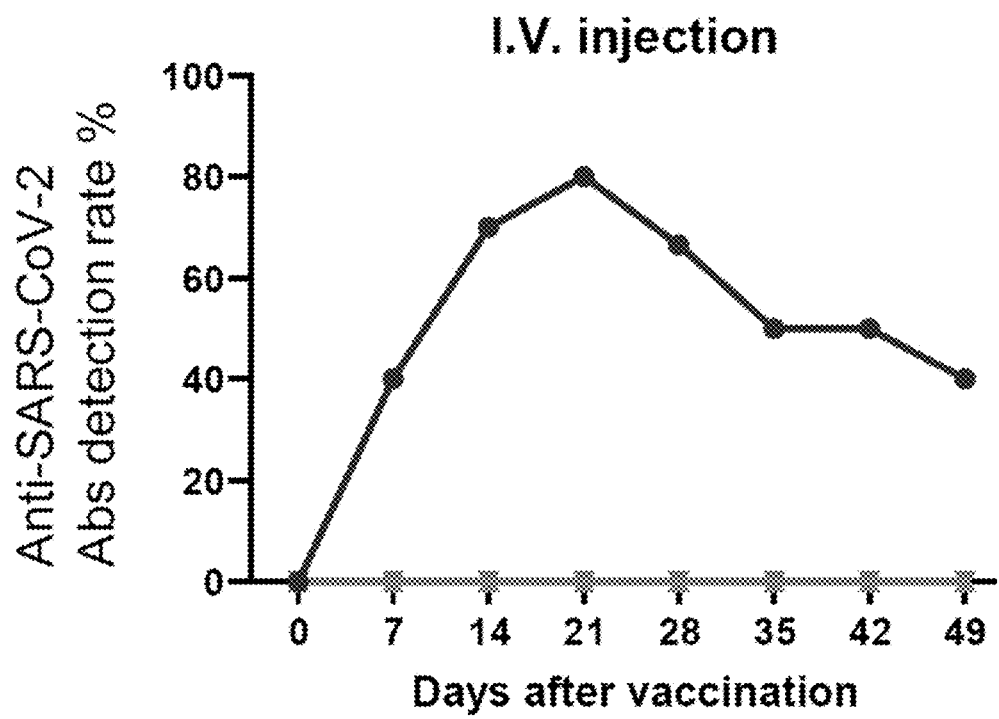

To test whether OV-spike injection could induce anti-S-specific antibodies, BALB/c mice were vaccinated on day 0 with $1 \times 10^6$ or $5 \times 10^5$ plaque-forming units (pfu) of OV-spike via intravenous (i.v.) administration. Mice were administered $1 \times 10^6$ pfu OV-Q1 or saline (mock vaccination) as negative controls. On day 14, the mice were boosted with a second dose. Serum samples were collected every 7 days for 10 weeks. The anti-S-specific antibodies could be detected starting at on day 21 (FIG. 2A). The production of the antibodies peaked on day 28 and gradually decreased, though a substantial amount still was present on day 70 (FIG. 2B). 100% of tested mice produced anti-S antibodies on day 21 and 28, and over 50% of the mice still produced substantial levels of the antibodies on day 70 (FIG. 2C). Meanwhile, mice of a different strain, C57BL/6, were also i.v injected with $1 \times 10^6$ pfu of OV-spike to validate the results. The vaccinated C57BL/6 mice produced anti-S-specific antibodies, and the antibody concentration peaked at day 21 post vaccination. Notably, the anti-S-specific antibodies were present in sera from i.v vaccinated C57BL/6 mice as early as day 7 (FIGS. 6A-6C). Furthermore, C57BL/6 mice were vaccinated intraperitoneally (i.p), with $1 \times 10^6$ pfu or $2 \times 10^6$ pfu OV-spike on day 0 and 14 to test an alternative administration route. Similar results were observed but with a clearer dose-dependent response (FIG. 2D-2F). Most mice started to produce anti-S specific antibodies rapidly after day 7, and in general, mice in the high OV-spike dose group produced antibodies more quickly than those in the corresponding low dose group (FIG. 2F).

Figure 3A:
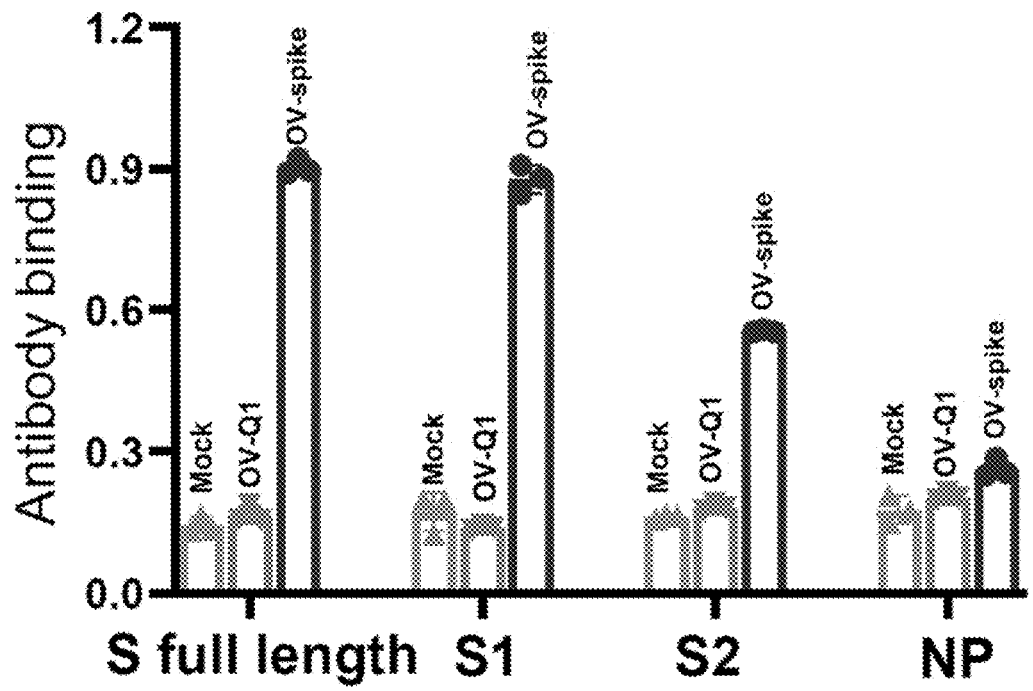
FIGS. 3A-3I: Sera from OV-spike vaccinated mice inhibits both VSV-SARS-CoV-2 and SARS-CoV-2 infection in vitro.
Figure 3B:
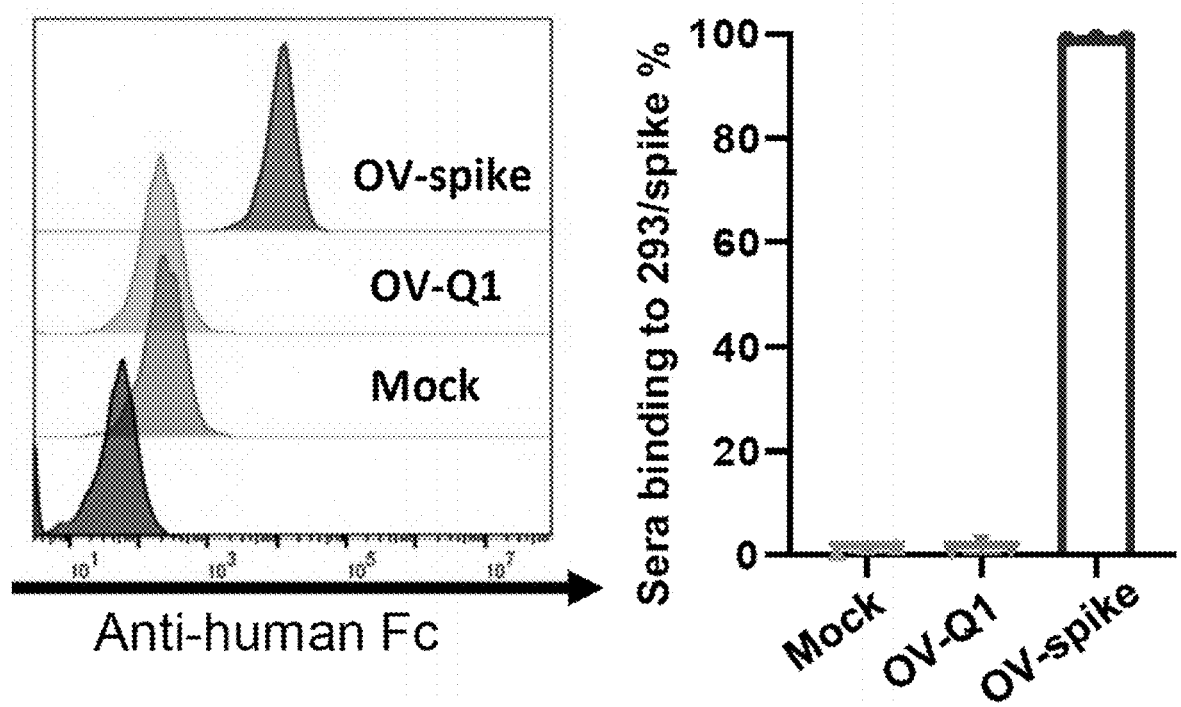
Figure 3C:
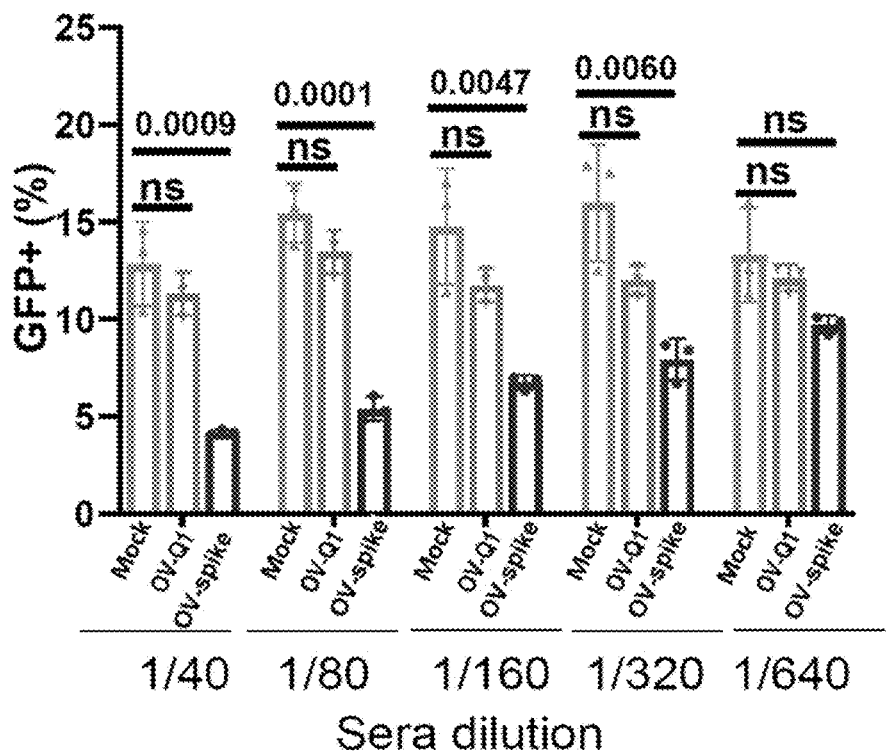
Figure 3D:
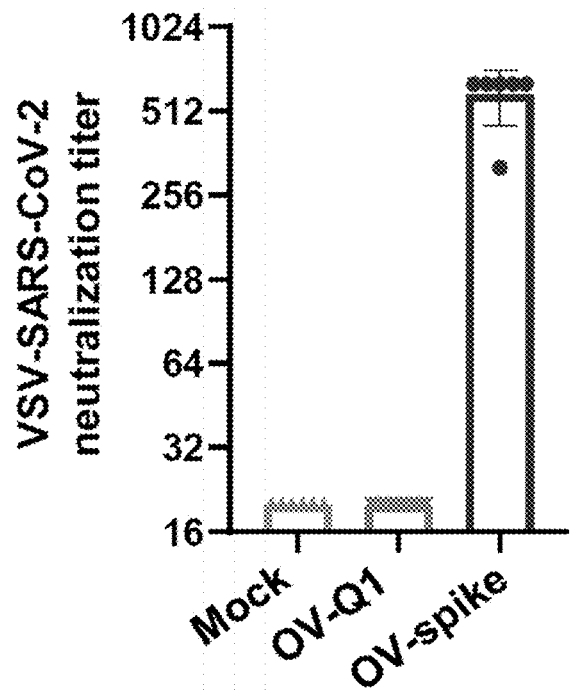
Figure 3E:
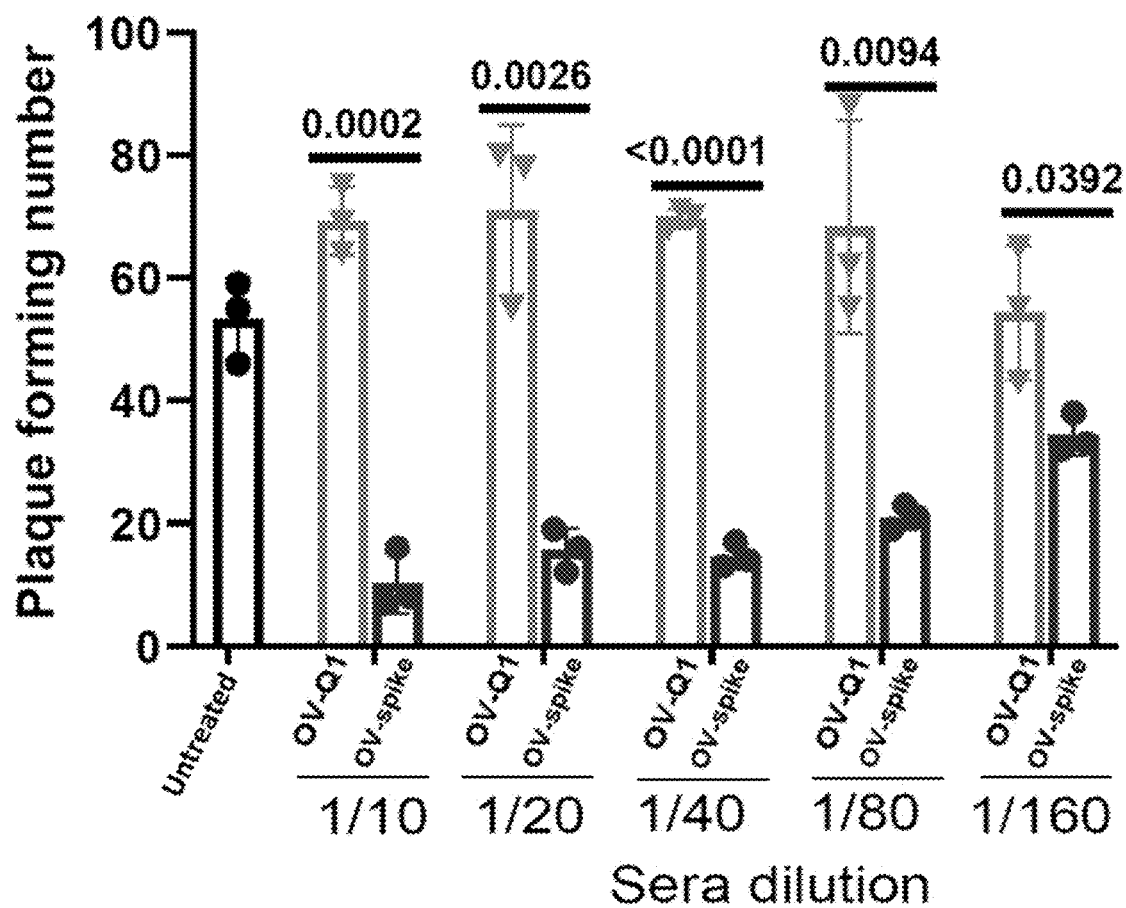
Figure 3F:
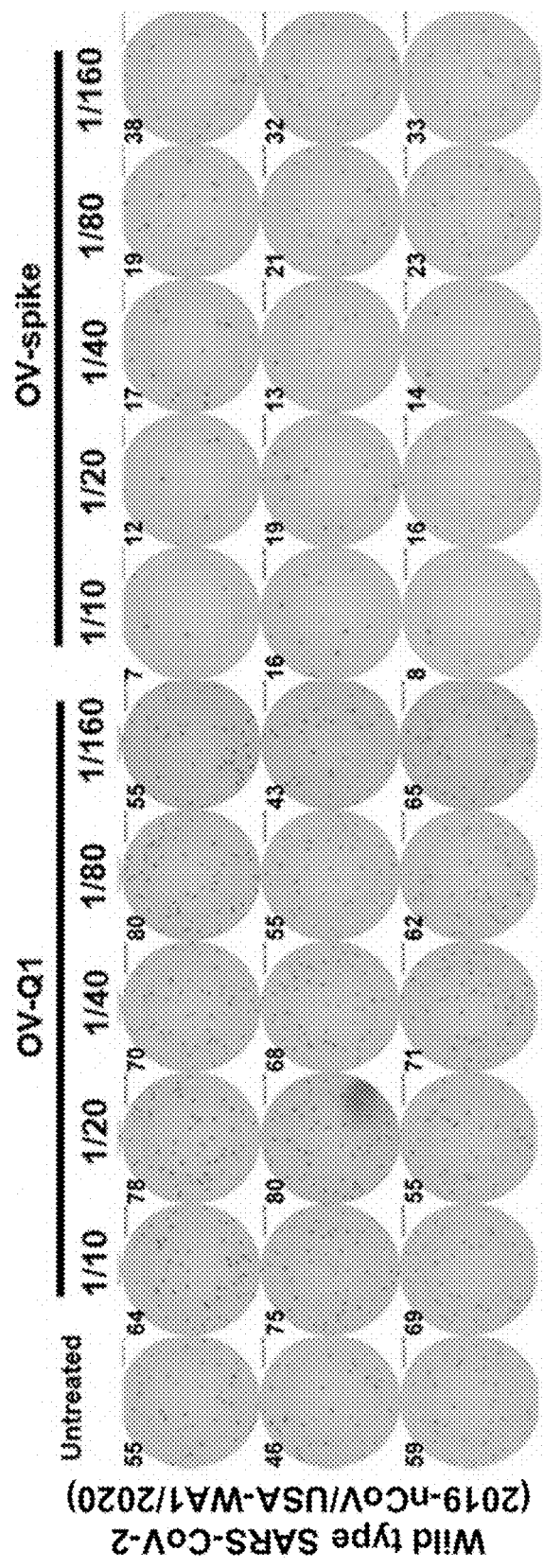

Sera from OV-Spike Vaccinated Mice Inhibits both VSV-SARS-CoV-2 and SARS-CoV-2 Infection in Vitro An enzyme-linked immunosorbent assay (ELISA) was used to measure the binding affinity of S protein to serum samples from vaccinated mice. Only the sera from OV-spike-immunized mice had a high level of binding affinity with S protein, and the major binding epitope was in 51 subunit (FIG. 3A). Flow cytometry further confirmed this result, as the sera from OV-spike-immunized mice could efficiently bind to HEK293T cells expressing S protein on the cell surface (FIG. 3B). A neutralization assay with the VSV-SARS-CoV-2 chimeric virus revealed that sera from OV-spike-immunized mice could neutralize viral infection in a dose-dependent manner (FIG. 3C and FIGS. 7A-7C), and the sera collected from OV-spike immunized mice showed neutralization capacity up to a 320-fold dilution but did not at a 640-fold dilution (FIGS. 3C-3D). To further confirm the neutralization function of sera from OV-spike vaccinated mice, prior to infection of Vero cells, live wild type SARS-CoV-2 virus (2019-nCoV/USA-WA1/2020), termed as WA1 was preincubated with the diluted sera from mice immunized with OV-spike or OV-Q1 in a BSL3 lab. The viral infection was determined using an immunoplaque assay. Results showed that the sera collected from OV-spike-immunized mice significantly reduced live wild type SARS-CoV-2 infection in a dose-dependent manner compared to sera from OV-Q1-immunized mice (FIGS. 3E-3F).

Figure 3G:
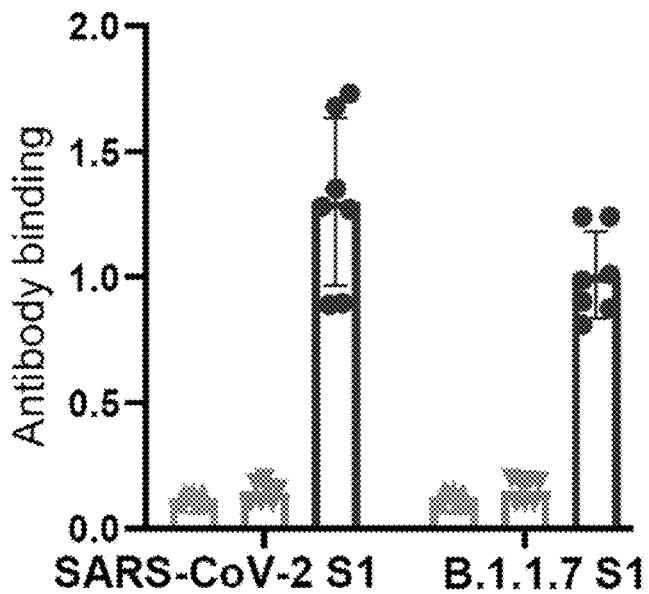
Figure 3H:
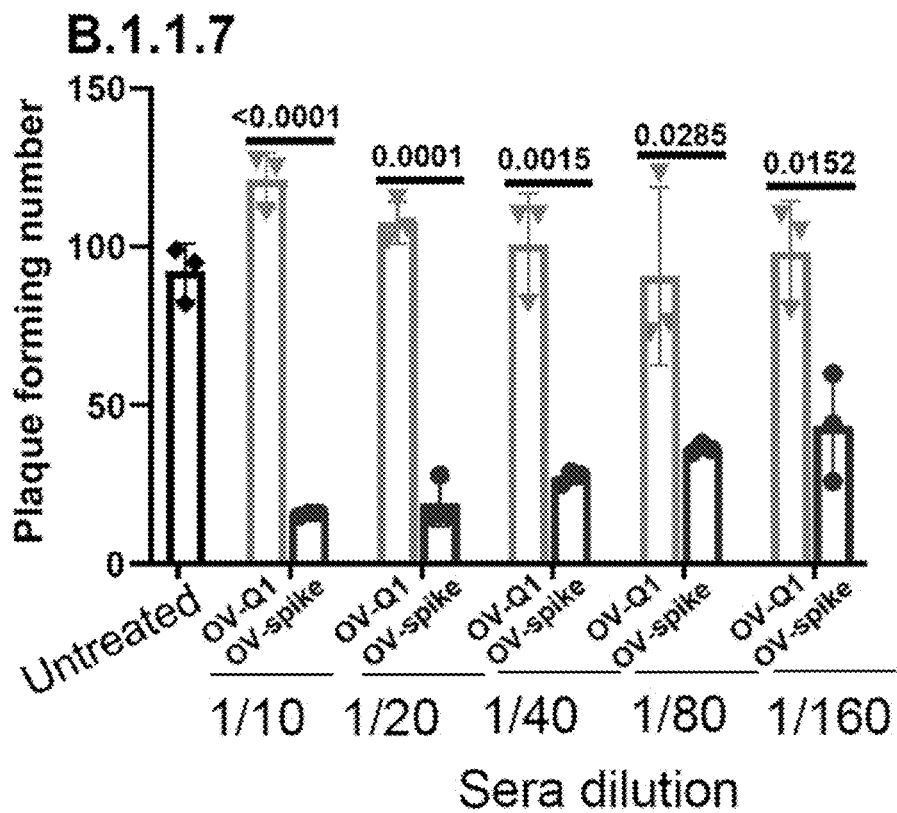
Figure 3I:
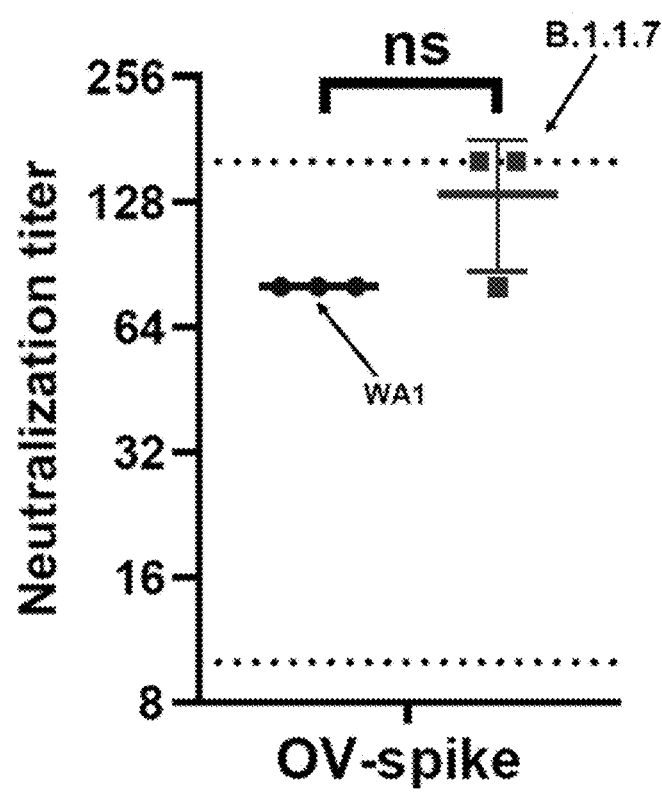
Figure 7A:
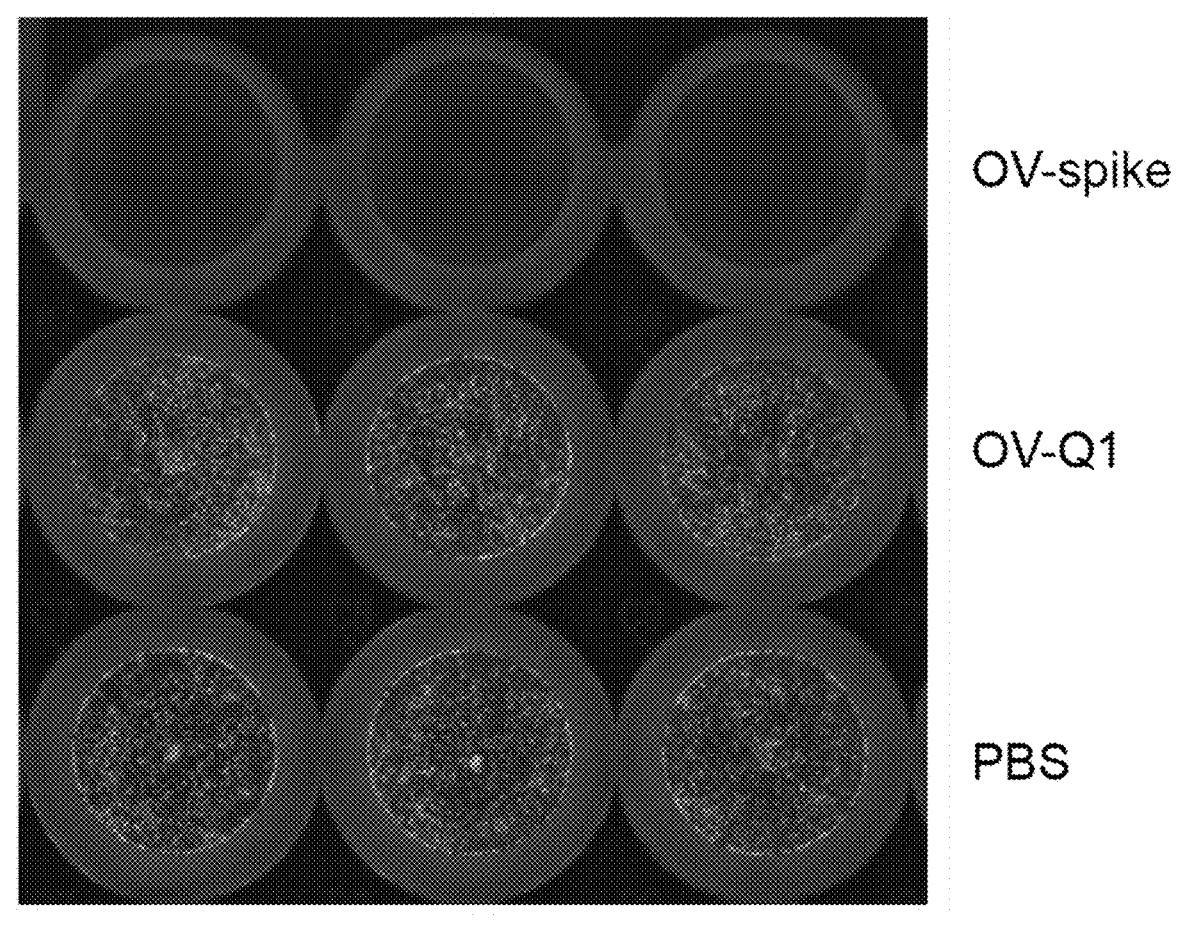
Figure 7B:
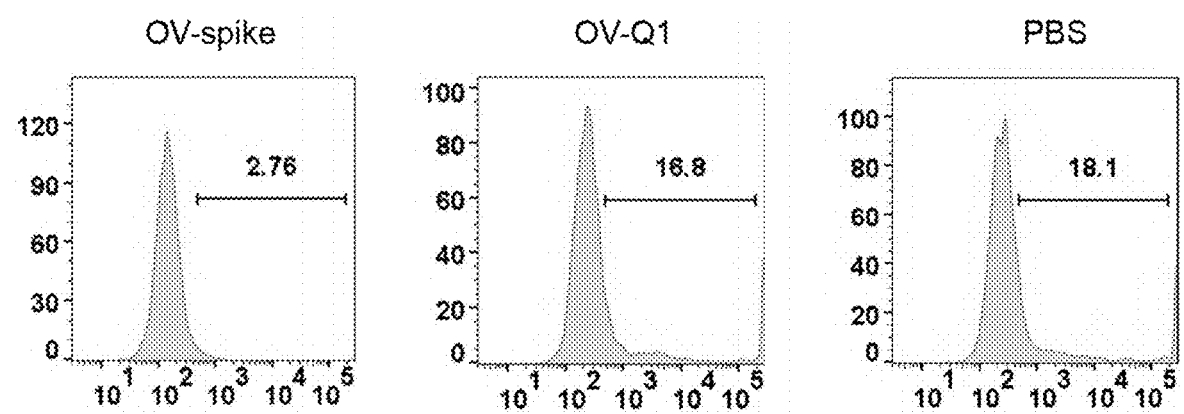
Figure 7C:
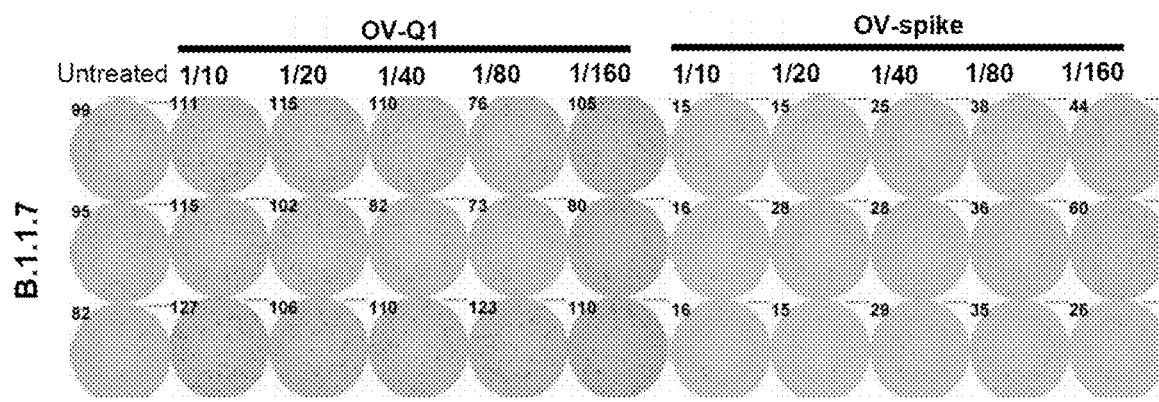

A mutant SARS-CoV-2 strain, named B.1.1.7 and informally known as the "British variant," is rapidly spreading in the world. This strain can render SARS-CoV-2 to escape antibody protection or existing vaccine protection[28]. Therefore, the OV-spike vaccine was tested for whether it could prevent infection by the B.1.1.7 strain. First, the binding affinity between the S protein 51 subunit and the sera collected from OV-spike-immunized C57BL/6 and BALB/c mice was measured. The binding affinity was similar for the 51 subunits of the B.1.1.7 strain and WA1 strain (FIG. 3G). Further, the ability of sera from OV-spike vaccinated mice to neutralize the B.1.1.7 strain of SARS-CoV-2 was measured. Prior to infection of Vero cells, the B.1.1.7 strain was pre-treated with the diluted sera from OV-spike or OV-Q1 immunized mice. The immunoplaque assay demonstrated that the sera collected from OV-spike mice significantly also showed neutralization function against live B.1.1.7 strain virus infection in a dose-dependent manner compared to that collected from OV-Q1 groups (FIG. 3H and FIG. 7C). Furthermore, sera from OV-spike vaccinated mice showed no difference of neutralization capacity against live WA1 strain and B.1.1.7 mutant strains (FIG. 3I). Together, these data demonstrate that OV-spike can promote hosts to produce anti-S-specific neutralization antibodies to resist infection by SARS-CoV-2, including the B.1.1.7 variant.

Vaccination with OV-Spike Inhibits Tumor Progression and Induces anti-S Specific Neutralization Antibodies in Tumor-Bearing Mice.

Figure 4A:
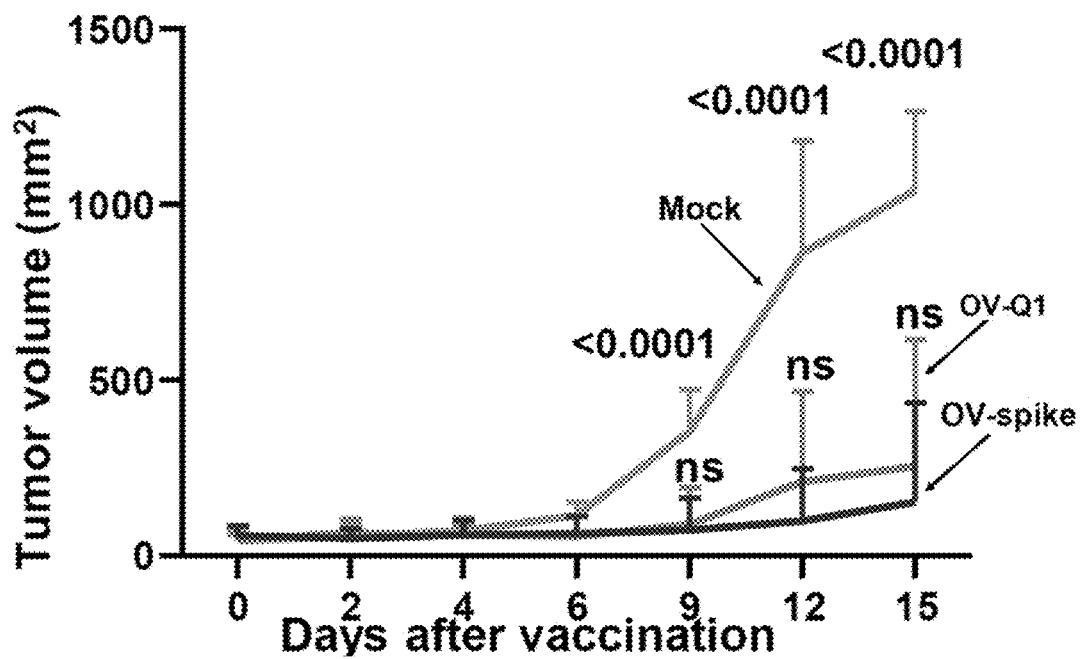
Figure 4B:
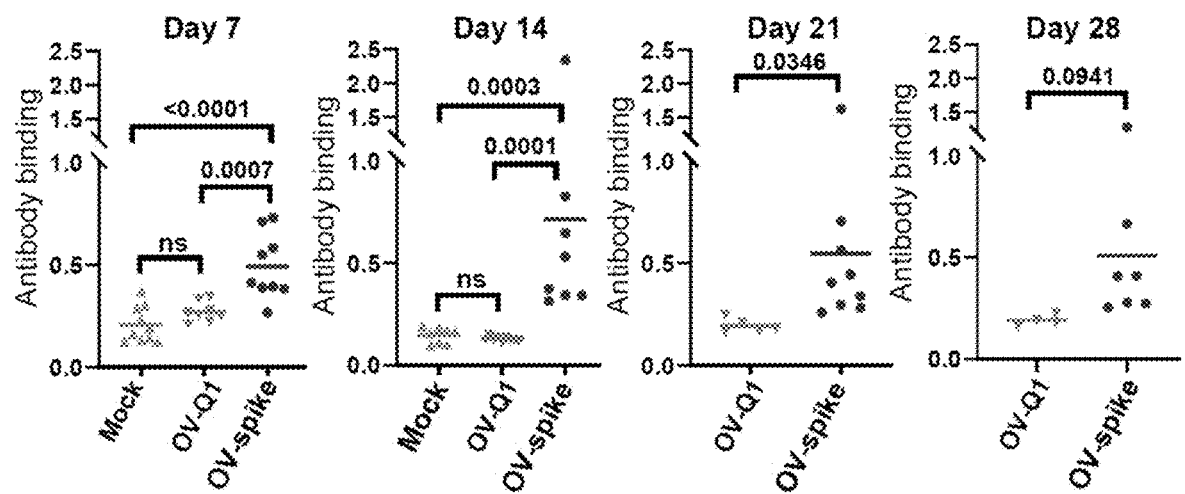
Figure 4C:
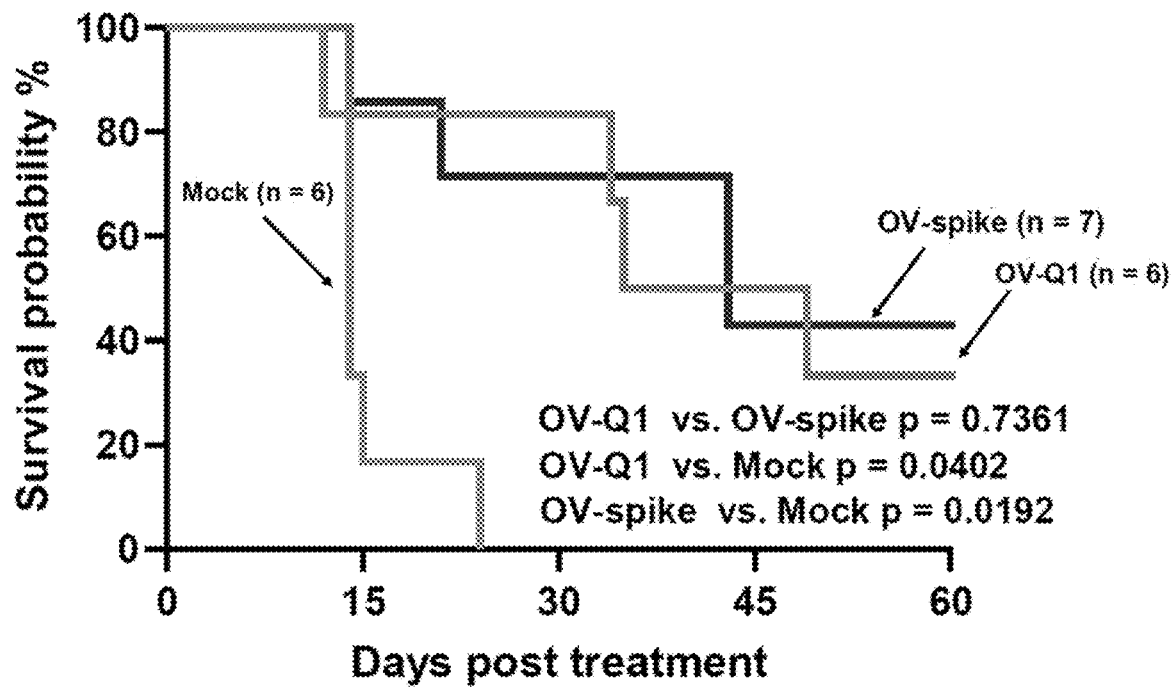
Figure 4D:
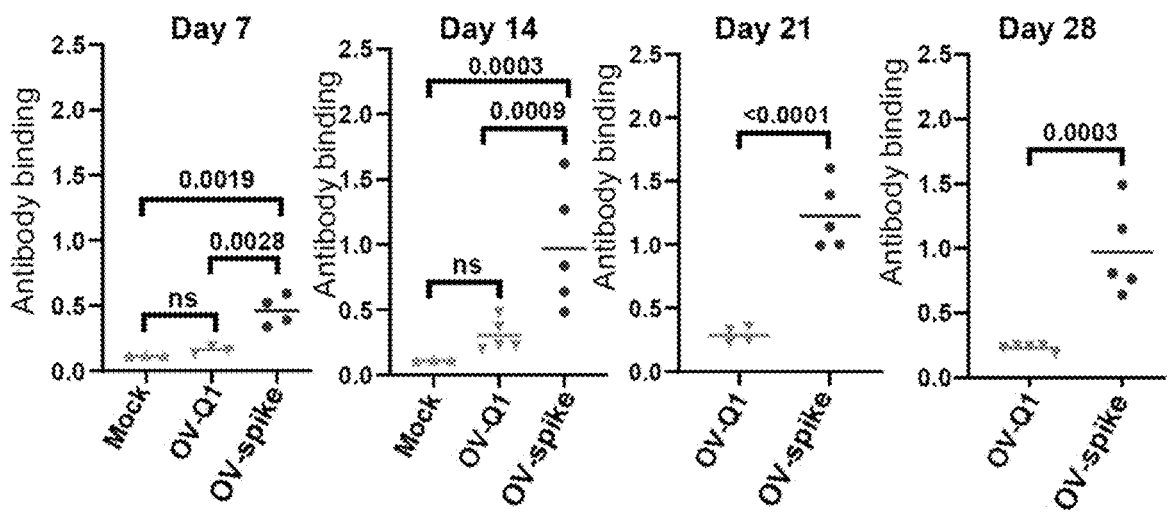
Figure 4E:
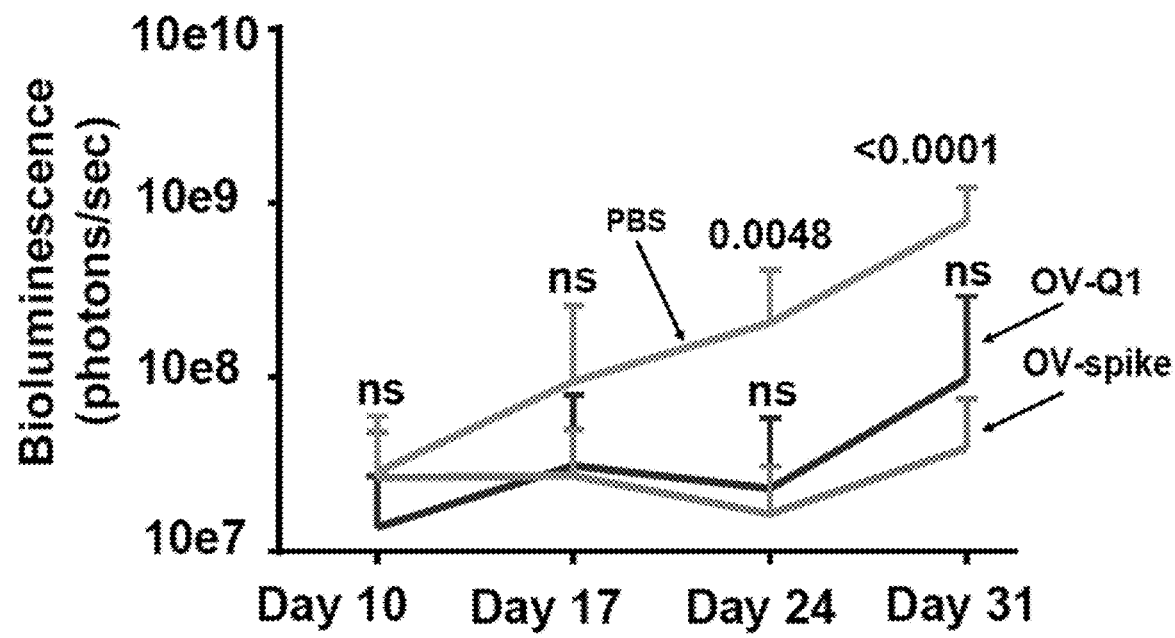
Figure 4F:
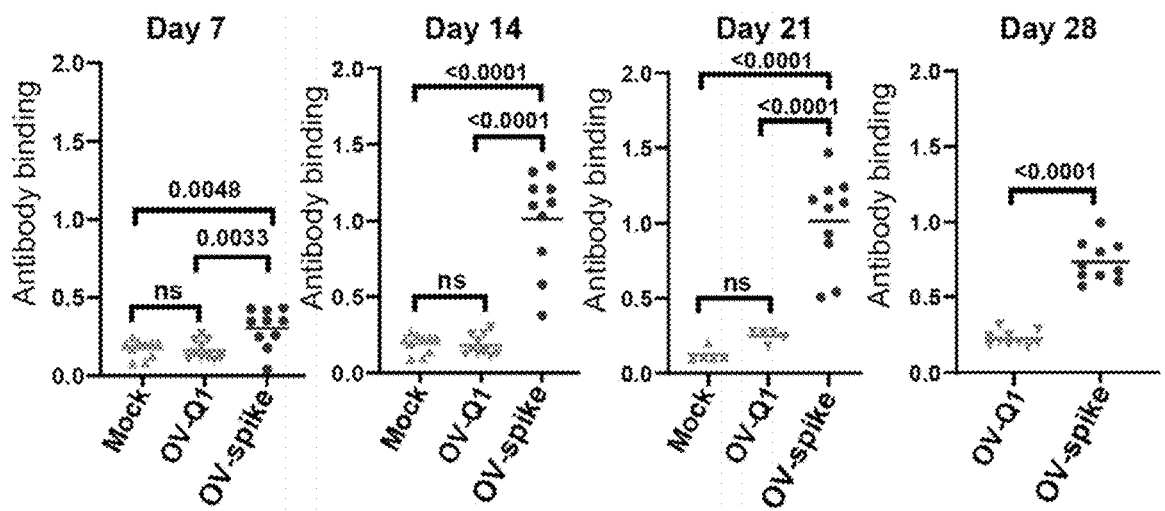
Figure 4G:
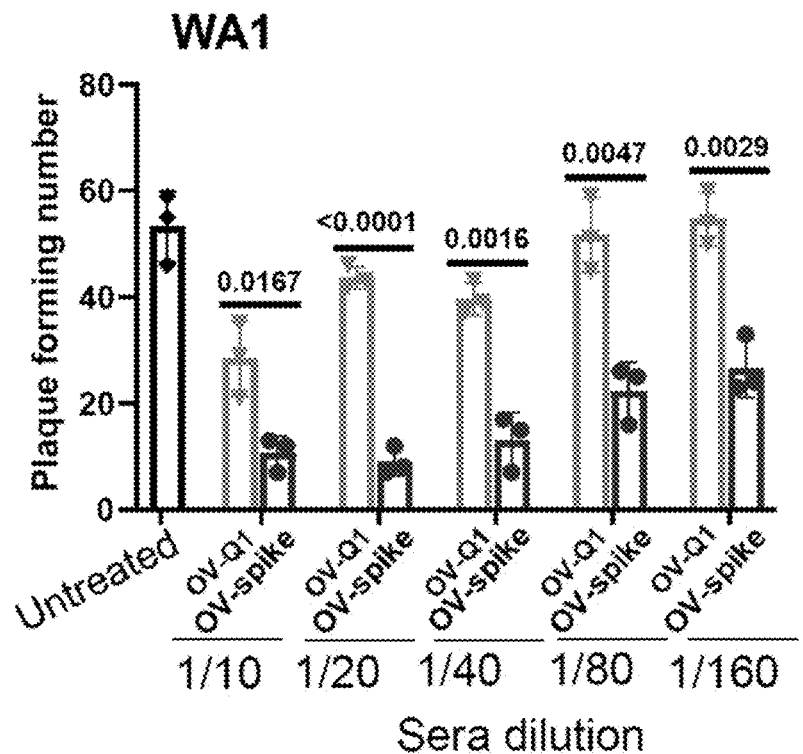
Figure 4G:
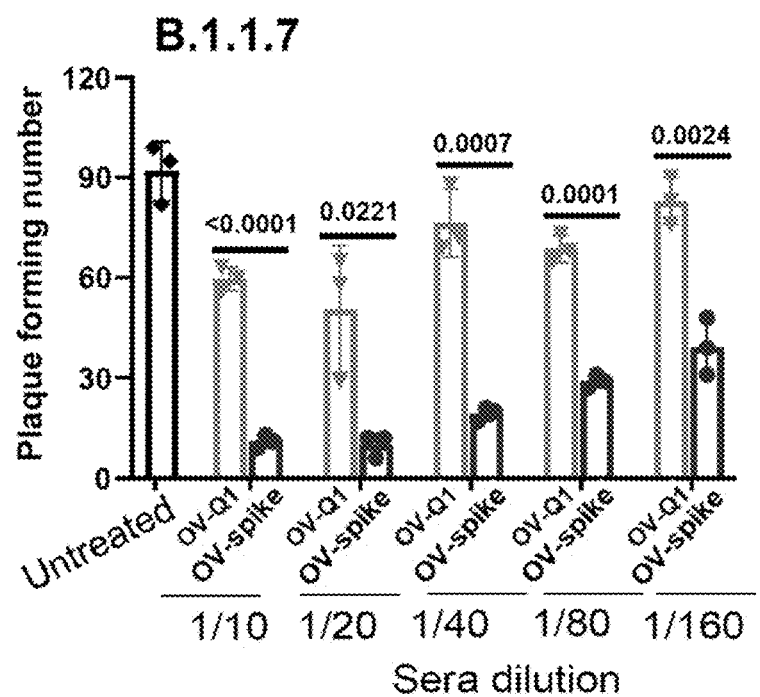
Figure 4H:
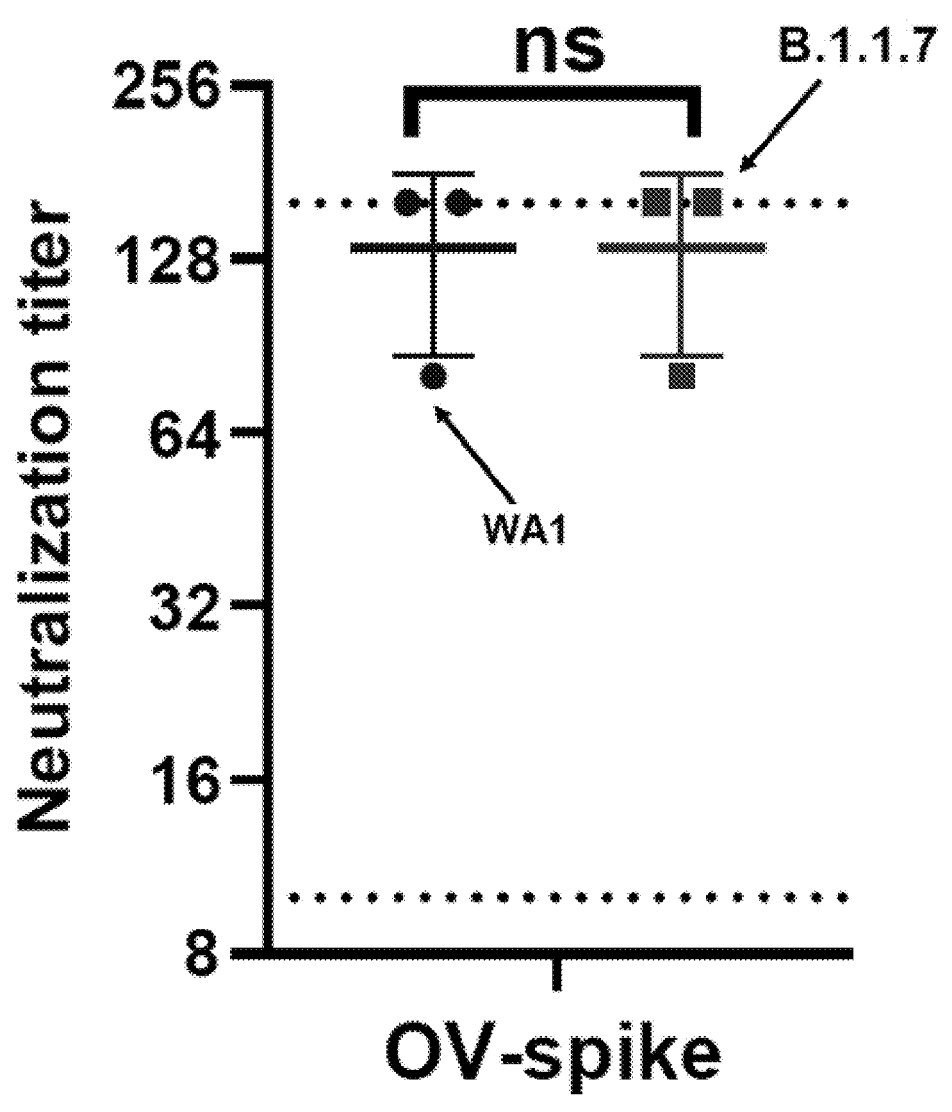
Figure 8:
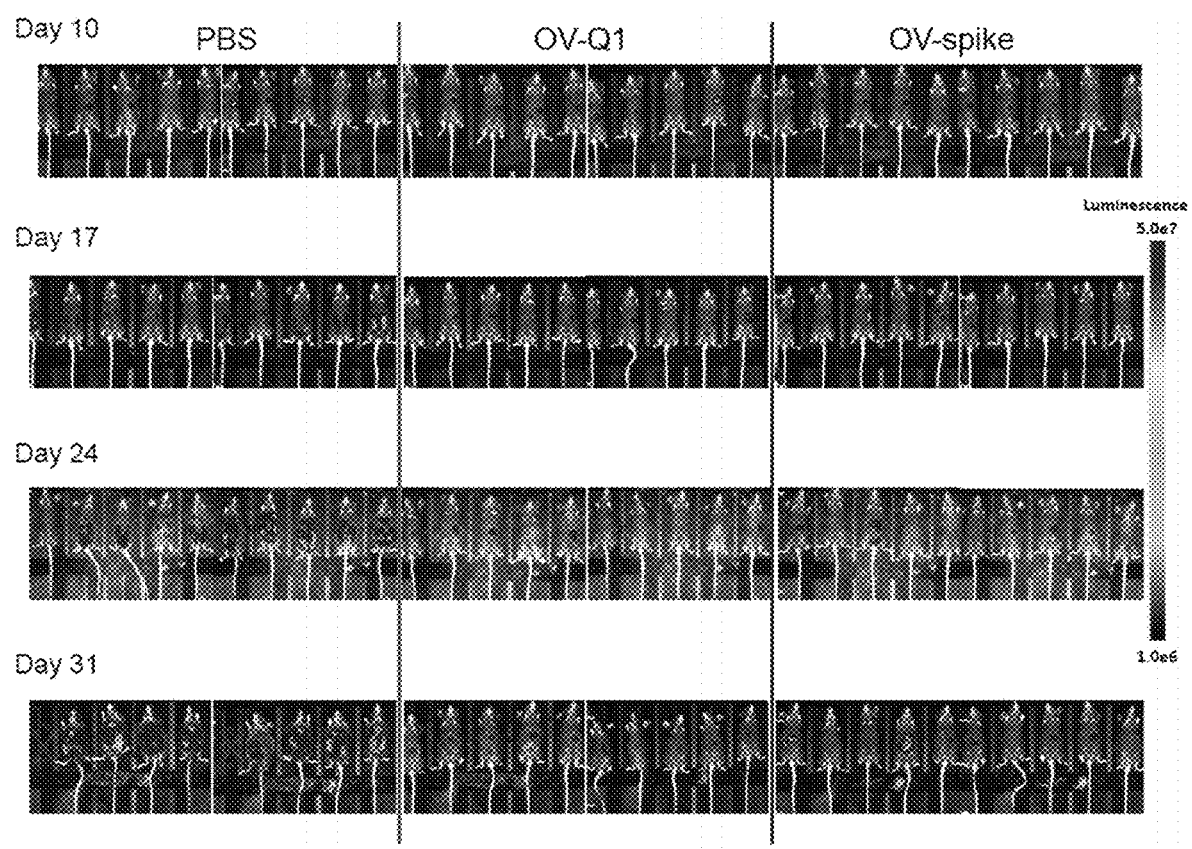
FIG. 8: OV-spike and OV-Q1 inhibit ovarian ID8 cell tumor growth. Time-lapse luciferase imaging of mice injected with ID8 ovarian cancer cells and vaccinated with PBS (saline; mock vaccination), OV-Q1, or OV-spike.
Figure 9A:
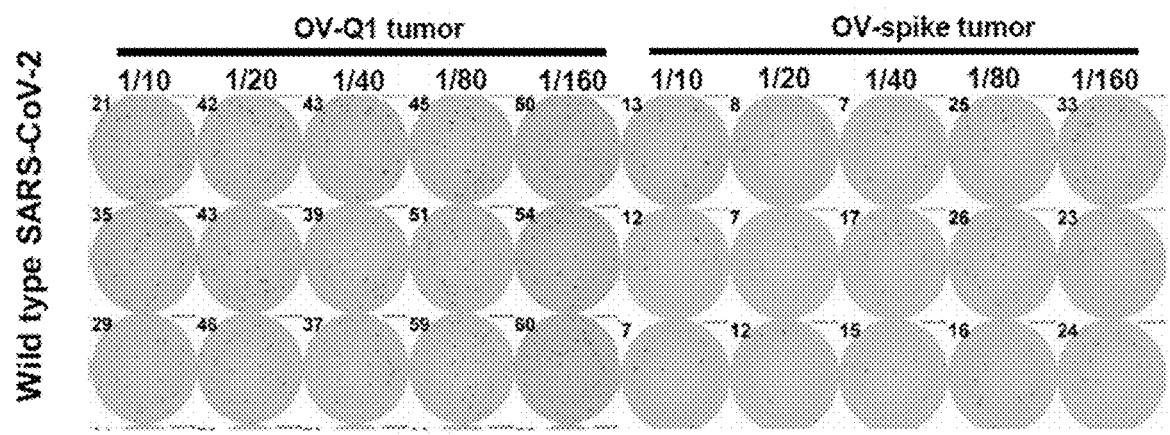
FIGS. 9A-9B: The neutralization assay against live wild type strain and B.1.1.7 virus strain infection of the sera from vaccinated mice bearing tumors.
Figure 9B:
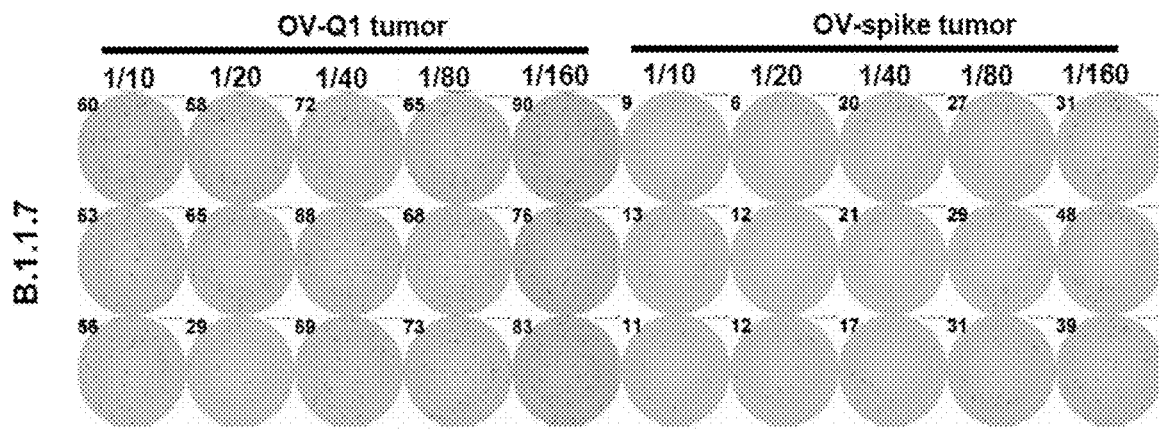

To evaluate the in vivo anti-tumor efficacy of OV-spike, three mouse tumor models were established: a melanoma model, a colon adenocarcinoma model, and an ovarian tumor model. For the melanoma model, B16 murine melanoma cells ($5\times10^5$) were subcutaneously (s.c.) injected into each mouse on day 0, followed by intratumoral injection of OV-spike, OV-Q1, or saline on each of days 5 and 7. Tumor progression was monitored by measuring the tumor size. OV-spike and OV-Q1 injection caused similar inhibition of tumor growth in vivo, compared to saline injection (FIG. 4A). Serum samples were collected every 7 days to detect anti-S-specific antibodies. All mice in the OV-spike injection group had high levels of anti-S-specific antibodies as early as day 7 (FIG. 4B). Additionally, the experiments with the colon adenocarcinoma tumor model and ovarian tumor model were repeated. For the colon adenocarcinoma model, MC38 cells ($5\times10^5$) were delivered i.p. to each mouse on day 0. Virus was then delivered i.p. on days 4, 11 and 18. Both OV-spike and OV-Q1 injection increased survival in this model relative to saline injection (FIG. 4C). OV-spike injection also stimulated anti-S-specific antibody production after vaccination starting on day 7 (FIG. 4D). Similar results were obtained from the mouse ovarian tumor model, i.e., OV-spike treatment not only inhibited tumor growth but also produced anti-S specific antibody production (FIGS. 4E-4F and FIG. 8). The OV-spike-immunized mice bearing tumors against live WA1 and B.1.1.7 mutant strains were also detected. The sera showed significantly reduced the live WA1 and B.1.1.7 mutant strain infection compared to OV-Q1-immunized mice bearing tumors (FIG. 4G and FIGS. 9A-9B). Also, sera from OV-spike vaccinated mice bearing tumor showed no difference of neutralization capacity against live WA1 strain and B.1.1.7 mutant strains (FIG. 4H). There was no significant difference in anti-S-specific antibody production between the tumor models (FIG. 10A). The sera from OV-spike-immunized mice with or without tumor showed similar neutralization function against VSV-SARS-CoV-2 infection (FIG. 10B). Thus, the data show that OV-spike can induce anti-S-specific neutralizing antibodies in animals with cancer and that the vaccine has a dual function—restraining tumor progression and inducing anti-S-specific neutralization antibodies.

Figure 5A:
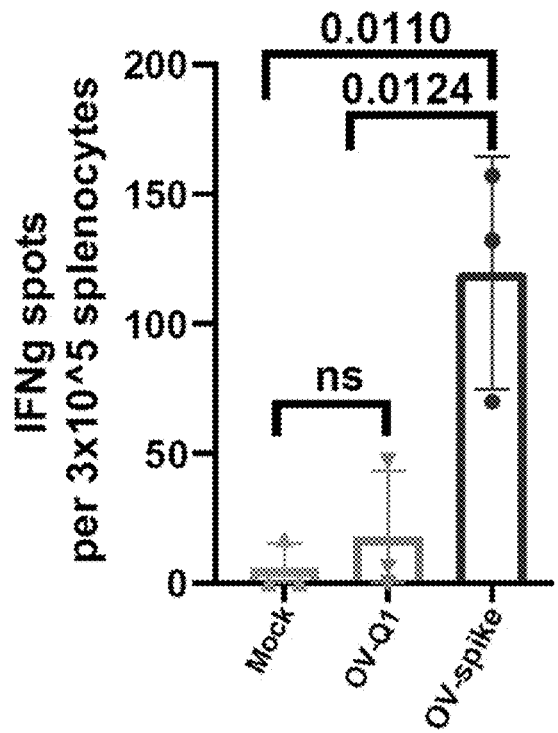
FIGS. 5A-5J: OV-spike vaccine activates immune responses in mice.
Figure 5B:
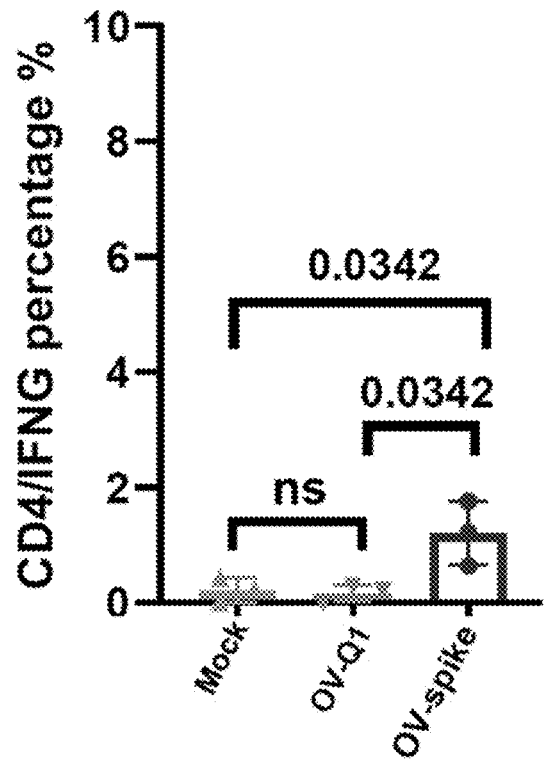
Figure 5C:
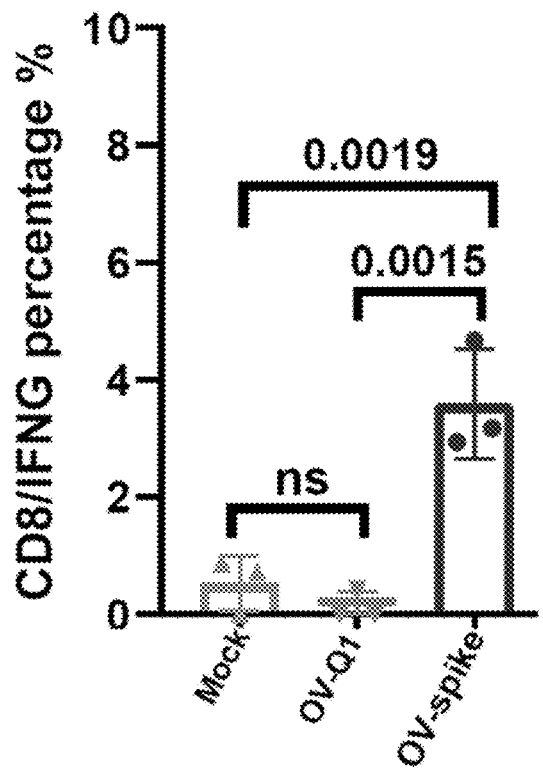
Figure 5D:
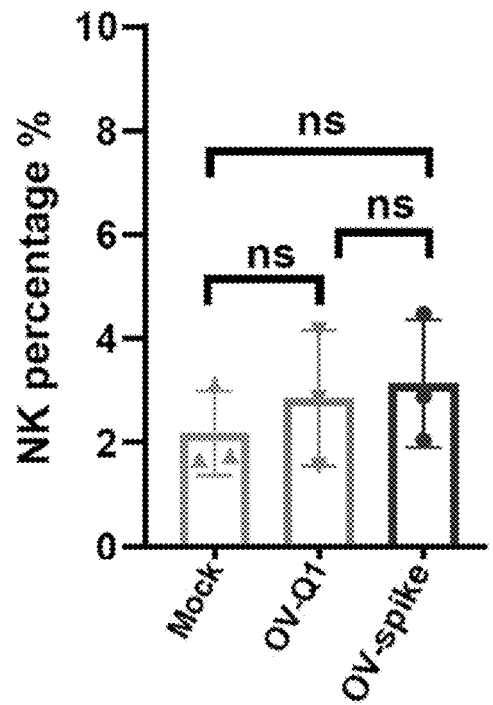
Figure 5E:
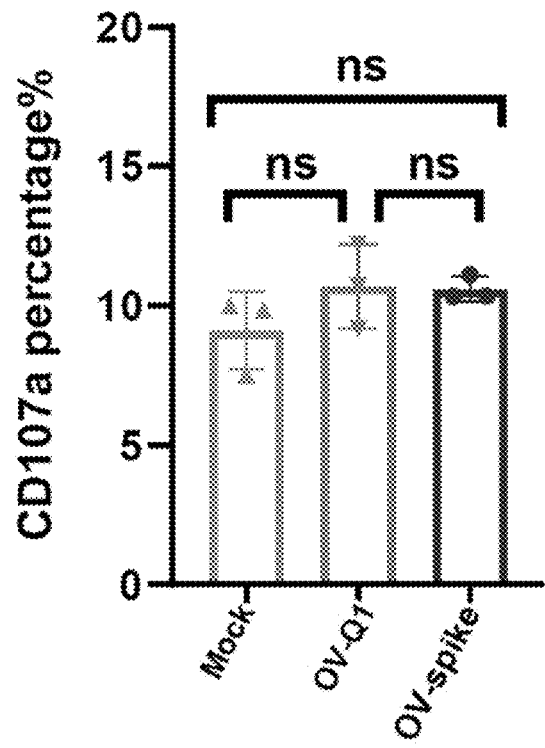
Figure 5F:
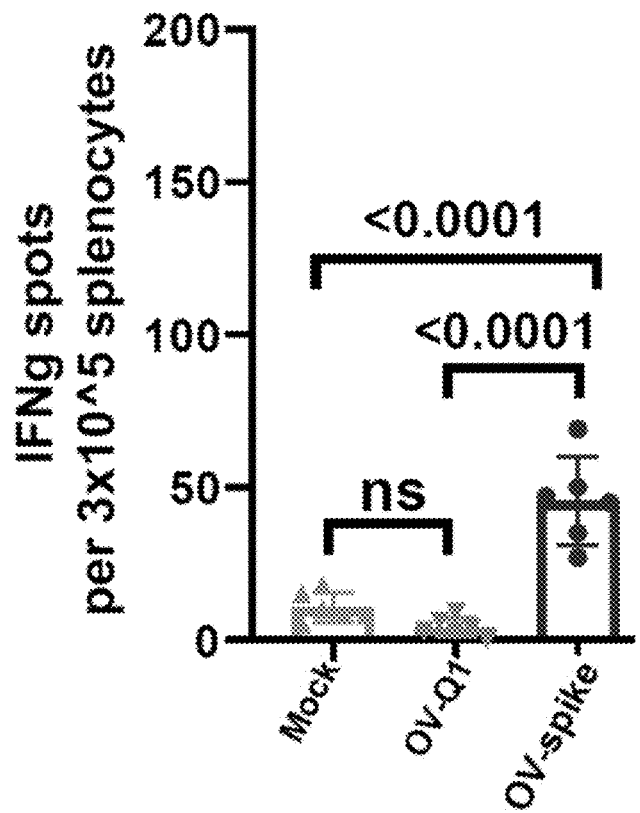
Figure 5G:
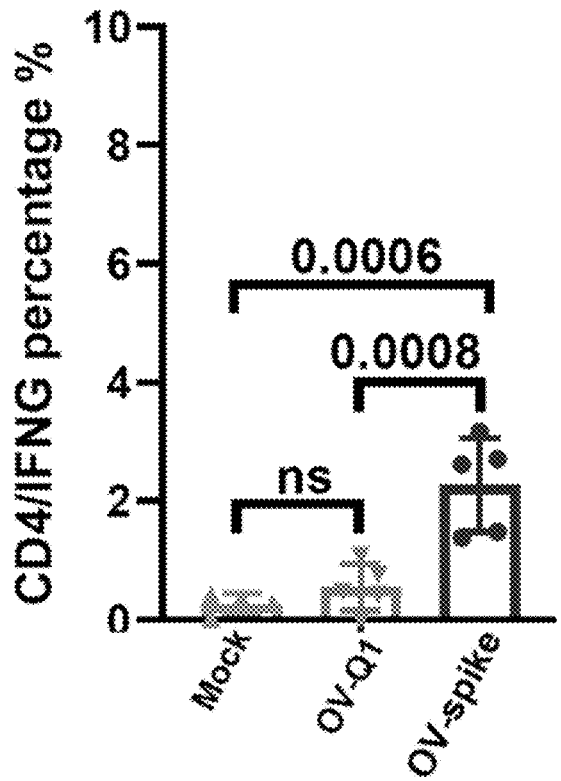
Figure 5H:
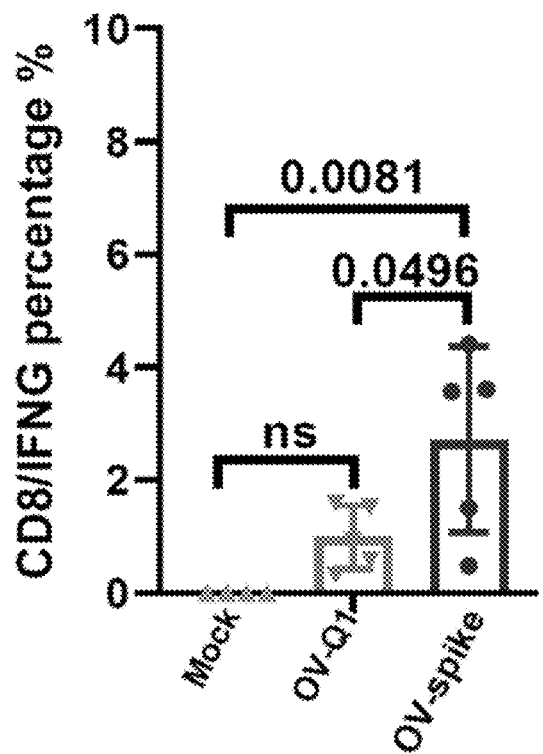
Figure 5I:
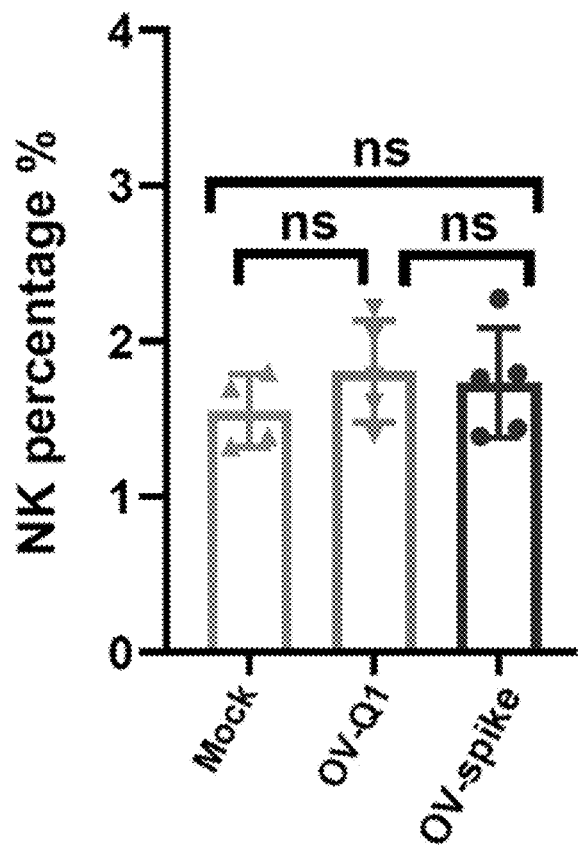
Figure 5J:
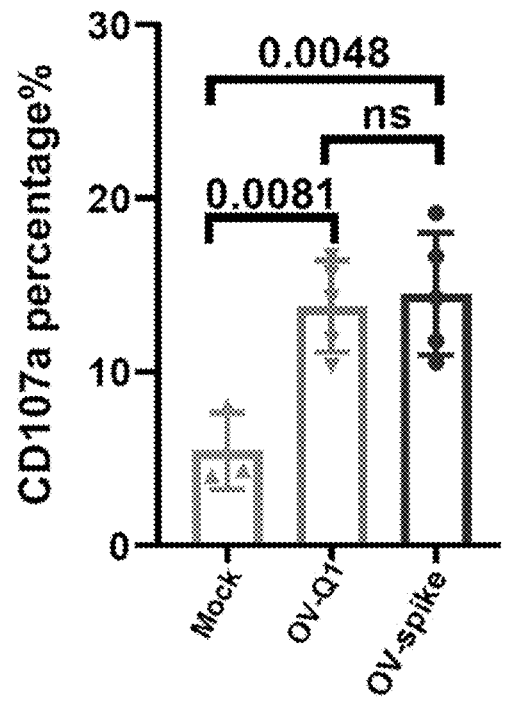

Vaccination with OV-Spike Activates Immune Responses in Both Tumor-Free and Tumor-Bearing Mice To evaluate immune system activation after OV-spike vaccination, tumor-free BALB/c mice were injected with OV-spike on days 0 and 14. SARS-CoV-2 specific T cells were analyzed after ex vivo antigen stimulation with an S peptide mixture. An enzyme-linked immunospot (ELISpot) assay showed that the S peptide mixture stimulated significantly more splenic cells to produce interferon gamma (IFNγ) in the OV-spike-vaccinated group than the OV-Q and saline-vaccinated groups (FIG. 5A and FIG. 11A). Consistent with these results, a flow cytometric analysis showed that OV-spike vaccination significantly increased the percentage of IFNγ$^+$ S-specific CD4$^+$ and CD8$^+$ T cells (FIGS. 5B-5C) compared to vaccination with OV-Q1 or saline. However, OV-spike vaccination did not change the percentage of natural killer (NK) cells or NK cell activation (FIGS. 5D-5E). In the mouse ovarian tumor model, OV-spike vaccination induced more IFNγ-producing cells than vaccination with OV-Q1 or saline, indicating that OV-spike induces antigen-specific T cells in tumor-bearing mice (FIGS. 5F-5H and FIG. 11B). Similar to the results with tumor-free mice, there was no difference in the number of NK cells among the saline-, OV-Q1-, and OV-spike-vaccinated mice (FIG. 5I); however, unlike in the tumor-free mice, the percentage of activated NK cells was greater in the OV-Q1- and OV-spike-vaccinated groups than the saline group (FIG. 5J). These results are consistent with Applicant's model, wherein OV-spike stimulates anti-S-specific neutralizing antibodies, but both OV-spike and OV-Q1 have anti-tumor effects.

Lack of Side Effects Observed After OV-spike Vaccination

Vaccine safety is a vital concern in clinical application. Applicant thus evaluated the side effects of OV-spike vaccine. The same titer of OV-Q1 or OV-spike was injected into tumor-free mice on day 0. The injection sites were observed and no significant redness and swelling were found (data not shown). Mouse temperature and body weight were measured at indicated times. Neither fever nor weight loss was observed after immunization (FIGS. 12A-12B). Furthermore, on day 70, the tissues including lung, brain, liver and kidney were harvested. Hematological analysis showed that no notable changes in OV-spike vaccinated group compared to saline and OV-Q1 groups (FIG. 12C). These results are consistent with a favorable safety profile for OV-spike.

Discussion

Although there are many vaccines against SARS-CoV-2 in various stages of development and distribution[29-31], none are tailored to the needs of people with cancer. To generate OV-spike, a dual functional SARS-CoV-2 vaccine that also reduces tumor growth, the oncolytic virus oHSV was modified to express S protein on its surface. Vaccination with OV-spike induced anti-S neutralization antibody production in both BALB/c and C57BL/6 mice. Furthermore, OV-spike not only reduced tumor growth in mice but also prevented SARS-CoV-2 infection, whereas the conventional OV, OV-Q1, only reduced tumor growth. OV-spike vaccination did not cause obvious or severe adverse effects in mice. These results indicate that OV-spike could be a safe and effective dual functional vaccine for treating cancer patients and protecting them from SARS-CoV-2 infection.

Due to the immunocompromised condition of cancer patients, they are more susceptible to COVID-19 infection[5,32]. In addition, COVID-19 can cause more severe symptoms in cancer patients. Many surveys show the mortality rate of cancer patients induced by COVID-19 infection is much higher compared to that of patients without cancer[8]. Therefore, effective and specific vaccines stimulating stronger immune responses should be developed to protect cancer patients from COVID-19 infection. Most anti-SARS-CoV-2 vaccines attempt to induce anti-viral immune responses against multiple viral proteins, including S protein[33-35]. They are either non-vector based (e.g., RNA-based)[36] or vector-based vaccines (e.g., adenovirus-based)[37]. However, Applicant's OV-spike is a unique vector-based vaccine candidate, as it can have an oncolytic lysis function, rendering it be more suitable for cancer patients. Compared to other vaccines, the OV-spike vaccine not only can produce both anti-tumor and anti-virus immune responses but also may provoke stronger immune responses than other vaccines because of at least two unique features. First, the vaccine is designed such that OV-spike specifically infects tumor cells and makes the tumor cells express S proteins or their surface or release the S antigens after oncolysis. This can amplify the anti-SARS-CoV-2 immune response. Second, after the tumor cells are lysed by OV-spike, they produce tumor-specific antigens, which can induce anti-tumor immunity. The anti-viral and anti-tumor immune responses may cross-react with each other to destroy both tumor cells and SARS-CoV-2 virus particles, as the stimulated adaptive immune response can boost the immune responses of innate immune cells', which may not distinguish between tumor killing and virus clearance. The amplified immune responses could be beneficial for people with cancer, who are usually immunocompromised or have lymphopenia, which can become more extreme after SARS-CoV-2 infection.

The current study provides proof-of-concept for the dual role of OV-spike in multiple tumor models. In clinical practice, this vaccine will be best suited for local injection into solid tumors, such as melanoma and sarcoma. As the vaccine can specifically infect and be amplified by tumor cells and induce the immune amplification mentioned above, the vaccine may be amenable to low-dose injection, especially for people with early-stage cancer, which can lessen the risk of side effects. Also, due to the observed strong immune response to OV-spike and the immunocompromised or lymphopenic condition of people with severe COVID-19 at the late stage[39], OV-spike may also serve as a therapeutic agent not only for cancer but also for COVID-19. Therefore, the vaccine can have multiple applications: to prevent COVID-19 in cancer patients and to treat both cancer and COVID-19. This is important for cancer patients, who urgently need to improve their immunity, especially adaptive immunity, which has a quick response and can also be quickly boosted by innate immunity[25,26,40].

An important concern for a vaccine is its safety. Based on the dose and the injection timeline of T-VEC, the first oncolytic virus therapy approved by FDA[15,41], 3 doses of OV-spike were provided via intratumoral injection to the mice in the melanoma tumor model. No OV-spike-related adverse effects were observed after the multiple injections and no differences in body weight or temperature were observed between the saline-injected group and the OV-spike-injected group. Local infection with OV can avoid systemic toxicity. Both i.v. and i.p. injection were performed of the OV-spike and no side effects were found, including a substantial body temperature change. This lack of systemic side effects is consistent with Applicant's recent study, which demonstrated that the HSV-base OV is safe. Also, clinical study showed it was safe to treat dozens of cancer patients using a similar OV[18,26]. Therefore, the OV-spike produces a favorable safety profile for cancer patients.

Mutation strains of SARS-CoV-2, such as B.1.1.7, have increased transmissibility, a higher viral load, and resistance to vaccination[42,43]. Sera from the OV-spike immunized mice on neutralization function of B.1.1.7 strain was tested. Compared to the dose neutralizing wild-type SARS-CoV-2 infection, a similar dose of sera used to block infection by a wild-type strain could also block B.1.1.7 strain infection, which indicated that OV-spike seems to be capable of preventing infection by either the wild-type or the B.1.1.7 strain infection.

In summary, compared to existing SARS-CoV-2 vaccines, which only neutralize viral infection, Applicant's vector-based OV-spike vaccine works as a dual functional agent to prevent SARS-CoV-2 infection and treat cancer. OV-spike shows a promising safety profile in mouse models and induces long-lasting anti-tumoral and anti-viral immune responses.

Methods

Cells

The Vero cercopithecus aethiops-derived kidney epithelial cell line, B16 *Mus musculus*-derived skin melanoma cell line, MC38 *Mus musculus*-derived colon adenocarcinoma cell line, and ID8 mouse ovarian surface epithelial cell line were cultured with Dulbecco's modified Eagle's medium (DMEM) with 10% FBS, penicillin (100 U/ml), and streptomycin (100 µg/ml). The ID8 cells were modified to express a fly luciferase (FFL) gene (ID8-FFL) and used for in vivo imaging. All cell lines were routinely tested for the absence of mycoplasma using the MycoAlert Plus Mycoplasma Detection Kit from Lonza (Walkersville, MD).

Generation of OV-Spike

OV-spike was generated using the fHsvQuik-1 system, as previously described[27,27]. The full-length SARS-CoV-2 S protein was fused with the oHSV glycoprotein D transmembrane domain and intracellular domain. The fusion protein was inserted into pT-oriSIE4/5 following the HSV pIE4/5 promoter to construct pT-oriSIE4/5-spike. pT-oriSIE4/5-spike or pT-oriSIE4/5 was recombined with fHsvQuik-1 for engineering OV-spike and OV-Q1, respectively. Vero cells were used for propagating and titrating the viruses. Virus titration was performed using plaque assays. Briefly, monolayer Vero cells were seeded in a 96-well plate. After 12 h, these cells were infected with gradient-diluted viral solutions. The infection media were replaced with DMEM supplemented with 10% FBS at 2 hours after infection. Green fluorescent protein (GFP)-positive plaques were observed and counted with a Zeiss fluorescence microscope (AXIO observer 7) 2 days after infection to calculate the viral titer. To concentrate and purify the OV-Q1 and OV-spike viral particles, the culture media containing viruses were harvested and centrifuged at 3,000×g for 30 min. Then the supernatants were collected and ultra-centrifuged at 100,000×g for 1 hour. The pellets of virus were resuspended with saline as needed.

Negative Staining Electron Microscopy

OV-Q1 and OV-spike virus specimens at certain concentrations were absorbed to glow-discharged, carbon-coated 200 mesh Formvar grids. Samples were prepared by conventional negative staining with 1% (w/v) uranyl acetate. Electron microscopy images were taken on an FEI Tecnai 12 transmission electron microscope equipped with a Gatan OneView CMOS camera.

Immuno-Electron Microscopy

For immunogold labeling, 5 µl of virus suspension was absorbed to glow-discharged carbon coated Formvar grids for 2 min. After rinsing in PBS containing 0.05% bovine serum albumin, the grids were incubated with mouse anti-spike antibody (Cat. #40591-MM43, SinoBiological) at 1/500 dilution for 15 min. After washing, the grids were incubated with a 10 nm gold particle-conjugated goat anti-mouse IgG(H+L) (Cat #EM. GMHL10 BBI Solutions) at 1/50 dilution for 15 min. Finally, the immunolabeled samples were negatively stained with 1% (w/v) uranyl acetate for 10 s. The electron microscopy images were taken on an FEI Tecnai 12 transmission electron microscope equipped with a Gatan OneView CMOS camera.

Western Blot

Concentrated samples of OV-Q1 and OV-spike were mixed with NuPAGE™ Sample Reducing Agent (4×) (Thermo Fisher Scientific). The samples were heated at 70° C. for 10 min and then loaded on 15% SDS-PAGE gel. The proteins were transferred onto polyvinylidene difluoride (PVDF) membrane (Minipore), and the membrane was blocked with 5% milk in PBST for 1 h at room temperature (RT). Mouse anti-spike antibody was diluted at 1:1000 in PBST containing 1% BSA and incubated with the membrane at 4° C. overnight. The membrane was then washed with PBST on a shaker 3 times and incubated with HRP-conjugated goat anti-mouse IgG diluted as 1:2,000 for 1 h at RT. Pierce™ ECL Western Blotting Substrate (Thermo Fisher Scientific) was added to the membrane, the blots were imaged by FluorChem E (ProteinSimple).

Quantitative Real-Time PCR

OV-Q1- and OV-spike-infected Vero cells were harvested after 48 hours, and viral DNA was extracted from the cells using the Qiagen DNeasy Kit (Cat No.: 69504). The exacted DNA was used as a quantitative real-time PCR (qPCR) template. The sequence of the spike forward primer was: 5'-TGGATTTTTGGCACCACCCT-3' (SEQ ID NO:4) and the reverse primer was: 5'-AGACTCCCAG-GAATGGGTCA-3' (SEQ ID NO:5). The standard curve was generated using synthesized pTwist-spike as a qPCR template. The absolute copy number of OV-Q1- and OV-spike-infected Vero cells was calculated according to the standard curve.

Binding of S Protein to Mouse Serum Samples

His-tagged full-length SARS-CoV-2 S protein (50 ng) (Cat. #40589-VO8B1, Sino Biological) was used as a coating reagent. The plate (Cat #3361, Corning) was incubated with a serial dilution of mouse serum samples for 2 hours at RT. HRP-conjugated goat anti-mouse IgG antibody (Cat #05-4220, Invitrogen) was used for detection. Absorbance was measured at 450 nm by a Multiskan™ FC Microplate Photometer (Fisher Scientific).

VSV-SARS-CoV-2 Infection

The VSV-SARS-CoV-2 chimeric virus expressing GFP was kindly provided by Sean Whelan at Washington University School of Medicine. The virus was decorated with SARS-CoV-2 S protein in place of the native glycoprotein (G)[22]. Before VSV-SARS-CoV-2 infection, mouse serum samples were inactivated in a 56° C. water bath for 30 min and serial dilutions were made. Vero cells ($1.5-2\times10^4$) were seeded 24 hours before the infection in a 96-well plate. VSV-SARS-CoV virus and the indicated amount (5 µl, 2.5 µl, 1.25 µl, 0.6 µl and 0.3 µl) of the inactivated mouse serum was preincubated at 37° C. for 2 hours and then added to the cells. The infectivity was measured by detecting GFP fluorescence using a Zeiss fluorescence microscope (AXIO observer 7) and measured as the percentage of GFP positive cells analyzed with a Fortessa X20 flow cytometer (BD Biosciences) at 24 hours post infection.

SARS-CoV-2 Infection and Plaque Assay 120 pfu SARS-CoV-2 was incubated with diluted sera (10-fold or 20-fold dilution) for 2 hours at 37° C. Then Vero E6 cells were infected with 250 µl virus-sera mixture for 1 hour. After infection, the medium containing virus was removed, and overlay medium containing FBS-free DMEM and 2% low-melting point agarose was added. At 72 hours post infection, infected cells were fixed by 4% paraformaldehyde for 20 minutes at room temperature and then permeabilized by 2% Triton X-100/PBS solution for 10 minutes at room temperature. SARS-CoV-2 viral nucleocapsid protein (NP) was detected using the anti-NP protein antibody (Cat. #PA5-81794, Thermo Fisher) as a primary antibody, followed by detecting with an anti-rabbit secondary antibody. The plates were developed using 3,3',5,5'-Tetramethylbenzidine (TMB) and then scanned using Immunospot S6 Sentry (C.T.L Analyzers).

In vivo Mouse Model

Six- to eight-week-old female BALB/c or C57BL/6 mice were purchased from Jackson Laboratories (Bar Harbor, Maine). OV-spike ($1\times10^6$ pfu or $5\times10^5$ pfu) was i.v. injected on days 0 and 14, and $1\times10^6$ pfu OV-Q1 was injected as a control. For i.p. injection, $2\times10^6$ pfu or $1\times10^6$ pfu OV-spike was injected on days 0 and 14, and $2\times10^6$ pfu OV-Q1 was injected as a control. Peripheral blood samples were collected once a week. The body temperature of the mice were monitored daily for 3 days after vaccination.

The B16 melanoma mouse model was established by injecting $5\times10^5$ B16 cells s.c. on day 0 into C57BL/6 mice. On day 5, $2\times10^6$ pfu OV-Q1 or OV-spike was intratumorally injected and saline was injected as a control. In total, 2 injections were performed on days 5 and 7. Tumor size was monitored every 3 days. Peripheral blood samples were collected once a week after treatment. The mice were euthanized by ketamine/xylazine at 100/10 mg/kg when the tumor volume was over 1500 mm³. The MC38 and ID8 colon adenocarcinoma and ovarian cancer mouse models were established by injecting $5\times10^5$ MC38 cells or $1\times10^6$ ID8 cells i.p. on day 0 into C57BL/6 mice. On day 4, $2\times10^6$ pfu OV-Q1 or OV-spike were i.p. injected and saline was injected as a control. The other 2 injections were performed on days 11 and 18. Luciferase-based in vivo images were taken from 10 days after ID8 cell injection to evaluate the tumor development. Peripheral blood samples were collected once a week after treatment. The mice were euthanized by ketamine/xylazine at 100/10 mg/kg when moribund and when the body weight had increased by over 20%. Experiments and handling of mice were conducted under federal, state and local guidelines and with an approval from the City of Hope Animal Care and Use Committee.

ELISpot

ELISpot assays for the detection of IFNγ-secreting mouse splenocytes were performed with mouse IFNγ kit (Cat. #mIFNg-1M/2, ImmunoSpot). The 96-well plate was coated with an IFNγ capture antibody at 4° C. overnight. Fresh mouse spleen cells ($3\times10^5$) were added to each well along with the spike peptide pool of 1.6 µg/ml. After 48 hours of incubation at 37° C., IFNγ spots were visualized by stepwise addition of a biotinylated detection antibody, a streptavidin-enzyme conjugate and the substrate. Spots were counted using an ImmunoSpot S6 Universal Reader (CTL Europe) and analyzed using GraphPad.

Intracellular Cytokine Staining and Flow Cytometry

Fresh mouse splenocytes were incubated with 1.6 μg/ml spike peptide pool for 24 hours at 37° C. After treatment with brefeldin A (Biolegend) for 4 hours, the splenocytes were stained with the extracellular markers PE-Cy™7 Hamster Anti-Mouse CD3e (Cat. #552774, BD Pharmingen™), APC-Cy™7 Rat Anti-Mouse CD4 (Cat. #552051, BD Pharmingen™), and CD8 alpha Monoclonal Antibody (KT15), FITC (Cat. #MA5-16759. Invitrogen) for incubation on ice for 25 minutes. The cells were washed once with PBS and fixed and permeabilized for 30 min avoiding direct light at RT using the fixation and permeabilization kit (Thermo Fisher Scientific) according to the manufacturer's protocol. After washing once with permeabilization wash buffer, the cells were stained with PE Rat Anti-Mouse IFN-γ (Cat. #554412, BD Pharmingen™) for 30 min on ice. At the same time, fresh mouse splenocytes were isolated and stained with FITC Rat Anti-Mouse CD45 (Cat. #553080, BD Pharmingen™), PE-Cy™7 Hamster Anti-Mouse CD3e (Cat. #552774, BD Pharmingen™), Alexa Fluor® 700 Rat Anti-Mouse CD335 (NKp46) (Cat. #561169, BD Pharmingen™), and PE Rat anti-Mouse CD107a (Cat. #558661, BD Pharmingen™) to analyze the NK cell percentage and CD107a expression level. Flow data was acquired on a BD LSRFortessa X-20 (BD) and analyzed by FlowJo software.

Statistical Analysis

Prism software v.8 (GraphPad, CA, USA) and SAS v.9.4 (SAS Institute. NC, USA) were used to perform statistical analyses. For continuous endpoints that are normally distributed or normally distributed after logarithmic transformation, such as mean fluorescence intensity or copy number, a Student's t test or paired t test was used to compare the 2 independent or matched groups, respectively. One-way ANOVA models or generalized linear models were used to compare 3 or more independent groups. For data with repeated measures from the same subject, linear mixed models were used to account for the variance and covariance structure due to repeated measures. Survival functions were estimated by the Kaplan-Meier method and compared by the two-sided log rank test. All tests were two-sided. P-values were adjusted for multiple comparisons by Holm's procedure. A P value of 0.05 or less was considered statistically significant.

While various embodiments and aspects of the disclosure are shown and described herein, it will be obvious to those skilled in the art that such embodiments and aspects are provided by way of example only. Numerous variations, changes, and substitutions will now occur to those skilled in the art without departing from the invention. It should be understood that various alternatives to the embodiments described herein may be employed.

REFERENCES

1. Chakraborty, C., Sharma, A. R., Sharma, G., Bhattacharya, M. & Lee, S. S. SARS-CoV-2 causing pneumonia-associated respiratory disorder (COVID-19): diagnostic and proposed therapeutic options. *Eur Rev Med Pharmacol Sci* 24, 4016-4026 (2020).
2. Wu, F., et al. A new coronavirus associated with human respiratory disease in China. *Nature* 579, 265-269 (2020).
3. Velavan, T. P. & Meyer, C. G. The COVID-19 epidemic. *Trop Med Int Health* 25, 278-280 (2020).
4. Worldometer. Worldometer's COVID-19 data. in *Worldometer's COVID-19 data.*, Vol. 2020 (2020).
5. Zhou, F., et al. Clinical course and risk factors for mortality of adult inpatients with COVID-19 in Wuhan, China: a retrospective cohort study. *Lancet* 395, 1054-1062 (2020).
6. Jordan, R. E., Adab, P. & Cheng, K. K. Covid-19: risk factors for severe disease and death. *BMJ* 368, m1198 (2020).
7. Wang, Q., Berger, N. A. & Xu, R. Analyses of Risk, Racial Disparity, and Outcomes Among US Patients With Cancer and COVID-19 Infection. *JAMA Oncol* (2020).
8. Liang, W., et al. Cancer patients in SARS-CoV-2 infection: a nationwide analysis in China. *Lancet Oncol* 21, 335-337 (2020).
9. Russell, B., et al. Factors Affecting COVID-19 Outcomes in Cancer Patients: A First Report From Guy's Cancer Center in London. *Front Oncol* 10, 1279 (2020).
10. Fukuhara, H., Ino, Y. & Todo, T. Oncolytic virus therapy: A new era of cancer treatment at dawn. *Cancer Sci* 107, 1373-1379 (2016).
11. Bell, J. C., Lichty, B. & Stojdl, D. Getting oncolytic virus therapies off the ground. *Cancer Cell* 4, 7-11 (2003).
12. Mondal, M., Guo, J., He, P. & Zhou, D. Recent advances of oncolytic virus in cancer therapy. *Hum Vaccin Immunother* 16, 2389-2402 (2020).
13. Raja, J., Ludwig, J. M., Gettinger, S. N., Schalper, K. A. & Kim, H. S. Oncolytic virus immunotherapy: future prospects for oncology. *J Immunother Cancer* 6, 140 (2018).
14. Varghese, S. & Rabkin, S. D. Oncolytic herpes simplex virus vectors for cancer virotherapy. *Cancer Gene Ther* 9, 967-978 (2002).
15. Johnson, D. B., Puzanov, I. & Kelley, M. C. Talimogene laherparepvec (T-VEC) for the treatment of advanced melanoma. *Immunotherapy* 7, 611-619 (2015).
16. Greig, S. L. Talimogene Laherparepvec: First Global Approval. *Drugs* 76, 147-154 (2016).
17. Ning, J. & Wakimoto, H. Oncolytic herpes simplex virus-based strategies: toward a breakthrough in glioblastoma therapy. *Front Microbiol* 5, 303 (2014).
18. Friedman, G. K., et al. Oncolytic HSV-1 G207 Immunovirotherapy for Pediatric High-Grade Gliomas. *N Engl J Med* (2021).
19. Saha, D., Wakimoto, H. & Rabkin, S. D. Oncolytic herpes simplex virus interactions with the host immune system. *Curr Opin Virol* 21, 26-34 (2016).
20. Yin, J., Markert, J. M. & Leavenworth, J. W. Modulation of the Intratumoral Immune Landscape by Oncolytic herpes Simplex Virus Virotherapy. *Front Oncol* 7, 136 (2017).
21. Toda, M., Rabkin, S. D., Kojima, H. & Martuza, R. L. herpes simplex virus as an in situ cancer vaccine for the induction of specific anti-tumor immunity. *Hum Gene Ther* 10, 385-393 (1999).
22. Zang, R., et al. Cholesterol 25-hydroxylase suppresses SARS-CoV-2 replication by blocking membrane fusion. *Proc Natl Acad Sci USA* 117, 32105-32113 (2020).
23. van Riel, D. & de Wit, E. Next-generation vaccine platforms for COVID-19. *Nat Mater* 19, 810-812 (2020).
24. Alvarez-Breckenridge, C. A., et al. NK cells impede glioblastoma virotherapy through NKp30 and NKp46 natural cytotoxicity receptors. *Nature medicine* 18, 1827-1834 (2012).

25. Han, J., et al. TGFbeta Treatment Enhances Glioblastoma Virotherapy by Inhibiting the Innate Immune Response. *Cancer Res* 75, 5273-5282 (2015).
26. Xu, B., et al. An oncolytic herpesvirus expressing E-cadherin improves survival in mouse models of glioblastoma. *Nat Biotechnol* (2018).
27. Terada, K., Wakimoto, H., Tyminski, E., Chiocca, E. A. & Saeki, Y. Development of a rapid method to generate multiple oncolytic HSV vectors and their in vivo evaluation using syngeneic mouse tumor models. *Gene Ther* 13, 705-714 (2006).
28. Muik, A., et al. Neutralization of SARS-CoV-2 lineage B.1.1.7 pseudovirus by BNT162b2 vaccine-elicited human sera. *Science* 371, 1152-1153 (2021).
29. Sharma, O., Sultan, A. A., Ding, H. & Triggle, C. R. A Review of the Progress and Challenges of Developing a Vaccine for COVID-19. *Front Immunol* 11, 585354 (2020).
30. Poland, G. A., Ovsyannikova, I. G. & Kennedy, R. B. SARS-CoV-2 immunity: review and applications to phase 3 vaccine candidates. *Lancet* 396, 1595-1606 (2020).
31. Izda, V., Jeffries, M. A. & Sawalha, A. H. COVID-19: A review of therapeutic strategies and vaccine candidates. *Clin Immunol* 222, 108634 (2021).
32. Zou, W. Immunosuppressive networks in the tumour environment and their therapeutic relevance. *Nat Rev Cancer* 5, 263-274 (2005).
33. Sanchez-Felipe, L., et al. A single-dose live-attenuated YF17D-vectored SARS-CoV-2 vaccine candidate. Nature (2020).
34. Chiuppesi, F., et al. Development of a multi-antigenic SARS-CoV-2 vaccine candidate using a synthetic poxvirus platform. *Nat Commun* 11, 6121 (2020).
35. Mercado, N. B., et al. Single-shot Ad26 vaccine protects against SARS-CoV-2 in rhesus macaques. *Nature* 586, 583-588 (2020).
36. Mulligan, M. J., et al. Phase I/II study of COVID-19 RNA vaccine BNT162b1 in adults. *Nature* 586, 589-593 (2020).
37. Zhu, F. C., et al. Safety, tolerability, and immunogenicity of a recombinant adenovirus type-5 vectored COVID-19 vaccine: a dose-escalation, open-label, non-randomised, first-in-human trial. *Lancet* 395, 1845-1854 (2020).
38. Florindo, H. F., et al. Immune-mediated approaches against COVID-19. *Nat Nanotechnol* 15, 630-645 (2020).
39. Tavakolpour, S., Rakhshandehroo, T., Wei, E. X. & Rashidian, M. Lymphopenia during the COVID-19 infection: What it shows and what can be learned. *Immunol Lett* 225, 31-32 (2020).
40. Alvarez-Breckenridge, C. A., et al. The histone deacetylase inhibitor valproic acid lessens NK cell action against oncolytic virus-infected glioblastoma cells by inhibition of STAT5/T-BET signaling and generation of gamma interferon. *J Virol* 86, 4566-4577 (2012).
41. Bommareddy, P. K., Patel, A., Hossain, S. & Kaufman, H. L. Talimogene Laherparepvec (T-VEC) and Other Oncolytic Viruses for the Treatment of Melanoma. *Am J Clin Dermatol* 18, 1-15 (2017).
42. Leung, K., Shum, M. H., Leung, G. M., Lam, T. T. & Wu, J. T. Early transmissibility assessment of the N501Y mutant strains of SARS-CoV-2 in the United Kingdom, October to November 2020. *Euro Surveill* 26(2021).
43. Muik, A., et al. Neutralization of SARS-CoV-2 lineage B.1.1.7 pseudovirus by BNT162b2 vaccine-elicited human sera. *Science* (2021).

| INFORMAL SEQUENCE LISTING |
| --- |
| SEQ ID NO: 1<br>ATGTTTGTGTTCCTGGTGCTGCTGCCACTGGTGTCCAGCCAGTGTGTGAACCTGACCACCAGGACCCAACTTCCTC<br>CTGCCTACACCAACTCCTTCACCAGGGGAGTCTACTACCCTGACAAGGTGTTCAGGTCCTCTGTGCTGCACAGCAC<br>CCAGGACCTGTTCCTGCCATTCTTCAGCAATGTGACCTGGTTCCATGCCATCCATGTGTCTGGCACCAATGGCACC<br>AAGAGGTTTGACAACCCTGTGCTGCCATTCAATGATGGAGTCTACTTTGCCAGCACAGAGAAGAGCAACATCATCA<br>GGGGCTGGATTTTTGGCACCACCCTGGACAGCAAGACCCAGTCCCTGCTGATTGTGAACAATGCCACCAATGTGGT<br>GATTAAGGTGTGTGAGTTCCAGTTCTGTAATGACCCATTCCTGGGAGTCTACTACCACAAGAACAACAAGTCCTGG<br>ATGGAGTCTGAGTTCAGGGTCTACTCCTCTGCCAACAACTGTACCTTTGAATATGTGAGCCAACCATTCCTGATGG<br>ACTTGGAGGGCAAGCAGGGCAACTTCAAGAACCTGAGGGAGTTTGTGTTCAAGAACATTGATGGCTACTTCAAGAT<br>TTACAGCAAACACACACCAATCAACCTGGTGAGGGACCTGCCACAGGGCTTCTCTGCTTGGAACCACTGGTGGACC<br>TGCCAATTGGCATCAACATCACCAGGTTCCAGACCCTGCTGGCTCTGCACAGGTCCTACCTGACACCTGGAGACTC<br>CTCCTCTGGCTGGACAGCAGGAGCAGCAGCCTACTTATGTGGGCTACCTCCAACCAAGGACCTTCCTGCTGAAATA<br>CAATGAGAATGGCACCATCACAGATGCTGTGGACTGTGCCCTGGACCCACTGTCTGAGACCAAGTGTACCCTGAAA<br>TCCTTCACAGTGGAGAAGGGCATCTACCAGACCAGCAACTTCAGGGTCCAACCAACAGAGAGCATTGTGAGGTTTC<br>CAAACATCACCAACCTGTGTCCATTTGGAGAGGTGTTCAATGCCACCAGGTTTGCCTCTGTCTATGCCTGGAACAG<br>GAAGAGGATTAGCAACTGTGTGGCTGACTACTCTGTGCTCTACAACTCTGCCTCCTTCAGCACCTTCAAGTGTTAT<br>GGAGTGAGCCCAACCAAACTGAATGACCTGTGTTTCACCAATGTCTATGCTGACTCCTTTGTGATTAGGGGAGATG<br>AGGTGAGACAGATTGCCCCTGGACAAACAGGCAAGATTGCTGACTACAACTACAAACTGCCTGATGACTTCACAGG<br>CTGTGTGATTGCCTGGAACAGCAACAACCTGGACAGCAAGGTGGGAGGCAACTACAACTACCTCTACAGACTGTTC<br>AGGAAGAGCAACCTGAAACCATTTGAGAGGGACATCAGCACAGAGATTTACCAGGCTGGCAGCACACCATGTAATG<br>GAGTGGAGGGCTTCAACTGTTACTTTCCACTCCAATCCTATGGCTTCCAACCAACCAATGGAGTGGGCTACCAACC<br>ATACAGGGTGGTGGTGCTGTCCTTTGAACTGCTCCATGCCCCTGCCACAGTGTGTGTGGCACCAAAGAAGAGCACCA<br>ACCTGGTGAAGAACAAGTGTGTGAACTTCAACTTCAATGGACTGACAGGCACAGGAGTGCTGACAGAGAGCAACAA<br>GAAGTTCCTGCCATTCCAACAGTTTGGCAGGGACATTGCTGACACCACAGATGCTGTGAGGGACCCACAGACCTTG<br>GAGATTCTGGACATCACACCATGTTCCTTTGGAGGAGTGTCTGTGATTACACCTGGCACCAACACCAGCAACCAGG<br>TGGCTGTGCTCTACCAGGATGTGAACTGTACTGAGGTGCCTGTGGCTATCCATGCTGACCAACTTACACCAACCTG<br>GAGGGTCTACAGCACAGGCAGCAATGTGTTCCAGACCAGGGCTGGCTGTCTGATTGGAGCAGAGCATGTGAACAAC<br>TCCTATGAGTGTGACATCCCAATTGGAGCAGGCATCTGTGCCTCCTACCAGACCCAGACCAACAGCCCAAGGAGGG<br>CAAGGTCTGTGGCAAGCCAGAGCATCATTGCCTACACAATGAGTCTGGGAGCAGAGAACTCTGTGGCTTACAGCAA<br>CAACAGCATTGCCATCCCAACCAACTTCACCATCTCTGTGACCACAGAGATTCTGCCTGTGAGTATGACCAAGACC<br>TCTGTGGACTGTACAATGTATATCTGTGGAGACAGCACAGAGTGTAGCAACCTGCTGCTCCAATATGGCTCCTTCT<br>GTACCCAACTTAACAGGGCTCTGACAGGCATTGCTGTGGAACAGGACAAGAACACCCAGGAGGTGTTTGCCCAGGT<br>GAAGCAGATTTACAAGACACCTCCAATCAAGGACTTTGGAGGCTTCAACTTCAGCCAGATTCTGCCTGACCCAAGC<br>AAGCCAAGCAAGAGGTCCTTCATTGAGGACCTGCTGTTCAACAAGGTGACCCTGGCTGATGCTGGCTTCATCAAGC<br>AATATGGAGACTGTCTGGGAGACATTGCTGCCAGGGACCTGATTTGTGCCCAGAAGTTCAATGGACTGACAGTGCT<br>GCCTCCACTGCTGACAGATGAGATGATTGCCCAATACACCTCTGCCCTGCTGGCTGGCACCATCACCTCTGGCTGG<br>ACCTTTGGAGCAGGAGCAGCCCTCCAAATCCCATTTGCTATGCAGATGGCTTACAGGTTCAATGGCATTGGAGTGA |

| INFORMAL SEQUENCE LISTING |
|---|
| CCCAGAATGTGCTCTATGAGAACCAGAAACTGATTGCCAACCAGTTCAACTCTGCCATTGGCAAGATTCAGGACTC<br>CCTGTCCAGCACAGCCTCTGCCCTGGGCAAACTCCAAGATGTGGTGAACCAGAATGCCCAGGCTCTGAACACCCTG<br>GTGAAGCAACTTTCCAGCAACTTTGGAGCCATCTCCTCTGTGCTGAATGACATCCTGAGCAGACTGGACAAGGTGG<br>AGGCTGAGGTCCAGATTGACAGACTGATTACAGGCAGACTCCAATCCCTCCAAACCTATGTGACCCAACAACTTAT<br>CAGGGCTGCTGAGATTAGGGCATCTGCCAACCTGGCTGCCACCAAGATGAGTGAGTGTGTGCTGGGACAAAGCAAG<br>AGGGTGGACTTCTGTGGCAAGGGCTACCACCTGATGAGTTTTCCACAGTCTGCCCCTCATGGAGTGGTGTTCCTGC<br>ATGTGACCTATGTGCCTGCCCAGGAGAAGAACTTCACCACAGCCCCTGCCATCTGCCATGATGGCAAGGCTCACTT<br>TCCAAGGGAGGGAGTGTTTGTGAGCAATGGCACCCACTGGTTTGTGACCCAGAGGAACTTCTATGAACCACAGATT<br>ATCACCACAGACAACACCTTTGTGTCTGGCAACTGTGATGTGGTGATTGGCATTGTGAACAACACAGTCTATGACC<br>CACTCCAACCTGAACTGGACTCCTTCAAGGAGGAACTGGACAAATACTTCAAGAACCACACCAGCCCTGATGTGGA<br>CCTGGGAGACATCTCTGGCATCAATGCCTCTGTGGTGAACATCCAGAAGGAGATTGACAGACTGAATGAGGTGGCT<br>AAGAACCTGAATGAGTCCCTGATTGACCTCCAAGAACTGGGCAAATATGAACAATACATCAAGTGGCCATGGTACA<br>TCTGGCTGGGCTTCATTGCTGGACTGATTGCCATTGTGATGGTGACCATAATGCTGTGTTGTATGACCTCCTGTTG<br>TTCCTGTCTGAAAGGCTGTTGTTCCTGTGGCTCCTGTTGTAAGTTTGATGAGGATGACTCTGAACCTGTGCTGAAA<br>GGAGTGAAACTGCACTACACC<br><br>SEQ ID NO: 2<br>AGCAAATATGCCTTGGTGGATGCCTCTCTCAAGATGGCCGACCCCAATCGCTTTCGCGGCAAAGACCTTCCGGTCC<br>TGGACCAGCTGACCGACCCTCCGGGGGTCCGGCGCGTGTACCACATCCAGGCGGGCCTACCGGACCCGTTCCAGCC<br>CCCCAGCCTCCCGATCACGGTTTACTACGCCGTGTTGGAGCGCGCCTGCCGCAGCGTGCTCCTAAACGCACCGTCG<br>GAGGCCCCCCAGATTGTCCGCGGGGCCTCCGAAGACGTCCGGAAACAACCCTACAACCTGACCATCGCTTGGTTTC<br>GGATGGGAGGCAACTGTGCTATCCCCATCACGGTCATGGAGTACACCGAATGCTCCTACAACAAGTCTCTGGGGGC<br>CTGTCCCATCCGAACGCAGCCCCGCTGGAACTACTATGACAGCTTCAGCGCCGTCAGCGAGGATAACCTGGGGTTC<br>CTGATGCACGCCCCCGCGTTTGAGACCGCGACGTACCTGCGGCTCGTGAAGATAAACGACTGGACGGAGATTA<br>CACAGTTTATCCTGGAGCACCGAGCCAAGGGCTCCTGTAAGTACGCCCTCCCGCTGCGCATCCCCCCGTCAGCCTG<br>CCTCTCCCCCAGGCCTACCAGCAGGGGTGACGGTGGACAGCATCGGGATGCTGCCCCGCTTCATCCCCGAGAAC<br>CAGCGCACCGTCGCCGTATACAGCTTGAAGATCGCCGGGTGGCACGGGCCCAAGGCCCCATACACGAGCACCCTGC<br>TGCCCCCGGAGCTGTCCGAGACCCCCAACGCCACGCAGCCAGAACTCGCCCCGGAAGACCCCGAGGATTCGGCCCT<br>CTTGGAGGACCCCGTGGGGACGGTGGCGCCGCAAATCCCACCCAAACTGGCACATACCGTCGATCCAGGACGCCGCG<br>ACGCCTTACCATCCCCGGCCACCCCGAACAACATGGGCCTGATCGCCGGCGCGGTGGGCGGCAGTCTCCTGGCAG<br>CCCTGGTCATTTGCGGAATTGTGTACTGGATGCGCCGCCACACTCAAAAAGCCCCAAAGCGCATACGCCTCCCCCA<br>CATCCGGGAAGACGACCAGCCGTCCTCGCACCAGCCCTTGTTTTACTAGGCGGCCGC<br><br>SEQ ID NO: 3 is the SARS-CoV-2 spike (S) protein with the following amino<br>acid residues numbered as 319 to 541:<br>RVQPTESIVR FPNITNLCPF GEVFNATRFA SVYAWNRKRI SNCVADYSVL YNSASFSTFK CYGVSPTKLN<br>DLCFTNVYAD SFVIRGDEVR QIAPGQTGKI ADYNYKLPDD FTGCVIAWNS NNLDSKVGGN YNYLYRLFRK<br>STEIYQAGST PCNGVEGFNC YFPLQSYGFQ PTNGVGYQPY RVVVLSFELL HAPATVCGPK KSTNLVKNKC<br>VNF<br><br>SEQ ID NO: 4 is the spike protein forward primer<br>5'-TGGATTTTTGGCACCACCCT-3'<br><br>SEQ ID NO: 5 is the spike protein reverse primer<br>5'AGACTCCCAGGAATGGGTCA-3' |

What is claimed is:

1. A recombinant oncolytic herpes simplex virus comprising a nucleic acid encoding a fusion protein comprising a SARS-CoV-2 spike (S) protein, a herpes simplex virus glycoprotein D transmembrane domain, and a herpes simplex virus glycoprotein D intracellular domain, wherein the recombinant oncolytic herpes simplex virus is a recombinant oncolytic herpes simplex-1 virus.

2. The recombinant oncolytic herpes simplex virus of claim 1, wherein the recombinant oncolytic virus does not comprise a nucleic acid encoding a functional γ34.5 gene.

3. The recombinant oncolytic herpes simplex virus of claim 1, wherein the recombinant oncolytic virus does not comprise a nucleic acid encoding a functional ICP6 gene.

4. The recombinant oncolytic herpes simplex virus of claim 1, wherein the nucleic acid encoding the fusion protein is under the control of a viral promoter.

5. The recombinant oncolytic herpes simplex virus of claim 1, wherein the SARS-CoV-2 spike (S) protein has at least 85% sequence identity to SEQ ID NO:3.

6. The recombinant oncolytic herpes simplex virus of claim 1, wherein the nucleic acid comprises a sequence encoding the SARS-CoV-2 spike (S) protein having at least 85% sequence identity to SEQ ID NO:1.

7. The recombinant oncolytic herpes simplex virus of claim 1, wherein the nucleic acid comprises a sequence encoding the herpes simplex virus glycoprotein D transmembrane domain and the herpes simplex virus glycoprotein D intracellular domain having at least 85% sequence identity to SEQ ID NO:2.

8. A viral vector comprising the recombinant oncolytic herpes simplex virus of claim 1.

9. A recombinant oncolytic herpes simplex virus particle comprising a SARS-CoV spike (S) protein on a surface of the particle.

10. The recombinant oncolytic herpes simplex virus particle of claim 9, wherein the SARS-CoV spike (S) protein is a SARS-CoV-2 spike (S) protein.

11. The recombinant oncolytic herpes simplex virus particle of claim 10, wherein the SARS-CoV-2 spike (S) protein has at least 85% sequence identity to SEQ ID NO:3.

12. A fusion protein comprising a SARS-CoV spike (S) protein, a herpes simplex virus glycoprotein D transmembrane domain, and a herpes simplex virus glycoprotein D intracellular domain.

13. The fusion protein of claim 12, wherein the SARS-CoV spike (S) protein is a SARS-CoV-2 spike (S) protein.

14. An immunogenic composition comprising the recombinant oncolytic herpes simplex virus of claim 1 or a viral vector encoding the recombinant oncolytic herpes simplex virus, and a pharmaceutically acceptable adjuvant.

15. A pharmaceutical composition comprising the recombinant oncolytic herpes simplex virus of claim 1 or a viral vector encoding the recombinant oncolytic herpes simplex virus, and a pharmaceutically acceptable excipient.

16. A method of eliciting antibodies to a SARS-CoV-2 coronavirus in a patient having cancer in need thereof, the method comprising administering to the patient having cancer an effective amount of the recombinant oncolytic herpes simplex virus of claim 1, a viral vector encoding the recombinant oncolytic herpes simplex virus, or a pharmaceutical composition comprising the recombinant oncolytic herpes simplex virus.

17. A method of preventing a SARS-CoV-2 coronavirus infection in a patient having cancer in need thereof, the method comprising administering to the patient having cancer an effective amount of the recombinant oncolytic herpes simplex virus of claim 1, a viral vector encoding the recombinant oncolytic herpes simplex virus, or a pharmaceutical composition comprising the recombinant oncolytic herpes simplex virus.

18. A method of treating cancer and preventing a SARS-CoV-2 coronavirus infection in a patient in need thereof, the method comprising administering to the patient an effective amount of the recombinant oncolytic herpes simplex virus of claim 1, a viral vector encoding the recombinant oncolytic herpes simplex virus, or a pharmaceutical composition comprising the recombinant oncolytic herpes simplex virus.

19. The method of claim 18, wherein the cancer is melanoma, colon cancer, or ovarian cancer.

* * * * *

SEQUENCE LISTING

```
<160> NUMBER OF SEQ ID NOS: 5

<210> SEQ ID NO 1
<211> LENGTH: 3819
<212> TYPE: DNA
<213> ORGANISM: Severe acute respiratory syndrome coronavirus 2

<400> SEQUENCE: 1
atgtttgtgt tcctggtgct gctgccactg gtgtccagcc agtgtgtgaa cctgaccacc      60
aggacccaac ttcctcctgc ctacaccaac tccttcacca ggggagtcta ctaccctgac     120
aaggtgttca ggtcctctgt gctgcacagc acccaggacc tgttcctgcc attcttcagc     180
aatgtgacct ggttccatgc catccatgtg tctggcacca atggcaccaa gaggtttgac     240
aaccctgtgc tgccattcaa tgatggagtc tactttgcca gcacagagaa gagcaacatc     300 atcagggget ggattttgg caccaccctg gacagcaaga cccagtccct gctgattgtg     360
aacaatgcca ccaatgtggt gattaaggtg tgtgagttcc agttctgtaa tgacccattc     420
ctgggagtct actaccacaa gaacaacaag tcctggatgg agtctgagtt cagggtctac     480
```

```
tcctctgcca caaactgtac ctttgaatat gtgagccaac cattcctgat ggacttggag    540
ggcaagcagg gcaacttcaa gaacctgagg gagtttgtgt tcaagaacat tgatggctac    600
ttcaagattt acagcaaaca cacaccaatc aacctggtga gggacctgcc acagggcttc    660
tctgccttgg aaccactggt ggacctgcca attggcatca acatcaccag gttccagacc    720
ctgctggctc tgcacaggtc ctacctgaca cctggagact cctcctctgg ctggacagca    780
ggagcagcag cctactatgt gggctacctc caaccaagga ccttcctgct gaaatacaat    840
gagaatggca ccatcacaga tgctgtggac tgtgccctgg acccactgtc tgagaccaag    900
tgtaccctga atccttcac agtggagaag ggcatctacc agaccagcaa cttcagggtc    960
caaccaacag agagcattgt gaggtttcca acatcacca acctgtgtcc atttggagag   1020
gtgttcaatg ccaccaggtt tgcctctgtc tatgcctgga caggaagag gattagcaac   1080 tgtgtggctg actactctgt gctctacaac tctgcctcct tcagcacctt caagtgttat   1140
ggagtgagcc caaccaaact gaatgacctg tgtttcacca atgtctatgc tgactccttt   1200
gtgattaggg gagatgaggt gagacagatt gcccctggac aaacaggcaa gattgctgac   1260
tacaactaca aactgcctga tgacttcaca ggctgtgtga ttgcctggaa cagcaacaac   1320
ctggacagca aggtgggagg caactacaac tacctctaca gactgttcag gaagagcaac   1380
ctgaaaccat ttgagaggga catcagcaca gagatttacc aggctggcag cacaccatgt   1440
aatggagtga gggcttcaa ctgttacttt ccactccaat cctatggctt ccaaccaacc   1500
aatggagtgg gctaccaacc atacagggtg gtggtgctgt cctttgaact gctccatgcc   1560
cctgccacag tgtgtggacc aaagaagagc accaacctgg tgaagaacaa gtgtgtgaac   1620
ttcaacttca atggactgac aggcacagga gtgctgacag agagcaacaa gaagttcctg   1680
ccattccaac agtttggcag ggacattgct gacaccacag atgctgtgag ggacccacag   1740
accttggaga ttctggacat cacaccatgt tcctttggag gagtgtctgt gattacacct   1800
ggcaccaaca ccagcaacca ggtggctgtg ctctaccagg atgtgaactg tactgaggtg   1860
cctgtggcta tccatgctga ccaacttaca ccaacctgga gggtctacag cacaggcagc   1920
aatgtgttcc agaccagggc tggctgtctg attggagcag agcatgtgaa caactcctat   1980
gagtgtgaca tcccaattgg agcaggcatc tgtgcctcct accagaccca gaccaacagc   2040
ccaaggaggg caaggtctgt ggcaagccag agcatcattg cctacacaat gagtctggga   2100
gcagagaact ctgtggctta cagcaacaac agcattgcca tcccaaccaa cttcaccatc   2160
tctgtgacca cagagattct gcctgtgagt atgaccaaga cctctgtgga ctgtacaatg   2220
tatatctgtg gagacagcac agagtgtagc aacctgctgc tccaatatgg ctccttctgt   2280
acccaactta cagggctctc tacaggcatt gctgtggaac aggacaagaa cacccaggag   2340
gtgtttgccc aggtgaagca gatttacaag acacctccaa tcaaggactt ggaggcttc    2400 aacttcagcc agattctgcc tgacccaagc aagccaagca gaggtccttc cattgaggac   2460
ctgctgttca caaggtgac cctggctgat gctggcttca tcaagcaata tggagactgt   2520
ctgggagaca ttgctgccag ggacctgatt tgtgcccaga gttcaatgg actgacagtg   2580 ctgcctccac tgctgacaga tgagatgatt gcccaataca cctctgccct gctggctggc   2640
accatcacct ctggctggac cttggagca ggagcagccc tccaaatccc atttgctatg   2700
cagatggctt acaggttcaa tggcattgga gtgacccaga atgtgctcta tgagaaccag   2760
aaactgattg ccaaccagtt caactctgcc attggcaaga ttcaggactc cctgtccagc   2820
acagcctctg ccctgggcaa actccaagat gtggtgaacc agaatgccca ggctctgaac   2880
```

```
acctggtga agcaactttc cagcaacttt ggagccatct cctctgtgct gaatgacatc    2940
ctgagcagac tggacaaggt ggaggctgag gtccagattg acagactgat tacaggcaga    3000
ctccaatccc tccaaaccta tgtgacccaa caacttatca gggctgctga gattagggca    3060
tctgccaacc tggctgccac caagatgagt gagtgtgtgc tgggacaaag caagagggtg    3120
gacttctgtg gcaagggcta ccacctgatg agttttccac agtctgcccc tcatggagtg    3180
gtgttcctgc atgtgaccta tgtgcctgcc aggagaaga acttcaccac agcccctgcc    3240
atctgccatg atggcaaggc tcactttcca agggagggag tgtttgtgag caatggcacc    3300
cactggtttg tgacccagag gaacttctat gaaccacaga ttatcaccac agacaacacc    3360
tttgtgtctg gcaactgtga tgtggtgatt ggcattgtga acaacacagt ctatgaccca    3420
ctccaacctg aactggactc cttcaaggag gaactggaca atacttcaa gaaccacacc    3480 agccctgatg tggacctggg agacatctct ggcatcaatg cctctgtggt gaacatccag    3540
aaggagattg acagactgaa tgaggtggct aagaacctga atgagtccct gattgacctc    3600
caagaactgg gcaaatatga acaatacatc aagtggccat ggtacatctg gctgggcttc    3660
attgctggac tgattgccat tgtgatggtg accataatgc tgtgttgtat gacctcctgt    3720
tgttcctgtc tgaaaggctg ttgttcctgt ggctcctgtt gtaagtttga tgaggatgac    3780
tctgaacctg tgctgaaagg agtgaaactg cactacacc                           3819

<210> SEQ ID NO 2
<211> LENGTH: 1121
<212> TYPE: DNA
<213> ORGANISM: Herpes simplex virus-1

<400> SEQUENCE: 2
agcaaatatg ccttggtgga tgcctctctc aagatggccg accccaatcg ctttcgcggc      60
aaagaccttc cggtcctgga ccagctgacc gaccctccgg gggtccggcg cgtgtaccac     120
atccaggcgg gcctaccgga cccgttccag cccccccagcc tcccgatcac ggtttactac     180
gccgtgttgg agcgcgcctg ccgcagcgtg ctcctaaacg caccgtcgga ggccccccag     240
attgtccgcg gggcctccga agacgtccgg aaacaaccct acaacctgac catcgcttgg     300
tttcggatgg gaggcaactg tgctatcccc atcacggtca tggagtacac cgaatgctcc     360
tacaacaagt ctctgggggc ctgtcccatc cgaacgcagc cccgctggaa ctactatgac     420
agcttcagcg ccgtcagcga ggataacctg gggttcctga tgcacgcccc gcgtttgag      480 accgccggca cgtacctgcg gctcgtgaag ataaacgact ggacggagat tacacagttt     540
atcctggagc accgagccaa gggctcctgt aagtacgccc tcccgctgcg catcccccg      600 tcagcctgcc tctccccca ggcctaccag caggggtga cggtggacag catcgggatg      660
ctgccccgct tcatccccga gaaccagcgc accgtcgccg tatacagctt gaagatcgcc     720
gggtggcacg gcccaaggc cccatacacg agcaccctgc tgcccccgga gctgtccgag      780 accccaacg ccacgcagcc agaactcgcc ccggaagacc ccgaggattc ggccctcttg     840 gaggacccg tggggacggt ggcgccgcaa atcccaccaa actggcacat accgtcgatc      900
caggacgccc gacgcctta ccatccccg gccaccccga caacatggg cctgatcgcc      960 ggcgcggtgg gcggcagtct cctggcagcc ctggtcattt gcggaattgt gtactggatg    1020
cgccgccaca ctcaaaaagc cccaaagcgc atacgcctcc cccacatccg gaagacgac    1080 cagccgtcct cgcaccagcc cttgtttttac taggcggccg c                       1121
```

<210> SEQ ID NO 3
<211> LENGTH: 223
<212> TYPE: PRT
<213> ORGANISM: Severe acute respiratory syndrome coronavirus 2

<400> SEQUENCE: 3

Arg Val Gln Pro Thr Glu Ser Ile Val Arg Phe Pro Asn Ile Thr Asn
1               5                   10                  15

Leu Cys Pro Phe Gly Glu Val Phe Asn Ala Thr Arg Phe Ala Ser Val
            20                  25                  30

Tyr Ala Trp Asn Arg Lys Arg Ile Ser Asn Cys Val Ala Asp Tyr Ser
        35                  40                  45

Val Leu Tyr Asn Ser Ala Ser Phe Ser Thr Phe Lys Cys Tyr Gly Val
    50                  55                  60

Ser Pro Thr Lys Leu Asn Asp Leu Cys Phe Thr Asn Val Tyr Ala Asp
65                  70                  75                  80

Ser Phe Val Ile Arg Gly Asp Glu Val Arg Gln Ile Ala Pro Gly Gln
                85                  90                  95

Thr Gly Lys Ile Ala Asp Tyr Asn Tyr Lys Leu Pro Asp Asp Phe Thr
            100                 105                 110

Gly Cys Val Ile Ala Trp Asn Ser Asn Asn Leu Asp Ser Lys Val Gly
        115                 120                 125

Gly Asn Tyr Asn Tyr Leu Tyr Arg Leu Phe Arg Lys Ser Asn Leu Lys
    130                 135                 140

Pro Phe Glu Arg Asp Ile Ser Thr Glu Ile Tyr Gln Ala Gly Ser Thr
145                 150                 155                 160

Pro Cys Asn Gly Val Glu Gly Phe Asn Cys Tyr Phe Pro Leu Gln Ser
                165                 170                 175

Tyr Gly Phe Gln Pro Thr Asn Gly Val Gly Tyr Gln Pro Tyr Arg Val
            180                 185                 190

Val Val Leu Ser Phe Glu Leu Leu His Ala Pro Ala Thr Val Cys Gly
        195                 200                 205

Pro Lys Lys Ser Thr Asn Leu Val Lys Asn Lys Cys Val Asn Phe
    210                 215                 220

<210> SEQ ID NO 4
<211> LENGTH: 20
<212> TYPE: DNA
<213> ORGANISM: Artificial Sequence
<220> FEATURE:
<223> OTHER INFORMATION: Synthetic construct

<400> SEQUENCE: 4
tggatttttg gcaccaccct                                              20

<210> SEQ ID NO 5
<211> LENGTH: 20
<212> TYPE: DNA
<213> ORGANISM: Artificial Sequence
<220> FEATURE:
<223> OTHER INFORMATION: Synthetic construct

<400> SEQUENCE: 5
agactcccag gaatgggtca                                              20